United States Patent
Takita et al.

(10) Patent No.: US 8,249,453 B2
(45) Date of Patent: Aug. 21, 2012

(54) OPTICAL COMMUNICATION SYSTEM

(75) Inventors: Yutaka Takita, Kawasaki (JP); Susumu Kinoshita, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 692 days.

(21) Appl. No.: 12/320,529

(22) Filed: Jan. 28, 2009

(65) Prior Publication Data

US 2009/0290873 A1 Nov. 26, 2009

(30) Foreign Application Priority Data

May 23, 2008 (JP) .................... 2008-135346

(51) Int. Cl.
*H04J 14/00* (2006.01)
*H04J 14/02* (2006.01)
*H04B 10/20* (2006.01)

(52) U.S. Cl. ............... 398/68; 398/58; 398/82
(58) Field of Classification Search .......... 398/67–68, 398/59, 82
See application file for complete search history.

(56) References Cited

U.S. PATENT DOCUMENTS

| | | | |
|---|---|---|---|
| 2003/0219254 A1* | 11/2003 | Couch | 398/135 |
| 2004/0208506 A1 | 10/2004 | Kinoshita et al. | |
| 2004/0208537 A1* | 10/2004 | Lee et al. | 398/41 |
| 2005/0123293 A1* | 6/2005 | Maki et al. | 398/12 |
| 2006/0083513 A1 | 4/2006 | Huang et al. | |
| 2006/0120724 A1* | 6/2006 | Ishimura | 398/75 |
| 2006/0280502 A1* | 12/2006 | Sekine et al. | 398/71 |
| 2007/0031146 A1 | 2/2007 | Takachio et al. | |
| 2008/0002977 A1* | 1/2008 | Mori | 398/71 |
| 2009/0052893 A1 | 2/2009 | Beer et al. | |

FOREIGN PATENT DOCUMENTS

| | | |
|---|---|---|
| JP | 2001-313660 | 11/2001 |
| JP | 2006-237769 | 9/2006 |
| JP | 2008-517529 | 5/2008 |
| WO | 2006/094960 | 9/2006 |

OTHER PUBLICATIONS

Japanese Office Action for corresponding Japanese Application 2008-135346; mailed Mar. 27, 2012.

* cited by examiner

*Primary Examiner* — Dawayne A Pinkney
(74) *Attorney, Agent, or Firm* — Staas & Halsey LLP

(57) ABSTRACT

An optical communicating apparatus that is connected to another optical communicating apparatus by a two-core optical transmission path includes: a one-core optical transmission path that passes an optical signal transmitted from an optical transmitter/receiver performing one-core bilateral communication and an optical signal transmitted to the optical transmitter/receiver in an opposite direction; a transmitting unit that transmits the optical signal transmitted from the optical transmitter/receiver through the one-core optical transmission path, to the other optical communicating apparatus through a first core of the two-core optical transmission path; and a receiving unit that receives the optical signal transmitted from the other communicating apparatus through a second core of the two-core optical transmission path, and passes the received optical signal to the one-core optical transmission path.

10 Claims, 35 Drawing Sheets

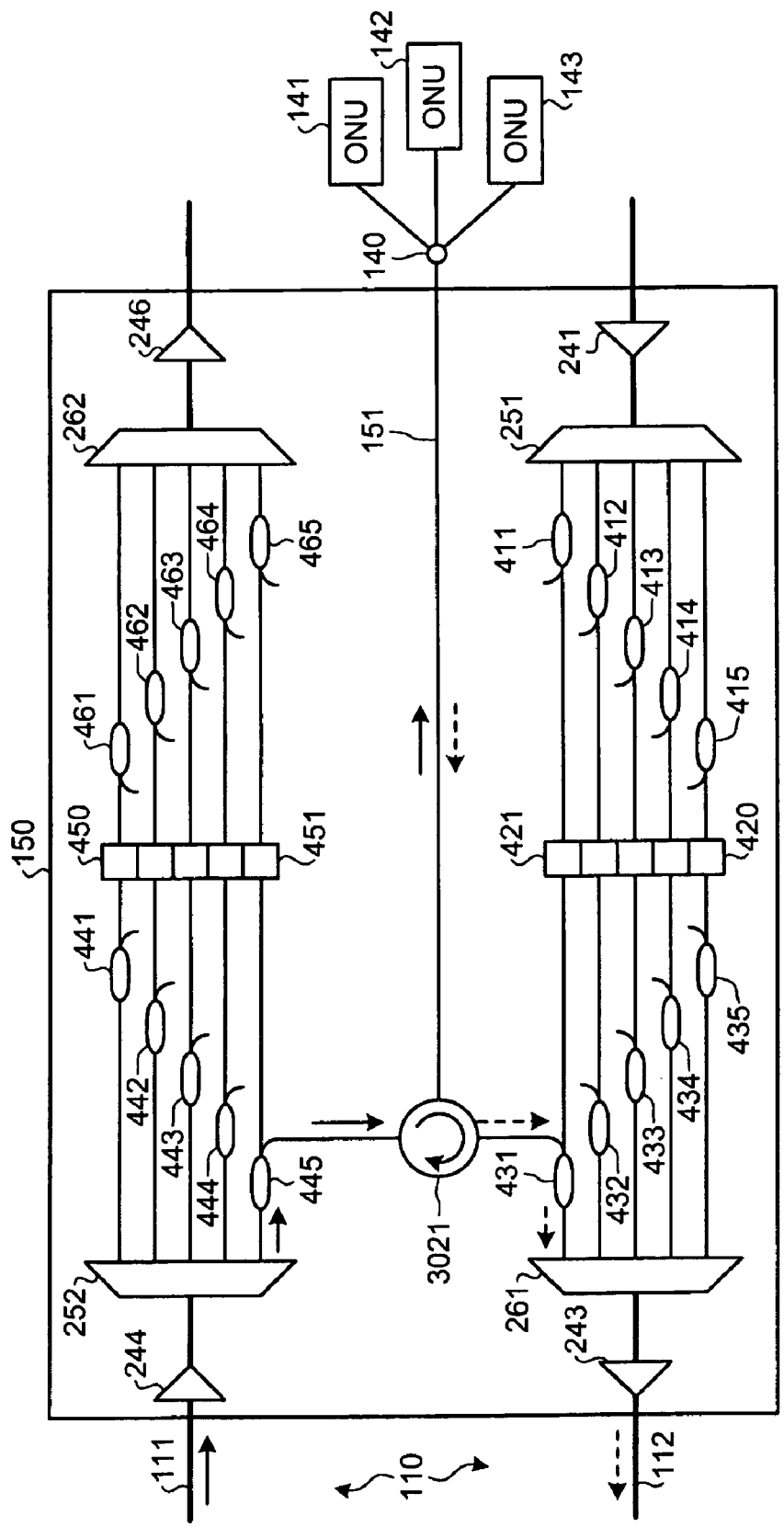

OPTICAL COMMUNICATION SYSTEM

CROSS REFERENCE TO RELATED APPLICATIONS

This application is based upon and claims the benefit of priority from the prior Japanese Patent Application No. 2008-135346, filed on May 23, 2008, the entire contents of which are incorporated herein by reference.

FIELD

The present invention relates to an optical communicating apparatus and an optical communication system.

BACKGROUND

Recently, optical networks are realized in various forms from a highway-based network connecting large cities to an access-based network connecting a base station and ordinary houses. A metro-network that mainly connects base stations employs a Wavelength Division Multiplexing (WDM) technique and optical hub apparatuses such as an Optical Add/Drop Multiplexer (OADM) apparatus and Wavelength CROSS Connect (WXC) that realize insert/branching and path switching of an optical signal in a wavelength.

Thereby, in a two-core bilateral optical fiber network, a large-capacity network is constructed or networks of various connection forms such as ring connection and mesh connection are constructed. An apparatus such as that conforming to a standard such as Synchronous Optical NETwork/Synchronous. Digital Hierarchy (SONET/SDH, hereinafter, "SONET") is employed as a specific communication transmitting apparatus.

In an access network, a network of a star topology has been realized using a one-core bilateral transmission path where a terminal point node of a metro network is used as the base point. A star topology network employs, for example, a Passive Optical Network (PON) system technique. Recently, the band for a PON system is drastically increasing (for example, G-PON and 10GE-PON) and further improvement of the functions thereof is expected.

In a PON-scheme optical communication system that is a typical one-core bilateral system, a plurality of subscriber terminals (ONUs: Optical Network Units) are present for one local station (OLT: Optical Line Terminal) and these two parties communicate using one-core optical fibers. For example, an UpLink (ONU to OLT) optical signal is allocated with a wavelength of 1310 nm and is transmitted in a burst mode. A DownLink (OLT to ONU) optical signal is allocated with a wavelength of 1490 nm and is transmitted in a continuous mode.

As above, it is general that a metro network employs a path transport network such as the SONET, and an access network employs a PON system. However, considering the metro network and the access network from the viewpoint of integration, the existing network configuration is not regarded as the optimal network configuration in respect of its price and efficiency.

For example, a SONET-scheme transmitting apparatus is an expensive and transmission-path-connection-based system, whereas expansion of the bandwidth and reduction of the cost are rapidly proceeding for the PON system. Therefore, when the PON system is also applied to, for example, the metro network, realization of a lower-cost and higher-efficiency network than an existing optical network can be expected. For example, a network using a SONET frame in a portion of a PON system is disclosed (see, e.g., Japanese Patent Application Laid-Open Publication No. 2006-237769).

However, a SONET-scheme optical communication system that forms a metro network uses two-core bilateral transmission paths while a PON-scheme optical communication system that forms an access network uses one-core bilateral transmission paths. Therefore, it is difficult to realize a PON-scheme optical communication system in a SONET-scheme optical communication system.

Therefore, a problem has arisen that the network cannot be flexibly designed. More specifically, because an amplifier or an isolator is provided on each node in a two-core bilateral transmission path in a SONET-scheme optical communication system, each core of the two-core bilateral transmission path can pass an optical signal only in one direction. Therefore, no PON-scheme optical communication system can be realized by bilaterally using one core of the two-core bilateral transmission path.

SUMMARY

According to an aspect of the embodiments, an optical communicating apparatus that is connected to another optical communicating apparatus by a two-core optical transmission path includes: a one-core optical transmission path that passes an optical signal transmitted from an optical transmitter/receiver performing one-core bilateral communication and an optical signal transmitted to the optical transmitter/receiver in an opposite direction; a transmitting unit that transmits the optical signal transmitted from the optical transmitter/receiver through the one-core optical transmission path, to the other optical communicating apparatus through a first core of the two-core optical transmission path; and a receiving unit that receives the optical signal transmitted from the other communicating apparatus through a second core of the two-core optical transmission path, and passes the received optical signal to the one-core optical transmission path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 35 is a block diagram of a modified example of the optical communication apparatus depicted in FIG. 33.

DESCRIPTION OF EMBODIMENT(S)

Preferred embodiments of the present invention will be explained with reference to the accompanying drawings.

Figure 1:
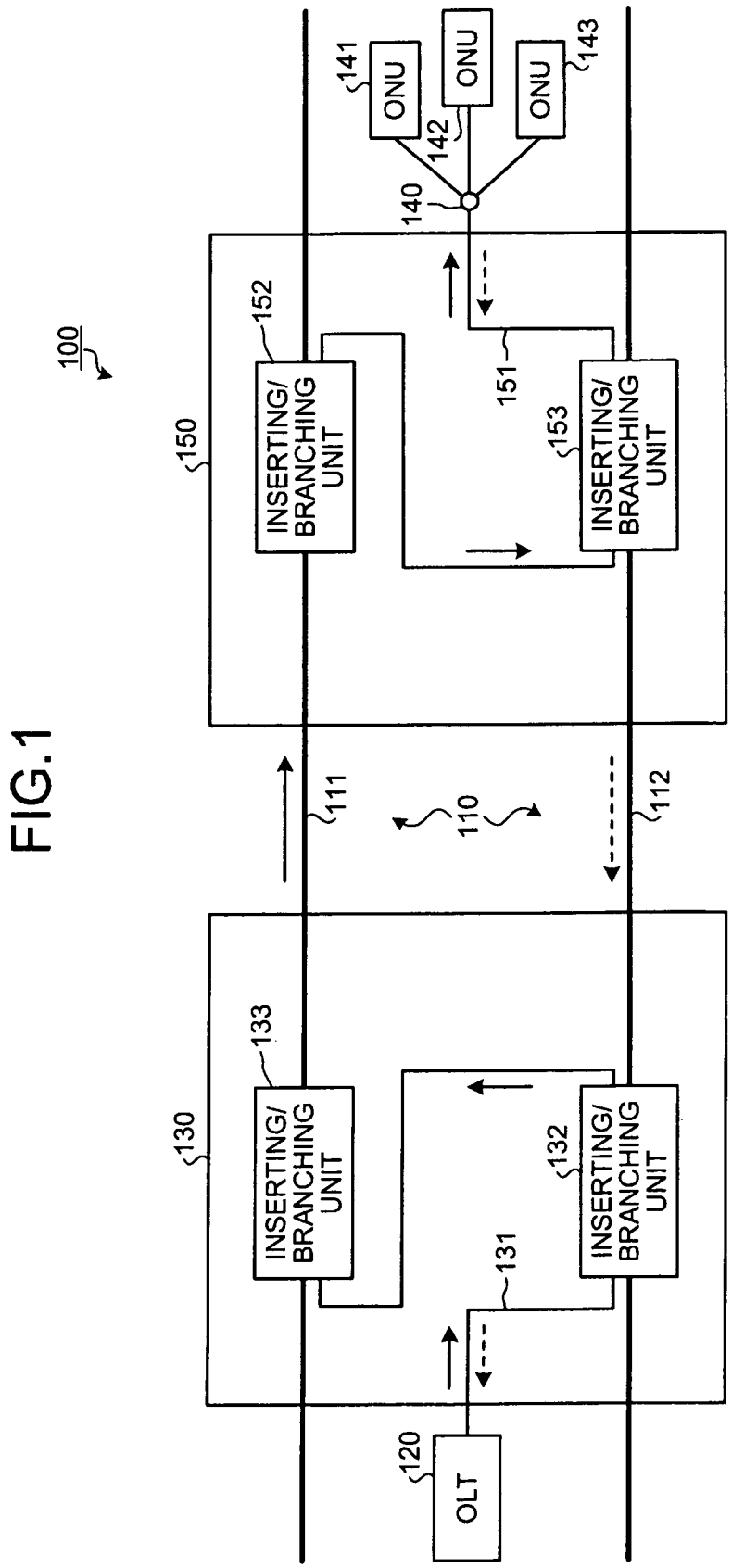
FIG. 1 is a block diagram of the functional configuration of an optical communication system according to a first embodiment.

FIG. 1 is a block diagram of the functional configuration of an optical communication system according to a first embodiment. As depicted in FIG. 1, an optical communication system 100 according to the first embodiment includes a two-core optical transmission path 110, an OLT 120, an optical communicating apparatus 130, a branching unit 140, ONUs 141 to 143, and an optical communicating apparatus 150. The optical communicating apparatuses 130 and 150 are relay apparatuses respectively provided at two points of the two-core optical transmission path 110.

For example, the two-core optical transmission path 110 is a transmission path of a SONET-scheme optical communication system. Each of the optical communicating apparatuses 130 and 150 is an inserting/branching node that executes insertion and branching of an optical signal in the SONET-scheme optical communication system. The two-core transmission path 110 is, for example, part of a two-core optical transmission path connected in a ring.

The two-core optical transmission path 110 includes a first core 111 and a second core 112. The first core 111 and the second core 112 pass an optical signal in opposite directions. The first core 111 passes an optical signal transmitted from the optical communicating apparatus 130, to the optical communicating apparatus 150. The second core 112 passes an optical signal transmitted from the optical communicating apparatus 150, to the optical communicating apparatus 130. The two-core optical transmission path 110 is, for example, a two-core optical fiber.

The OLT 120 is an optical transmitter/receiver (local station) connected to the optical communicating apparatus 130. The OLT 120 executes the PON-scheme communication (one-core bilateral communication) with the ONUs 141 to 143. More specifically, the OLT 120 time-division-multiplexes optical signals each addressed to one of the ONUS 141 to 143, and transmits the optical signals to the optical communicating apparatus 130. The OLT 120 receives from the optical communicating apparatus 130 each of the optical signals transmitted from the ONUs 141 to 143 using the time division multiplexing.

Solid arrows indicate flows of optical signals transmitted from the OLT 120 to the ONUs 141 to 143. Dotted arrows indicate flows of optical signals transmitted from the ONUs 141 to 143 to the OLT 120 (the same holds for FIGS. 2 to 7 and 9). A wavelength λ1 (first wavelength) of the optical signals transmitted from the OLT 120 to the ONUs 141 to 143 and a wavelength λ2 (second wavelength) of the optical signals transmitted from the ONUs 141 to 143 to the OLT 120 are different wavelengths.

The optical communicating apparatus 130 includes a one-core optical transmission path 131, and inserting/branching units 132 and 133. The one-core optical transmission path 131 is a one-core bilateral transmission path whose one end is connected to the OLT 120 and the other end is connected to the inserting/branching unit 132. The one-core optical transmission path 131 passes the optical signal transmitted from the OLT 120, to the inserting/branching unit 132. The one-core optical transmission path 131 passes the optical signal output from the inserting/branching unit 132, to the OLT 120.

The inserting/branching unit 132 (first inserting/branching unit) executes insertion and branching of an optical signal to the second core 112 (the other core) of the two-core optical transmission path 110. The inserting/branching unit 132 is a receiving unit that receives an optical signal transmitted from the optical communicating apparatus 150 to the OLT 120 through the second core 112. The inserting/branching unit 132 branches the received optical signal from the second core 112 and passes the optical signal to the one-core optical transmission path 131. The inserting/branching unit 132 branches the optical signal that is transmitted from the OLT 120 and that passes through the one-core optical transmission path 131, and outputs the branched optical signals to the inserting/branching unit 133.

The inserting/branching unit 133 (second inserting/branching unit) executes insertion and branching of an optical signal to the first core 111 (one core) of the two-core optical transmission path 110. The inserting/branching unit 133 is a transmitting unit that inserts the optical signal output from the inserting/branching unit 132 into the first core 111 and transmits the optical signal to the optical communicating apparatus 150. Each of the inserting/branching units 132 and 133 is, for example, an optical coupler.

The branching unit 140 (branching/coupling unit) is connected to the optical communicating apparatus 150. The branching unit 140 branches the optical signal transmitted from the optical communicating apparatus 150, and transmits the branched optical signals respectively to the ONUs 141 to 143. The branching unit 140 couples the optical signals transmitted from the ONUs 141 to 143 and transmits the coupled signal to the optical communicating apparatus 150.

Each of the ONUs 141 to 143 is an optical transmitter/receiver (subscriber terminal) that is connected to the optical communicating apparatus 150 through the branching unit 140. The ONUs 141 to 143 execute the PON-scheme communication (one-core bilateral communication) with the OLT 120. More specifically, the ONUs 141 to 143 transmit to the branching unit 140 optical signals at timing different from each other. Each of the ONUs 141 to 143 receives an optical signal transmitted from the branching unit 140.

The optical communicating apparatus 150 includes a one-core optical transmission path 151, and inserting/branching units 152 and 153. The one-core optical transmission path 151 is a one-core bilateral transmission path whose one end is connected to the branching unit 140 and the other end is connected to the inserting/branching unit 153. The one-core optical transmission path 151 passes the optical signal transmitted from the branching unit 140, to the inserting/branching unit 153. The one-core optical transmission path 151 passes the optical signal output from the inserting/branching unit 153, to the branching unit 140.

The inserting/branching units 152 (first inserting/branching unit) executes insertion and branching of an optical signal to the first core 111 of the two-core optical transmission path 110. The inserting/branching unit 152 is a receiving unit that receives an optical signal transmitted from the optical communicating apparatus 130 to the ONUs 141 to 143 through the first core 111 of the two-core optical transmission path 110. The inserting/branching unit 152 branches the received optical signal from the first core 111. The inserting/branching unit 152 outputs the branched optical signals to the inserting/branching unit 153.

The inserting/branching unit 153 (second inserting/branching unit) executes insertion and branching of an optical signal to the second core 112 of the two-core optical transmission path 110. The inserting/branching unit 153 is a transmitting unit that inserts the optical signal output from the one-core optical transmission path 151 into the second core 112 and that transmits the optical signal to the optical communicating apparatus 130. The inserting/branching unit 153 branches the optical signal output from the inserting/branching unit 152. The inserting/branching unit 153 branches the optical signal output from the inserting/branching unit 152. The inserting/branching unit 153 passes the branched optical signals to the one-core optical transmission path 151.

Each of the inserting/branching units 152 and 153 is, for example, a 1×2 optical coupler, a 2×1 optical coupler, or a 2×2 optical coupler. The branching unit 140 is, for example, a 1×N star coupler ("N" is three or larger). Each of the one-core optical transmission path 131 and the one-core optical transmission path 151 is, for example, a one-core optical fiber.

Figure 2:
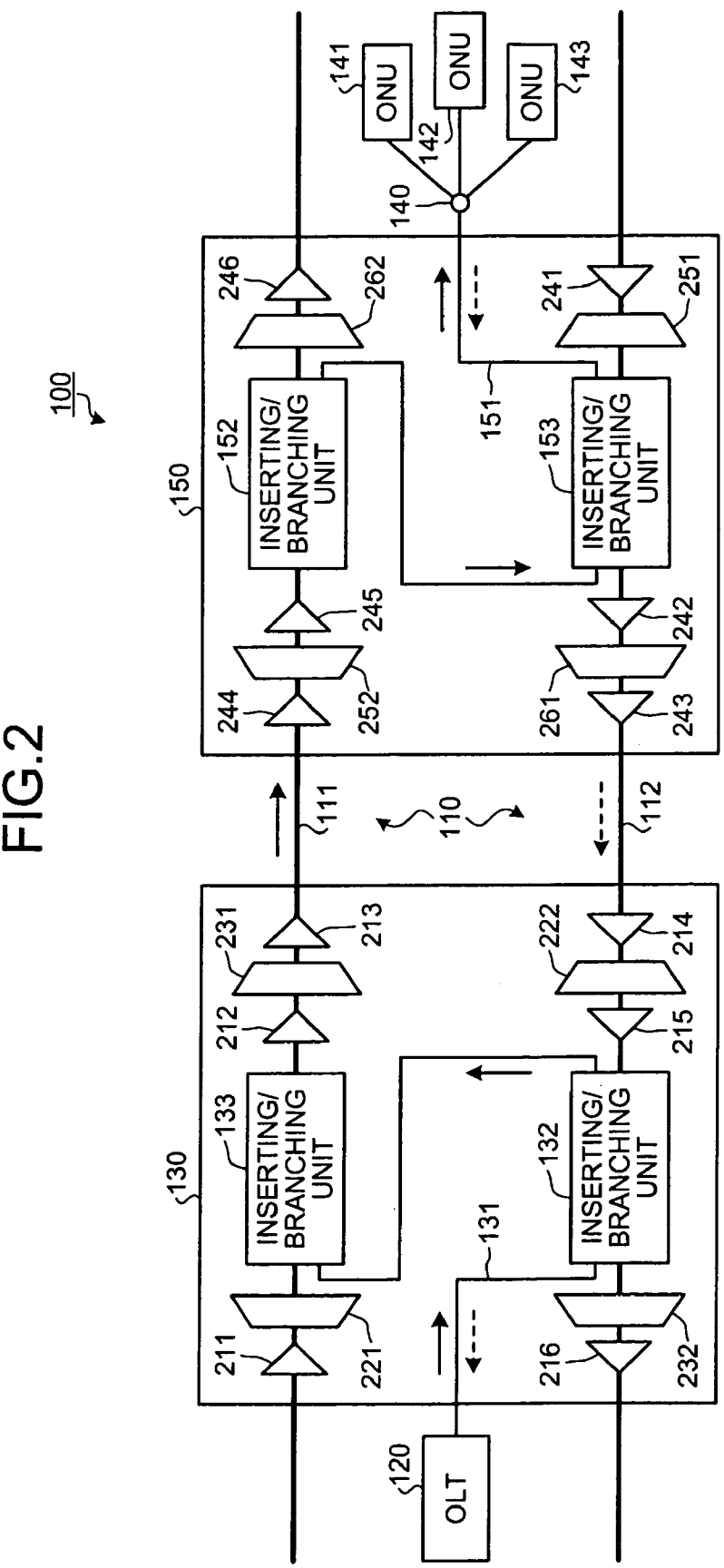
FIG. 2 is a block diagram of the specific configuration of the optical communication system depicted in FIG. 1.

FIG. 2 is a block diagram of the specific configuration of the optical communication system depicted in FIG. 1. In FIG. 2, components identical to those in FIG. 1 are given identical reference numerals and description thereof is omitted. Each of optical signals transmitted by the first core 111 and the second core 112 is assumed here to be a wavelength-multiplexed WDM optical signal. The OLT 120 and the ONUs 141 to 143 communicate with each other using optical signals each having a wavelength $\lambda 1$ or $\lambda 2$ included in the optical signal.

The optical communicating apparatus 130 depicted in FIG. 2 wavelength-demultiplexes the received optical signal. The optical communicating apparatus 130 executes insertion and branching of an optical signal for each demultiplexed optical signal. More specifically, in addition to the components of the optical communicating apparatus 130 depicted in FIG. 1, the optical communicating apparatus 130 includes amplifiers 211 to 216, demultiplexing units 221 and 222, and multiplexing units 231 and 232.

The amplifier 211 receives and amplifies an optical signal transmitted from an optical communicating apparatus (not depicted) in a former stage (the left portion of FIG. 2) of the optical communicating apparatus 130. The amplifier 211 outputs the amplified optical signal to the demultiplexing unit 221. The demultiplexing unit 221 wavelength-demultiplexes the optical signal output from the amplifier 211. Only one optical signal of optical signals that are wavelength-demultiplexed by the demultiplexing unit 221 will be described, and illustration and description for the rest of the optical signals are omitted.

The demultiplexing unit 221 outputs one optical signal of the wavelength-demultiplexed optical signals to the inserting/branching unit 133. The inserting/branching unit 133 couples the optical signal output from the demultiplexing unit 221 and the optical signal output from the inserting/branching unit 132, and the inserting/branching unit 133 outputs the coupled signals to the amplifier 212. The inserting/branching unit 133 outputs the optical signal output from the inserting/branching unit 132, to the amplifier 212.

The amplifier 212 amplifies the optical signal output from the inserting/branching unit 133 and outputs the amplified signal to the multiplexing unit 231. The multiplexing unit 231 wavelength-multiplexes the optical signal output from the amplifier 212 and the optical signals each having another wavelength (not depicted) that are wavelength-demultiplexed by the demultiplexing unit 221. The multiplexing unit 231 outputs the wavelength-multiplexed optical signal to the amplifier 213. The amplifier 213 amplifies the optical signal output from the multiplexing unit 231, and transmits the amplified signal to the optical communicating apparatus 150.

The amplifier 214 receives and amplifies the optical signal transmitted from the optical communicating apparatus 150 in a latter stage (in the right side of FIG. 2) of the optical communicating apparatus 130. The amplifier 214 outputs the amplified optical signal to the demultiplexing unit 222. The demultiplexing unit 222 wavelength-demultiplexes the optical signal output from the amplifier 214. Only one optical signal of the optical signals that are wavelength-demultiplexed by the demultiplexing unit 222 will be described, and illustration and description for the rest of the optical signals are omitted.

The demultiplexing unit 222 outputs one optical signal of wavelength-demultiplexed optical signals to the amplifier 215. The amplifier 215 amplifies the optical signal output from the demultiplexing unit 222, and outputs the amplified signal to the inserting/branching unit 132. The inserting/branching unit 132 branches the optical signal output from the amplifier 215, and outputs the branched optical signals respectively to the one-core transmission path 131 and the multiplexing unit 232.

The multiplexing unit 232 wavelength-multiplexes the optical signal output from the inserting/branching unit 132 and optical signals each having another wavelength (not depicted) that are wavelength-demultiplexed by the demultiplexing unit 222. The multiplexing unit 232 outputs the wavelength-multiplexed optical signal to the amplifier 216. The amplifier 216 amplifies the optical signal output from the multiplexing unit 232 and transmits the amplified signal to the optical communicating apparatus in the former stage of the optical communicating apparatus 130.

The optical communicating apparatus 150 depicted in FIG. 2 wavelength-demultiplexes the received optical signal. The optical communicating apparatus 150 executes insertion and branching of an optical signal to each demultiplexed optical signal. More specifically, in addition to the components of the optical communicating apparatus 150 depicted in FIG. 1, the optical communicating apparatus 150 includes amplifiers 241 to 246, demultiplexing units 251 and 252, and multiplexing units 261 and 262.

The amplifier 241 receives and amplifies an optical signal transmitted from an optical communicating apparatus (not depicted) in a latter stage (the right portion of FIG. 2) of the optical communicating apparatus 150. The amplifier 241 outputs the amplified optical signal to the demultiplexing unit 251. The demultiplexing unit 251 wavelength-demultiplexes the optical signal output from the amplifier 241. Only one optical signal of the optical signals that are wavelength-demultiplexed by the demultiplexing unit 251 will be described, and illustration and description for the rest of the optical signals are omitted.

The demultiplexing unit 251 outputs one optical signal of wavelength-demultiplexed optical signals to the inserting/branching unit 153. The inserting/branching unit 153 couples the optical signal output from the demultiplexing unit 251 and the optical signal output from the one-core optical transmission path 151, and the inserting/branching unit 153 outputs the coupled signals to the amplifier 242. The amplifier 242 amplifies the optical signal output from the inserting/branching unit 153, and outputs the amplified signal to the multiplexing unit 261.

The multiplexing unit 261 wavelength-multiplexes the optical signal output from the amplifier 242 and each optical signal having another wavelength (not depicted) that is wavelength-demultiplexed by the demultiplexing unit 251. The multiplexing unit 261 outputs the wavelength-multiplexed optical signal to the amplifier 243. The amplifier 243 amplifies the optical signal output from the multiplexing unit 261, and transmits the amplified signal to the optical communicating apparatus 130.

The amplifier 244 receives and amplifies an optical signal transmitted from the optical communicating apparatus 130 in a former latter stage (the left side of FIG. 2) of the optical communicating apparatus 150. The amplifier 244 outputs the amplified optical signal to the demultiplexing unit 252. The demultiplexing unit 252 wavelength-demultiplexes the optical signal output from the amplifier 244. Only one optical signal of the optical signals that are wavelength-demultiplexed by the demultiplexing unit 252 will be described, and illustration and description for the rest of the optical signals are omitted.

The demultiplexing unit 252 outputs one optical signal of wavelength-demultiplexed optical signals to the amplifier 245. The amplifier 245 amplifies the optical signal output from the demultiplexing unit 252 and outputs the amplified signal to the inserting/branching unit 152. The inserting/branching unit 152 branches the optical signal output from the amplifier 245 and outputs the branched optical signals respectively to the inserting/branching unit 153 and the multiplexing unit 262.

The multiplexing unit 262 wavelength-multiplexes the optical signal output from the inserting/branching unit 152 and the optical signals each having another wavelength (not depicted) that are wavelength-demultiplexed by the demultiplexing unit 252. The multiplexing unit 262 outputs the wavelength-multiplexed optical signal to the amplifier 246. The amplifier 246 amplifies the optical signal output from the multiplexing unit 262 and transmits the amplified signal to the optical communicating apparatus in the latter stage of the optical communicating apparatus 150.

Each of the amplifiers 211 to 216 and 241 to 246 is, for example, a Semiconductor Optical Amplifier (SOA) or an Erbium Doped Fiber Amplifier (EDFA). Each of the demultiplexing units 221, 222, 251, and 252 and the multiplexing units 231, 232, 261, and 262 is, for example, an Arrayed waveguide Grating (AWG).

The configuration including the amplifiers 212, 215, 245, and 242 has been described. However, all or some of the amplifiers 212, 215, 245, and 242 may be omitted when the Optical Signal Noise Ratio (OSNR) of each optical signal transmitted and received between the OLT 120 and the ONUs 141 to 143 is sufficiently secured.

Figure 3:
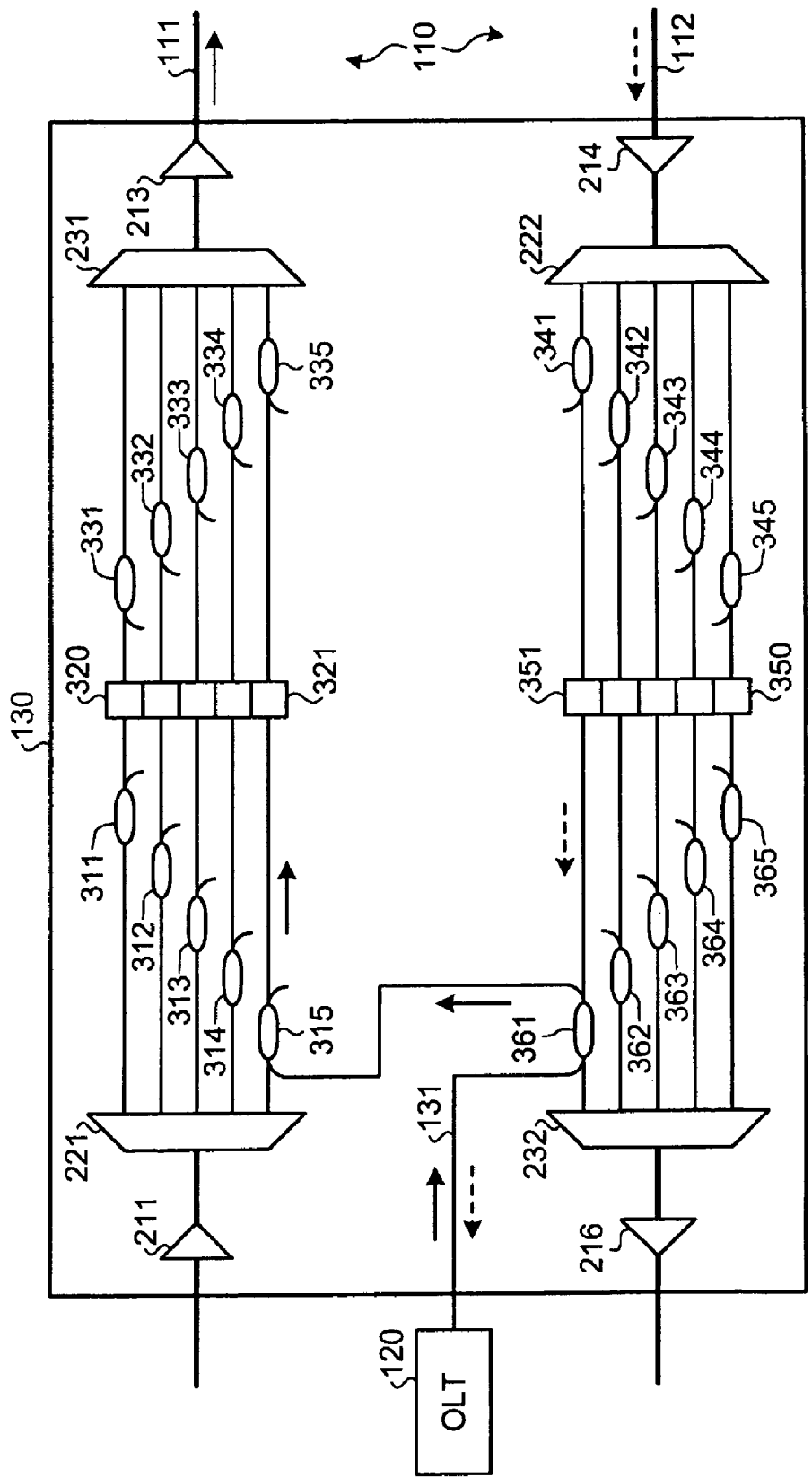
FIG. 3 is a block diagram of a specific example of the former stage depicted in FIG. 2.

FIG. 3 is a block diagram of a specific example of the former stage depicted in FIG. 2. In FIG. 3, components identical to those depicted in FIG. 2 are given identical reference numerals and description thereof is omitted. FIG. 3 depicts a specific example of the configuration between the demultiplexing unit 221 and the multiplexing unit 231 and the configuration between the demultiplexing unit 222 and the multiplexing unit 232 of the optical communicating apparatus 130 depicted in FIG. 2.

Optical couplers 311 to 315 and 331 to 335 and an SOA array 320 are provided between the demultiplexing unit 221 and the multiplexing unit 231. The demultiplexing unit 221 outputs the wavelength-demultiplexed optical signals respectively to the optical couplers 311 to 315. Each of the optical couplers 311 to 314 is a 1×2 optical coupler.

Each of the optical couplers 311 to 314 branches the optical signal output from the demultiplexing unit 221. Each of the optical couplers 311 to 314 outputs one of branched light beams to the SOA array 320 (Through). Each of the optical couplers 311 to 314 outputs the other one of the branched light beams to the outside (Drop).

The optical coupler 315 is the inserting/branching unit 133 in FIG. 2. The optical coupler 315 is a 2×2 optical coupler. The optical coupler 315 receives the optical signal output from the demultiplexing unit 221 and the optical signal output from the optical coupler 361. The optical coupler 315 branches the input optical signal. The optical coupler 315 outputs one of the branched optical signals to the SOA array 320 (Add/Through) and outputs the other one of the branched light beams to the outside (Drop).

The SOAs of the SOA array 320 respectively correspond to the optical couplers 311 to 315 and 331 to 335. Each SOA of the SOA array 320 amplifies the optical signal output from the corresponding optical couplers 311 to 315, and the SOA outputs the amplified optical signal to the corresponding optical couplers 331 to 335. The SOA 321 corresponding to the optical coupler 315 among the SOAs of the SOA array 320 is the amplifier 212 depicted in FIG. 2.

Each of the optical couplers 331 to 334 is a 2×1 optical coupler. Each of the optical couplers 331 to 335 receives an optical signal output from the corresponding SOA of the SOA array 320 and an optical signal coming from the outside. Each of the optical couplers 331 to 335 outputs an optical signal to the multiplexing unit 231. The multiplexing unit 231 wavelength-multiplexes the optical signals output from the optical couplers 331 to 335.

Optical couplers 341 to 345 and 361 to 365 and an SOA array 350 are provided between the demultiplexing unit 222 and the multiplexing unit 232. The demultiplexing unit 222 outputs the wavelength-demultiplexed optical signals respectively to the optical couplers 341 to 345. Each of the optical couplers 341 to 344 is a 1×2 optical coupler.

Each of the optical couplers 341 to 345 branches the optical signal output from the demultiplexing unit 222. Each of the optical couplers 341 to 345 outputs one of branched light beams to the SOA array 350 (Through). Each of the optical couplers 341 to 345 outputs the other one of the branched light beams to the outside (Drop).

The SOAs of the SOA array 350 respectively correspond to the optical couplers 341 to 345 and 361 to 365. Each SOA of the SOA array 350 amplifies the optical signal output from the corresponding optical coupler of the optical couplers 341 to 345, and the SOA outputs the amplified optical signal to the corresponding optical couplers 361 to 365. The SOA 351 corresponding to the optical coupler 361 among the SOAs of the SOA array 350 is the amplifier 215 depicted in FIG. 2.

Each of the optical couplers 362 to 365 is a 2×1 optical coupler. Each of the optical couplers 362 to 365 receives an optical signal output from the corresponding SOA of the SOA array 350 and an external optical signal. Each of the optical couplers 362 to 365 couples the input signals and outputs the coupled optical signal to the multiplexing unit 232.

The optical coupler 361 is the inserting/branching unit 132 depicted in FIG. 2. The optical coupler 361 is a 2×2 optical coupler. The optical coupler 361 receives the optical signal output from the SOA 351. The optical coupler 361 branches the input optical signals and outputs one of the branched optical signals to the one-core optical transmission path 131. The other optical signal branched by the optical coupler 361 is output to the multiplexing unit 232.

The optical coupler 361 also receives the optical signal output from the one-core optical transmission path 131. The optical coupler 361 branches the input optical signal and outputs one of the branched optical signals to the optical coupler 315. The other optical signal of the optical signals branched by the optical coupler 361 is output to the SOA 351. The light beam output from the optical coupler 361 to the SOA 351 is preferably blocked by, for example, an isolator incorporated in the SOA 351.

The multiplexing unit 232 wavelength-multiplexes the optical signals output from the optical couplers 361 to 365. In this case, the optical signal output from the optical coupler 361 to the multiplexing unit 232 is preferably blocked by the multiplexing unit 232. When the multiplexing unit 232 is, for example, an AWG, the characteristic of the AWG is designed such that the wavelength component of the optical signal output from the optical coupler 361 is not output.

Figure 4:
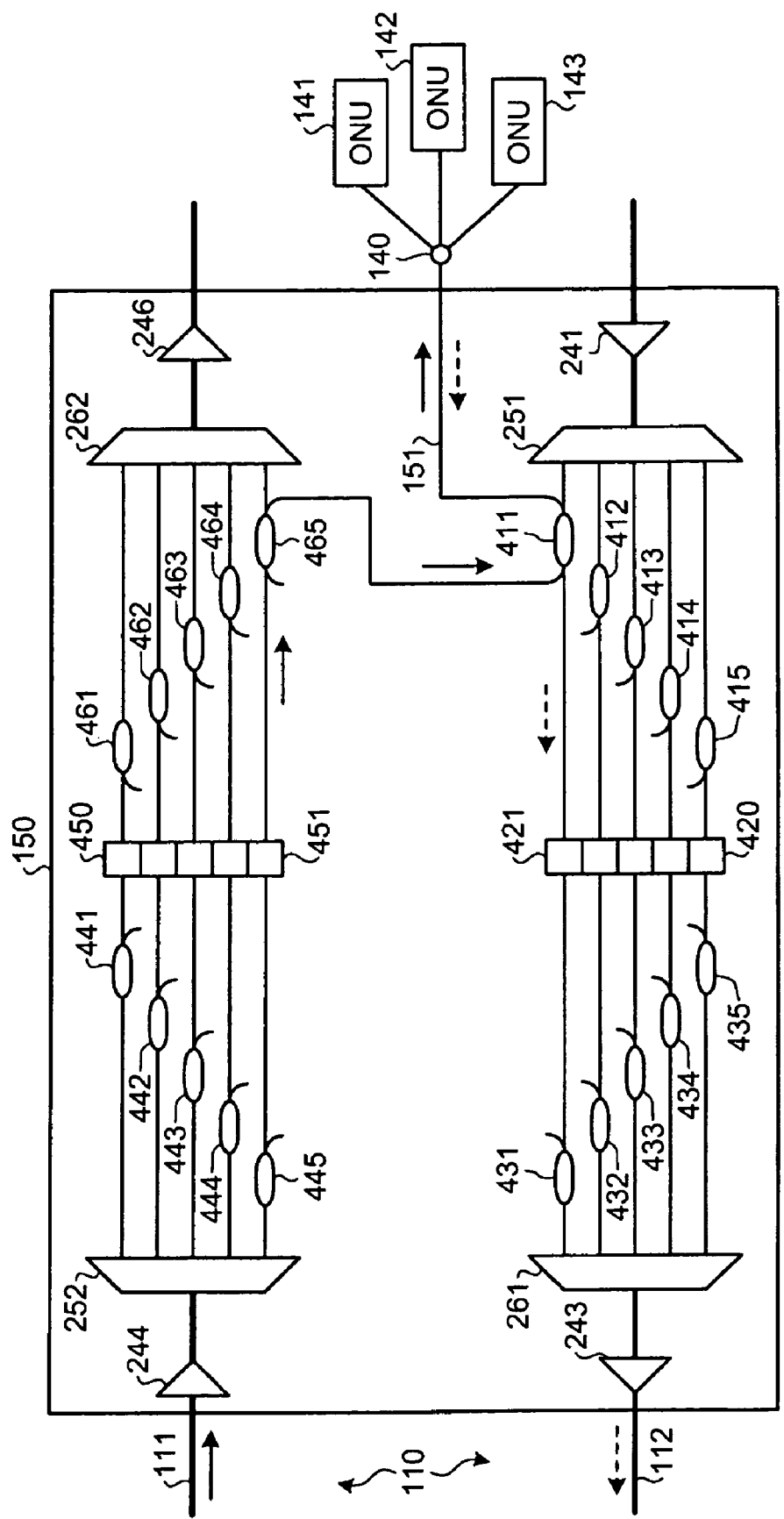
FIG. 4 is a block diagram of a specific example of the optical communicating apparatus at the latter stage depicted in FIG. 2.

FIG. 4 is a block diagram of a specific example of the optical communicating apparatus at the latter stage depicted in FIG. 2. In FIG. 4, components identical to those depicted in FIG. 2 are given identical reference numerals and description thereof is omitted. FIG. 4 depicts a specific example of the configuration between the demultiplexing unit 251 and the multiplexing unit 261 and the configuration between the demultiplexing unit 252 and the multiplexing unit 262 of the optical communicating apparatus 150 depicted in FIG. 2.

Optical couplers 411 to 415 and 431 to 435 and an SOA array 420 are provided between the demultiplexing unit 251 and the multiplexing unit 261. The demultiplexing unit 251 outputs the wavelength-demultiplexed optical signals respectively to the optical couplers 411 to 415. Each of the optical couplers 412 to 415 is a 1×2 optical coupler.

Each of the optical couplers 412 to 415 branches the optical signal output from the demultiplexing unit 251. Each of the optical couplers 412 to 415 outputs one of branched light beams to the SOA array 420 (Through). Each of the optical couplers 412 to 415 outputs the other one of the branched light beams to the outside (Drop).

The optical coupler 411 is the inserting/branching unit 153 depicted in FIG. 2. The optical coupler 411 is a 2×2 optical coupler. The optical coupler 411 receives the optical signal output from the demultiplexing unit 251 and the optical signal output from the one-core optical transmission path 151. The optical coupler 411 branches the optical signal from the demultiplexing unit 251 and the optical signal from the one-core optical transmission path 151.

The optical coupler 411 outputs one of the branched optical signals to an SOA array 420 (Through). The other optical signal of the optical signals branched by the optical coupler 411 passes through the optical coupler 465 and is output to an SOA 451. The optical signal output from the optical coupler 411 to the SOA 451 is preferably blocked by, for example, an optical isolator incorporated in the SOA 451.

The SOAs of the SOA array 420 respectively correspond to the optical couplers 411 to 415 and 431 to 435. Each SOA of the SOA array 420 amplifies the optical signal output from the corresponding optical couplers 411 to 415, and the SOA outputs the amplified optical signal to the corresponding optical couplers 431 to 435. The SOA 421 corresponding to the optical coupler 411 among the SOAs of the SOA array 420 is the amplifier 242 depicted in FIG. 2.

Each of the optical couplers 431 to 435 is a 2×1 optical coupler. Each of the optical couplers 431 to 435 receives an optical signal output from the corresponding SOA of the SOA array 420 and an optical signal coming from the outside. Each of the optical couplers 431 to 435 couples the input signals and outputs the coupled optical signal to the multiplexing unit 261. The multiplexing unit 261 wavelength-multiplexes the optical signals from the optical couplers 431 to 435 and outputs the multiplexed signal to the amplifier 243.

Optical couplers 441 to 445 and 461 to 465 and an SOA array 450 are provided between the demultiplexing unit 252 and the multiplexing unit 262. The demultiplexing unit 252 outputs the wavelength-demultiplexed optical signals respectively to the optical couplers 441 to 445. Each of the optical couplers 441 to 445 is a 1×2 optical coupler.

Each of the optical couplers 441 to 445 branches the optical signal output from the demultiplexing unit 252. Each of the optical couplers 441 to 445 outputs one of branched light beams to the SOA array 450 (Through). Each of the optical couplers 441 to 445 outputs the other one of the branched light beams to the outside (Drop).

SOAs of the SOA array 450 correspond to the optical couplers 441 to 445 and the optical couplers 461 to 465. Each SOA of the SOA array 450 amplifies the optical signal from the corresponding optical coupler of optical couplers 441 to 445 and outputs the amplified optical signal to the corresponding optical couplers 461 to 465. The SOA 451 corresponding to the optical coupler 445 is the amplifier 245 in FIG. 2.

Each of the optical couplers 461 to 464 is a 2×1 optical coupler. Each of the optical couplers 461 to 464 receives an optical signal output from the corresponding SOA of the SOA array 350 and an optical signal coming from the outside. Each of the optical couplers 461 to 464 couples the input signals and outputs the coupled optical signal to the multiplexing unit 262.

The optical coupler 465 is the inserting/branching unit 152 depicted in FIG. 2. The optical coupler 465 is a 2×2 optical coupler. The optical coupler 465 receives the optical signal output from the SOA 451 and an optical signal coming from the outside. The optical coupler 465 branches the input optical signals and outputs one of the branched optical signals to the optical coupler 411. The other optical signal branched by the optical coupler 465 is output to the multiplexing unit 262.

The multiplexing unit 262 wavelength-multiplexes the optical signals output from the optical couplers 461 to 465. In this case, the optical signal output from the optical coupler 461 to the multiplexing unit 262 is preferably blocked by the multiplexing unit 262. When the multiplexing unit 262 is, for example, an AWG, the characteristic of the AWG is designed such that the wavelength component of the optical signal output from the optical coupler 461 is not output.

Figure 5:
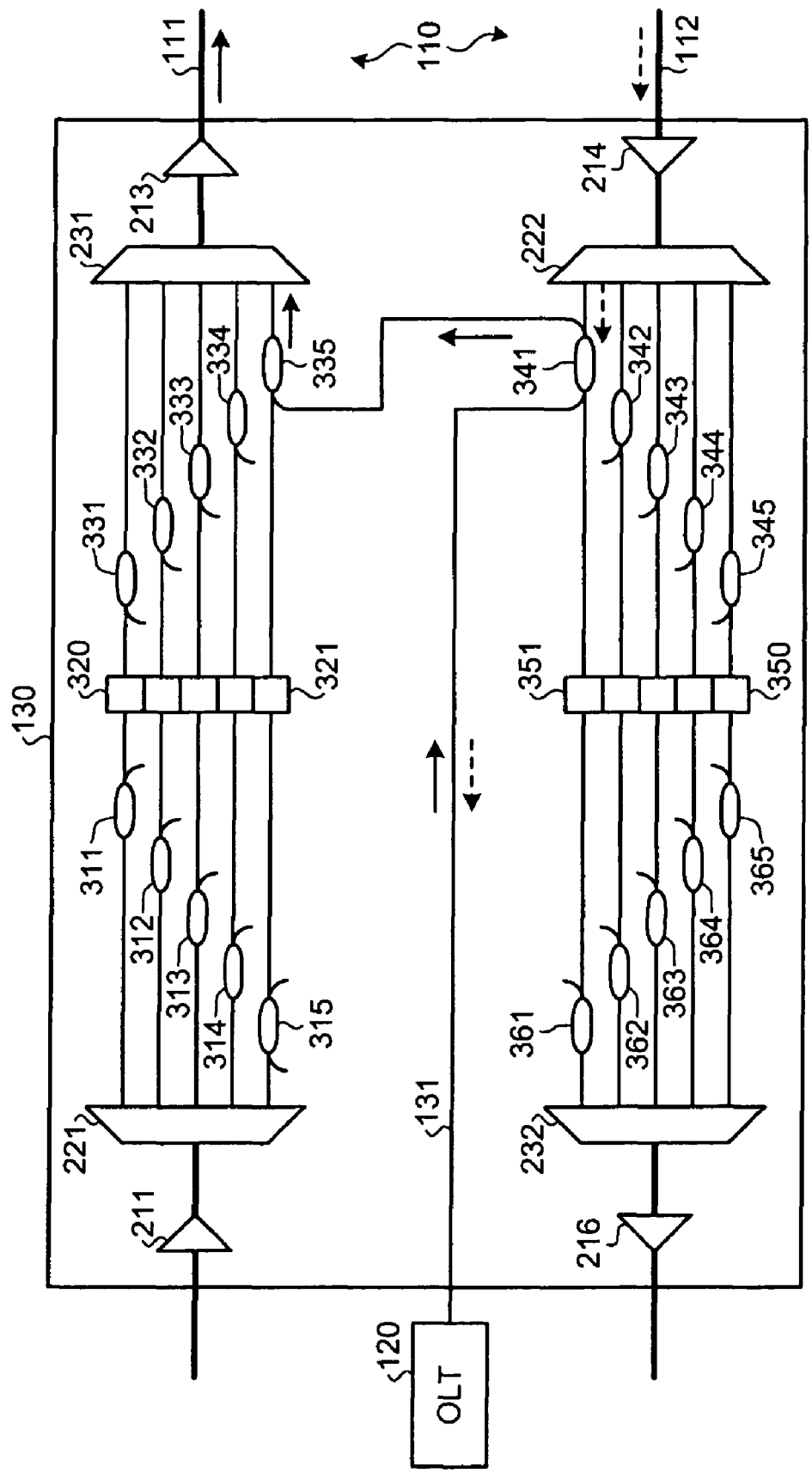
FIG. 5 is a block diagram of a modified example of the optical communicating apparatus depicted in FIG. 3.

FIG. 5 is a block diagram of a modified example of the optical communicating apparatus depicted in FIG. 3. In FIG. 5, components identical to those depicted in FIG. 3 are given identical reference numerals and description thereof is omitted. When the OSNR of optical signals transmitted and received between the OLT 120 and the ONUs 141 to 143 can be sufficiently secured, the path of the optical signals may be designed such that the optical signals do not pass through the SOA array 320 and the SOA array 350.

In this case, the optical coupler 335 is the inserting/branching unit 133 depicted in FIG. 2. The optical coupler 335 receives the optical signal output from the SOA 321 and the optical signal output from the optical coupler 341. The optical coupler 335 couples the input optical signals and outputs the coupled optical signals to the multiplexing unit 231 (Add/Through).

In this case, the optical coupler 341 is the inserting/branching unit 132 depicted in FIG. 2. The optical coupler 341 receives the optical signal output from the demultiplexing unit 222. The optical coupler 341 branches the input optical signal and outputs one of the branched optical signals to the one-core optical transmission path 131. The other of the optical signals branched by the optical coupler 361 is output to the multiplexing unit 232.

The optical coupler 341 receives the optical signal output from the one-core optical transmission path 131. The optical coupler 341 branches the input optical signal and outputs one of the branched optical signals to the optical coupler 335. The other of the optical signals branched by the optical coupler 341 is output to the demultiplexing unit 222. The light beam output from the optical coupler 341 to the demultiplexing unit 222 is preferably blocked by the demultiplexing unit 222. When the demultiplexing unit 222 is, for example, an AWG, the characteristic of the AWG is designed such that the wavelength component of the optical signal output from the optical coupler 341 is not output.

The optical signal output from the optical coupler 341 to the SOA 351 is preferably blocked by the multiplexing unit 232. When the multiplexing unit 232 is, for example, an AWG, the characteristic of the AWG is designed such that the wavelength component of the optical signal output from the optical coupler 341 is not output. In the configuration depicted in FIG. 5, the optical coupler 315 may be a 1×2 optical coupler. The optical coupler 361 may be a 2×1 optical coupler.

Figure 6:
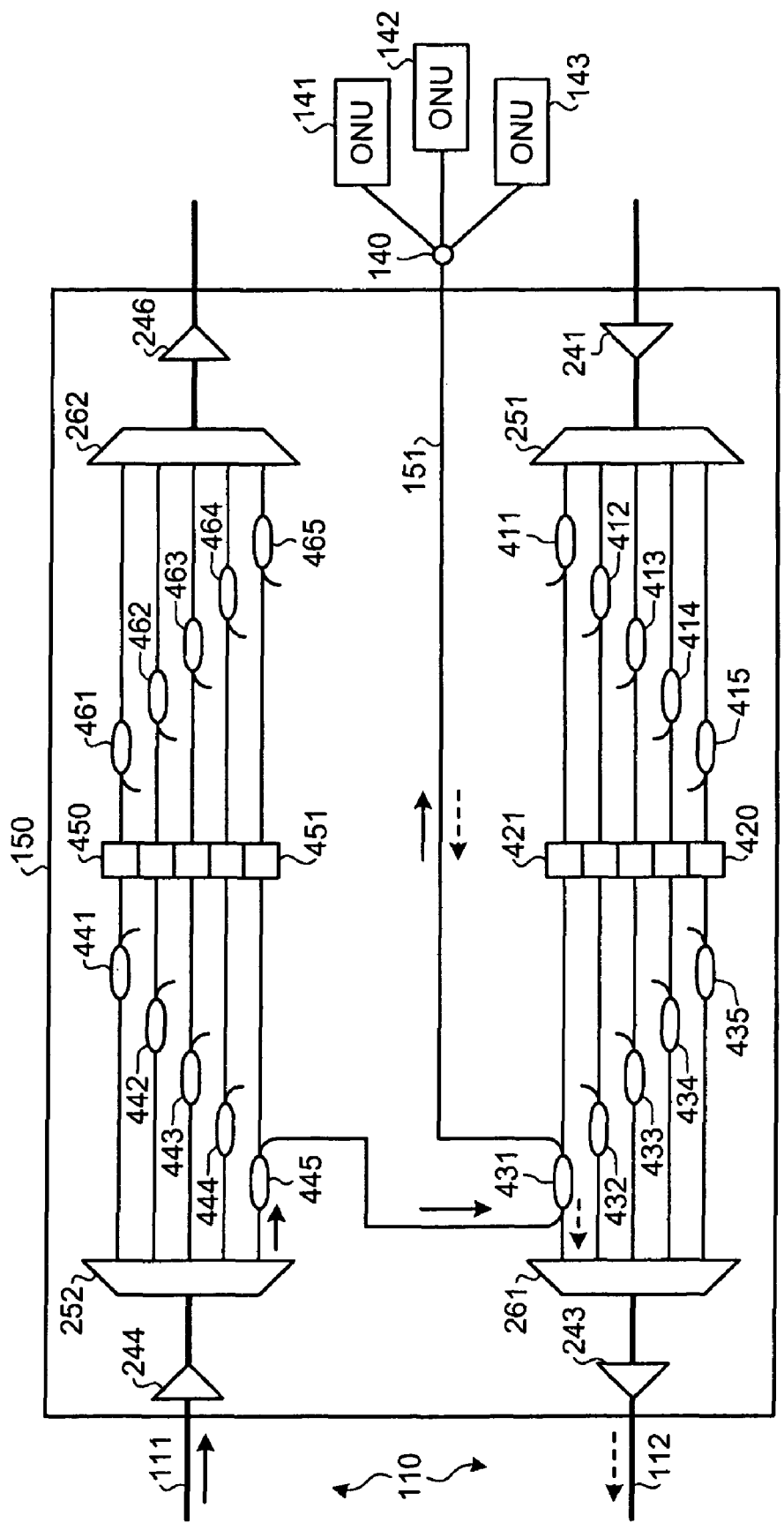
FIG. 6 is a block diagram of a modified example of the optical communicating apparatus depicted in FIG. 4.

FIG. 6 is a block diagram of a modified example of the optical communicating apparatus depicted in FIG. 4. In FIG. 5, components identical to those depicted in FIG. 4 are given identical reference numerals and description thereof is omitted. When the OSNR of optical signals transmitted and received between the OLT 120 and the ONUs 141 to 143 can be sufficiently saved, the path of the optical signals may be designed such that the optical signals do not pass through the SOA array 420 and the SOA array 450.

In this case, an optical coupler 431 is the inserting/branching unit 153 depicted in FIG. 2. The optical coupler 431 is a 2×2 optical coupler. The optical coupler 431 receives the optical signal output from a SOA 421 of the SOA array 420 and the optical signal output from the one-core optical transmission path 151. The optical coupler 431 branches the input optical signal.

The optical coupler 431 outputs one of the branched light beams to the multiplexing unit 261 (Add/Through). The other of the optical signals branched by the optical coupler 431 passes through the optical coupler 445 and is output to the demultiplexing unit 252. The optical signal output from the optical coupler 431 to the demultiplexing unit 252 is preferably blocked by the demultiplexing unit 252.

The optical coupler 431 receives the optical signal output from the optical coupler 445. The optical coupler 431 branches the input optical signals and outputs one of the branched optical signals to the one-core optical transmission path 151. The other of the optical signals branched by the optical coupler 431 is output to the SOA 421 of the SOA array 420. The optical signal output from the optical coupler 431 to the SOA 421 is preferably blocked by, for example, an optical isolator incorporated in the SOA 421.

In this case, the optical coupler 445 is the inserting/branching unit 152 depicted in FIG. 2. The optical coupler 445 receives the optical signal output from the demultiplexing unit 252. The optical coupler 445 branches the input optical signal and outputs one of the branched optical signals to the optical coupler 431. The other one of the optical signals branched by the optical coupler 445 is output to the SOA 451.

The optical signal output from the optical coupler 445 to the SOA 451 is preferably blocked by the multiplexing unit 262. When the multiplexing unit 262 is, for example, an AWG, the characteristic of the AWG is designed such that the wavelength component of the optical signal output from the optical coupler 465 is not output. In the configuration depicted in FIG. 6, the optical coupler 411 may be a 1×2 optical coupler. The optical coupler 465 may be a 2×1 optical coupler.

Figure 7:
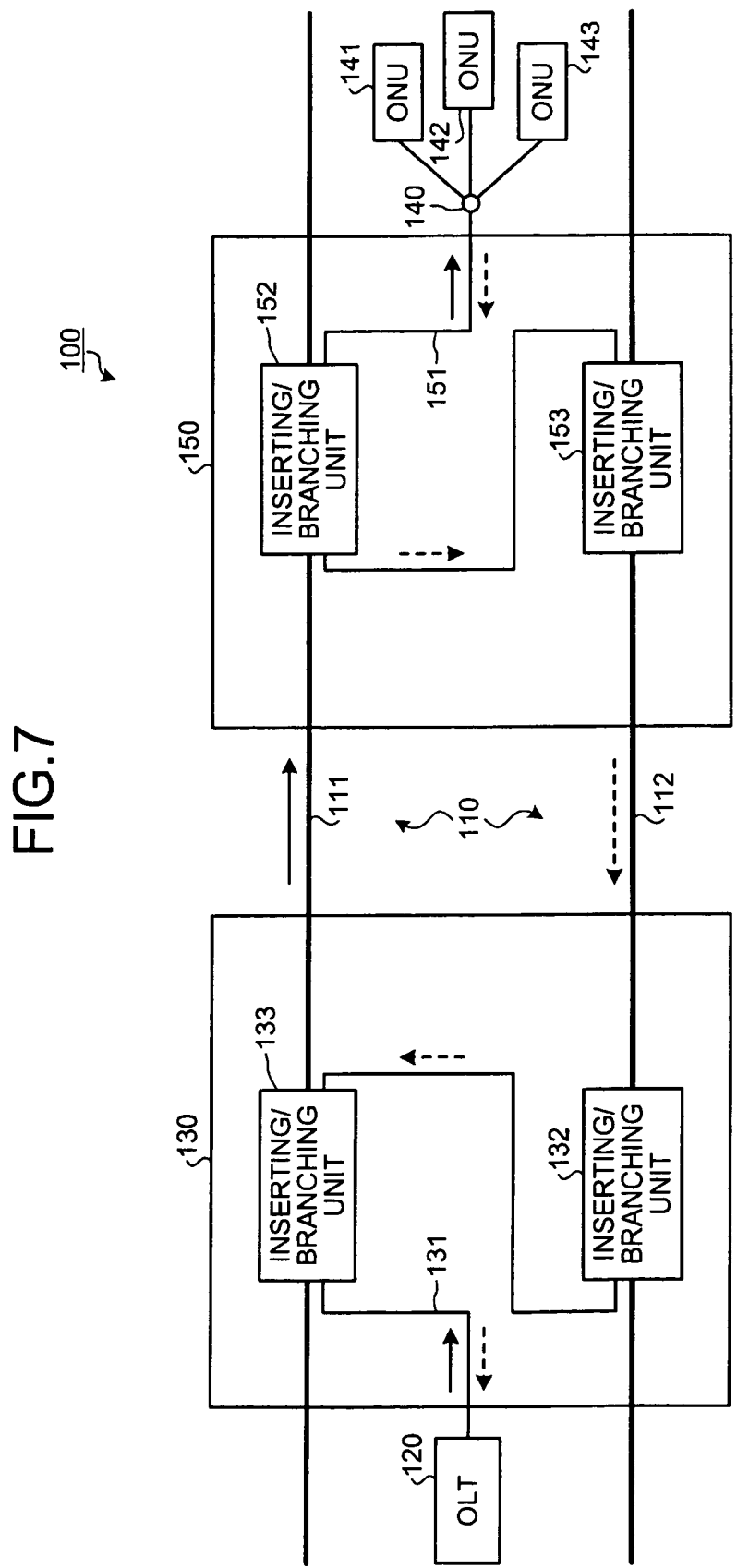
FIG. 7 is a block diagram of a modified example of the optical communication system depicted in FIG. 1.

FIG. 7 is a block diagram of a modified example of the optical communication system depicted in FIG. 1. In FIG. 7, components identical to those depicted in FIG. 1 are given identical reference numerals and description thereof is omitted. In this case, one end of the one-core optical transmission path 131 is connected to the OLT 120 and the other end is connected to the inserting/branching unit 133. The one-core optical transmission path 131 passes an optical signal transmitted from the OLT 120, to the inserting/branching unit 133. The one-core optical transmission path 131 passes an optical signal output from the inserting/branching unit 133, to the OLT 120.

The inserting/branching unit 132 branches the received optical signal from the second core 112 and outputs the branched optical signal to the inserting/branching unit 133.

The inserting/branching unit 133 branches the optical signal output from the inserting/branching unit 132 and passes the branched optical signal to the one-core optical transmission path 131. The inserting/branching unit 133 inserts into the first core 111 the optical signal that is transmitted from the OLT 120 and that passes through the one-core optical transmission path 131, and the inserting/branching unit 133 transmits the inserted optical signal.

One end of the one-core optical transmission path 151 is connected to the branching unit 140 and the other end is connected to the inserting/branching unit 152. The one-core optical transmission path 151 passes the optical signal transmitted from the branching unit 140, to the inserting/branching unit 152. The one-core optical transmission path 151 passes the optical signal output from the inserting/branching unit 152, to the branching unit 140.

The inserting/branching unit 152 passes the optical signal branched from the first core 111, to the one-core optical transmission path 151. The inserting/branching unit 152 branches the optical signal output from the one-core optical transmission path 151 and outputs the branched optical signal to the inserting/branching unit 153. The inserting/branching unit 153 inserts into the second core 112 the optical signal output from the inserting/branching unit 152, and transmits the inserted optical signal.

Though not depicted, in the configuration of the optical communication system 100 depicted in FIG. 7, the optical communicating apparatus 130 may be replaced with the optical communicating apparatus 130 depicted in FIG. 1. In the configuration of the optical communication system 100 depicted in FIG. 7, the optical communicating apparatus 150 may be replaced with the optical communicating apparatus 150 depicted in FIG. 1.

In the optical communicating apparatus 130 depicted in FIG. 1, the optical signals transmitted from the OLT 120 to the ONUs 141 to 143 (DownLink optical signal) pass through both of the inserting/branching units 132 and 133. The optical signals transmitted from the ONUs to the OLT 120 (UpLink optical signal) pass through the inserting/branching unit 132 and do not pass through the inserting/branching unit 133. Therefore, the loss of the optical signal in the downlink becomes larger than the uplink.

On the other hand, in the optical communicating apparatus 130 depicted in FIG. 7, the DownLink optical signals pass through the inserting/branching unit 133 and do not pass the inserting/branching unit 132. The UpLink optical signals pass through both of the inserting/branching units 132 and 133. Therefore, the loss of the optical signal in the downlink becomes smaller than the uplink.

The power balance between the DownLink optical signal and the UpLink optical signal may be adjusted utilizing the structures explained above. Generally, optical signals with different wavelengths cause different losses on a transmission path. For example, when the wavelength λ1 for the DownLink has a smaller loss than the wavelength λ2 for the UpLink, the optical communicating apparatus 130 in FIG. 1 is used.

On the contrary, when the wavelength λ1 for the DownLink has a larger loss than the wavelength λ2 for the UpLink, the optical communicating apparatus 130 in FIG. 7 is used. Thereby, the power of each of the optical signals for DownLink and UpLink can be uniformed. Similarly, the power balance of the optical signals for the DownLink and the UpLink can be adjusted by choosing the optical communicating apparatus 150 in FIG. 1 or the optical communicating apparatus 150 in FIG. 7.

Figure 8:
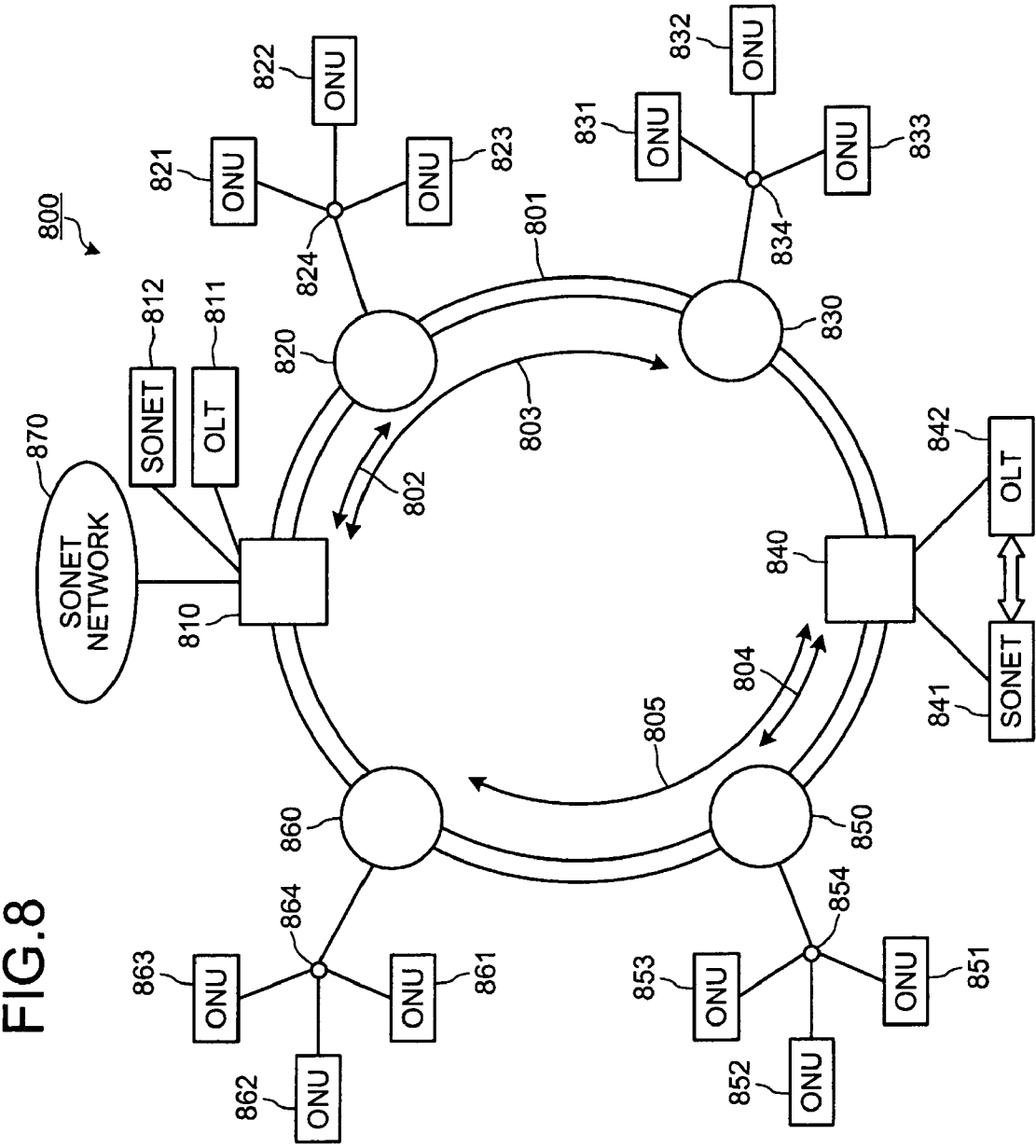
FIG. 8 is a block diagram of an example of an optical communication system according to the first embodiment.

FIG. 8 is a block diagram of an example of an optical communication system according to the first embodiment. An optical communication system 800 depicted in FIG. 8 is a SONET network. In the optical communication system 800, inserting/branching nodes 810, 820, 830, 840, 850, and 860 are connected in ring form by a two-core optical transmission path 801. The two-core optical transmission path 801 is, for example, the two-core optical transmission path 110 depicted in FIG. 2.

An OLT 811 and a SONET transmitter/receiver 812 are connected to the inserting/branching node 810. An OLT 841 and a SONET transmitter/receiver 842 are connected to the inserting/branching node 840. The SONET transmitter/receiver 812 and the SONET transmitter/receiver 842 execute a SONET-scheme communication using the two-core optical transmission path 801.

The inserting/branching node 810 is connected to an upper SONET network 870. The SONET transmitter/receiver 812 executes a SONET-scheme communication with the SONET network 870. The inserting/branching node 810 is, for example, the optical communicating apparatus 130 depicted in FIG. 2. In this case, the OLT 811 is the OLT 120 depicted in FIG. 2.

The inserting/branching node 820 is connected to ONUs 821 to 823 through a branching unit 824. The inserting/branching node 830 is connected to ONUs 831 to 833 through a branching unit 834. Each of the inserting/branching nodes 820 and 830 is, for example, the optical communicating apparatus 150 depicted in FIG. 2. In this case, each group of the ONUs 821 to 823 and the ONUs 831 to 833 is the ONUs 141 to 143 depicted in FIG. 2.

As indicated by a bilateral arrow 802, the inserting/branching node 810 realizes the bilateral optical communication system 100 (see, e.g., FIG. 2) with the inserting/branching node 820. As indicated by a bilateral arrow 803, the inserting/branching node 810 realizes the bilateral optical communication system 100 (see, e.g., FIG. 2) with the inserting/branching node 830.

The inserting/branching node 840 is, for example, the optical communicating apparatus 130 depicted in FIG. 2. In this case, the OLT 841 is the OLT 120 depicted in FIG. 2. ONUs 851 to 853 are connected to the inserting/branching node 850 through a branching unit 854. ONUs 861 to 863 are connected to the inserting/branching node 860 through a branching unit 864.

Each of the inserting/branching nodes 850 and 860 is, for example, the optical communicating apparatus 150 depicted in FIG. 2. In this case, each group of the ONUs 851 to 853 and the ONUs 861 to 863 is the ONUs 141 to 143 depicted in FIG. 2.

As indicated by a bilateral arrow 804, the inserting/branching node 840 realizes the bilateral optical communication system 100 (see, e.g., FIG. 2) with the inserting/branching node 850. As indicated by a bilateral arrow 805, the inserting/branching node 840 realizes the bilateral optical communication system 100 (see, e.g., FIG. 2) with the inserting/branching node 860.

A SONET-scheme optical communication system and a PON-scheme communication system may be connected by executing communication between the OLT 841 and the SONET transmitter/receiver 842. For example, the SONET transmitter/receiver 842 transmits to the OLT 841 a signal (optical or electric signal) based on an optical signal received in the SONET scheme from the SONET transmitter/receiver 812.

The OLT 841 converts the signal transmitted from the SONET transmitter/receiver 842 into a PON-scheme optical signal, and transmits the converted signal in the PON scheme to the ONUs 851 to 853 or the ONUs 861 to 863. The OLT 841 transmits to the SONET transmitter/receiver 842 a signal based on an optical signal received in the PON scheme from the ONUs 851 to 853 or the ONUs 861 to 863.

The SONET transmitter/receiver 842 converts the signal received from the OLT 841 into a SONET-scheme optical signal and transmits the converted signal in the SONET scheme to the SONET transmitter/receiver 812. Thereby, in the two-core optical transmission path 801, the SONET-scheme optical communication system and the PON-scheme optical communication system can coexist. The SONET-scheme optical communication system and the PON-scheme optical communication system that coexist can seamlessly be connected.

Figure 9:
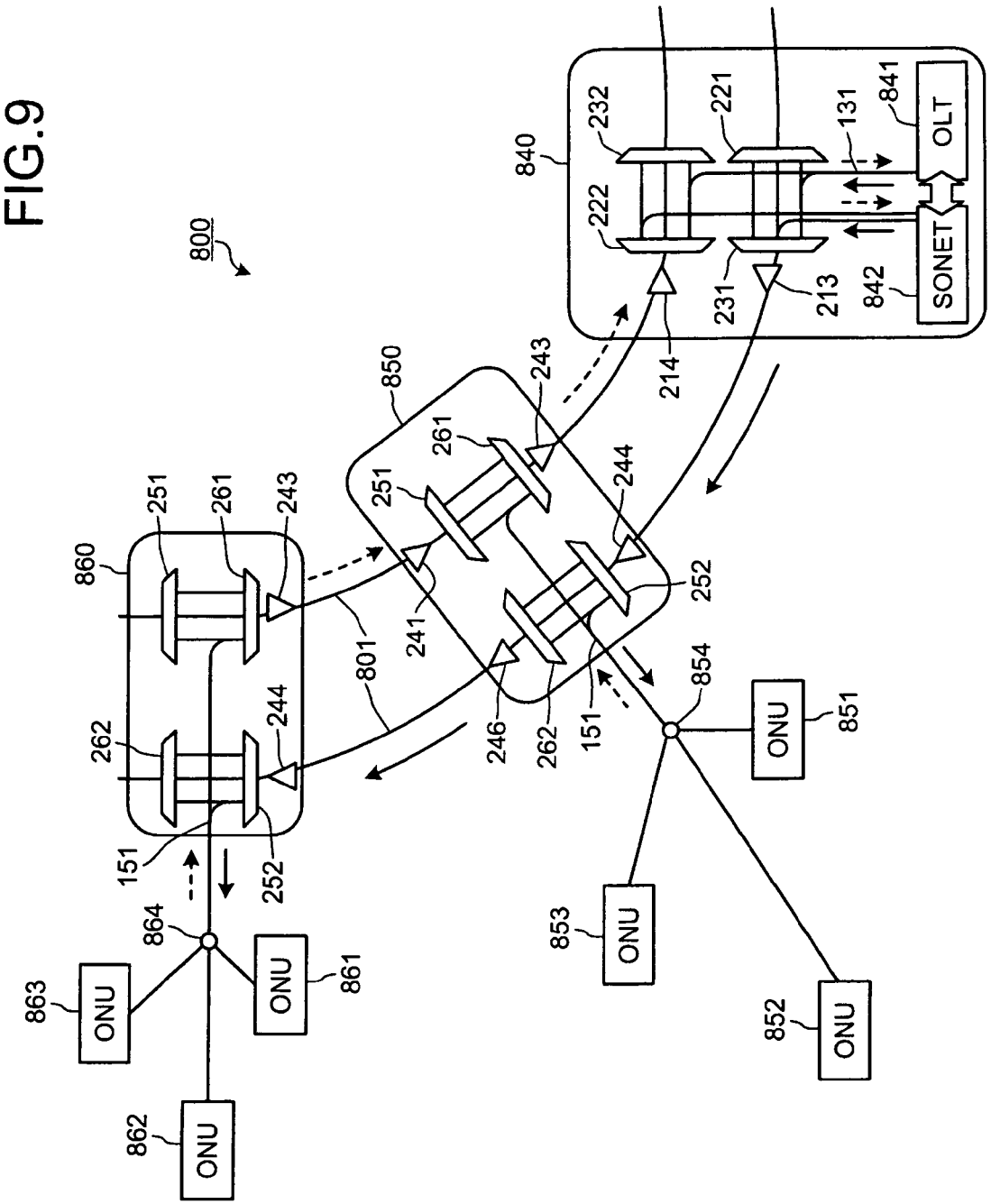
FIG. 9 is a block diagram of details of a portion of the optical communication system depicted in FIG. 8.

FIG. 9 is a block diagram of details of a portion of the optical communication system depicted in FIG. 8. In FIG. 9, components identical to those depicted in FIG. 2 or 8 are given identical reference numerals and description thereof is omitted. FIG. 9 depicts the inserting/branching nodes 840, 850, and 860 of the optical communication system 800 depicted in FIG. 8. It is assumed that the inserting/branching node 840 is the optical communicating apparatus 130 depicted in FIG. 2. The configuration of the inserting/branching node 840 is simplified.

The configuration including the OLT 841 and the SONET transmitter/receiver 842 provided inside the inserting/branching node 840 is depicted. The OLT 841 is the OLT 120 depicted in FIG. 2. The SONET transmitter/receiver 842 executes the SONET-scheme communication with the SONET transmitter/receiver 812 (see FIG. 8) through the inserting/branching nodes 840 and 860.

Optical signals transmitted and received between the SONET transmitter/receivers 842 and 812 go through the inserting/branching nodes 840 and 860. The OLT 841 executes the PON-scheme communication with the ONUs 851 to 853 and 861 to 863. Optical signals transmitted from the OLT 841 to the ONUs 851 to 853 are "dropped" at the inserting/branching node 850 and the optical signal is output to the branching unit 854.

Optical signals transmitted from the ONUs 851 to 853 to the OLT 841 are "added" at the inserting/branching node 850 and the optical signals are transmitted to the OLT 841. Optical signals transmitted from the OLT 841 to the ONUs 861 to 863 are "dropped" at the inserting/branching node 860 and the optical signals are output to the branching unit 864. Optical signals transmitted from the ONUs 861 to 863 to the OLT 841 are "added" at the inserting/branching node 860 and the optical signals are transmitted to the OLT 841.

The configuration where the ONUs 851 to 853 and the branching unit 854 are provided outside the inserting/branching node 850 has been described. However, the ONUs 851 to 853 and the branching unit 854 may be included in the inserting/branching node 850. Similarly, the ONUs 861 to 863 and the branching unit 864 may be provided inside the inserting/branching node 860.

Figure 10:
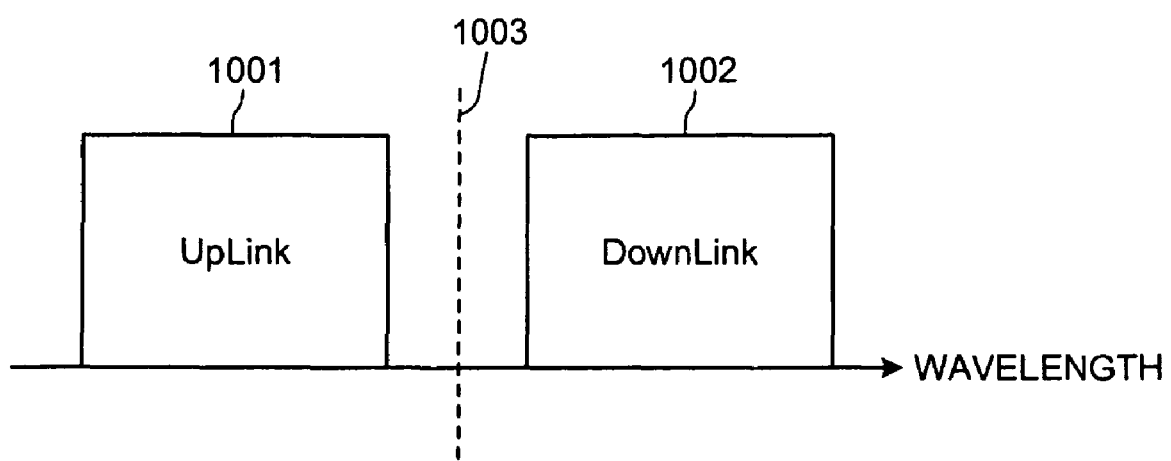
FIG. 10 is a diagram of wavelength allocation for each optical signal transmitted and received between the OLT and the ONUs.

FIG. 10 is a diagram of wavelength allocation for each optical signal transmitted and received between the OLT and the ONUs. In FIG. 10, the axis of abscissa represents the wavelength. A reference numeral "1001" denotes a wavelength band of an optical signal (UpLink) transmitted from the ONUs 141 to 143 (see, e.g., FIG. 1) to the OLT 120. A reference numeral "1002" denotes a wavelength band of an optical signal (DownLink) transmitted from the OLT 120 (see, e.g., FIG. 1) to the ONUs 141 to 143.

The wavelength $\lambda 2$ of the optical signal transmitted from the ONUs 141 to 143 to the OLT 120 is configured to be included in the wavelength band 1001. The wavelength $\lambda 1$ of the optical signal transmitted from the OLT 120 to the ONUs 141 to 143 is configured to be included in the wavelength band 1002. An unused band is provided between the wavelength bands 1001 and 1002.

The OLT 120 and the ONUs 141 to 143 each incorporate therein a wavelength decoupler that couples and decouples optical signals using an unused wavelength 1003 included in the unused band as a border. The OLT 120 transmits and receives optical signals passing through the one-core optical transmission path 131 by coupling and decoupling the optical signals by the incorporated wavelength decoupler. The ONUs 141 to 143 each transmit and receive optical signals passing through the one-core optical transmission path 151 by coupling and decoupling the optical signals by the incorporated wavelength decouplers.

Figure 11:
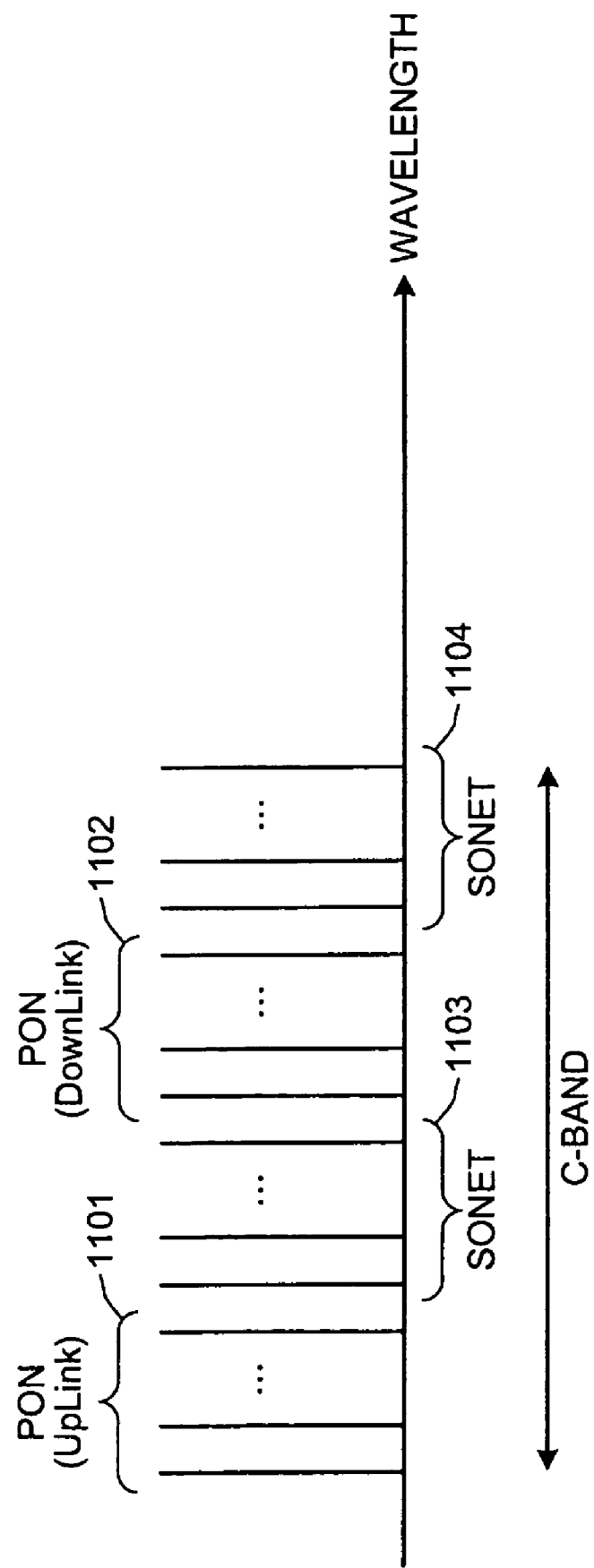
FIG. 11 is a diagram of a first specific example of the wavelength allocation depicted in FIG. 10.

FIG. 11 is a diagram of a first specific example of the wavelength allocation depicted in FIG. 10. For example, the wavelengths of the optical signals are allocated within a C-Band, as denoted by reference numerals "1101" to "1104". The reference numeral "1101" denotes the wavelength allocation of the optical signals transmitted from the ONUs 141 to 143 to the OLT 120 (UpLink in the PON scheme). The reference numeral "1102" denotes the wavelength allocation of the optical signals transmitted from the OLT 120 to the ONUs 141 to 143 (DownLink in the PON scheme).

The reference numerals "1103" and "1104" denote the wavelength allocation of the optical signals transmitted and received in the SONET scheme between the SONET transmitter/receiver 812 and the SONET transmitter/receiver 842. In FIG. 11, the reference numerals "1101", "1102", "1103", and "1104" are arranged from the shorter wavelength side (with the numeral reference 1101 denoting the shortest wavelength). The wavelength allocation denoted by the reference numerals 1101 to 1104 is performed according to the Dense WDM (DWDM) which densely uses each wavelength.

Figure 12:
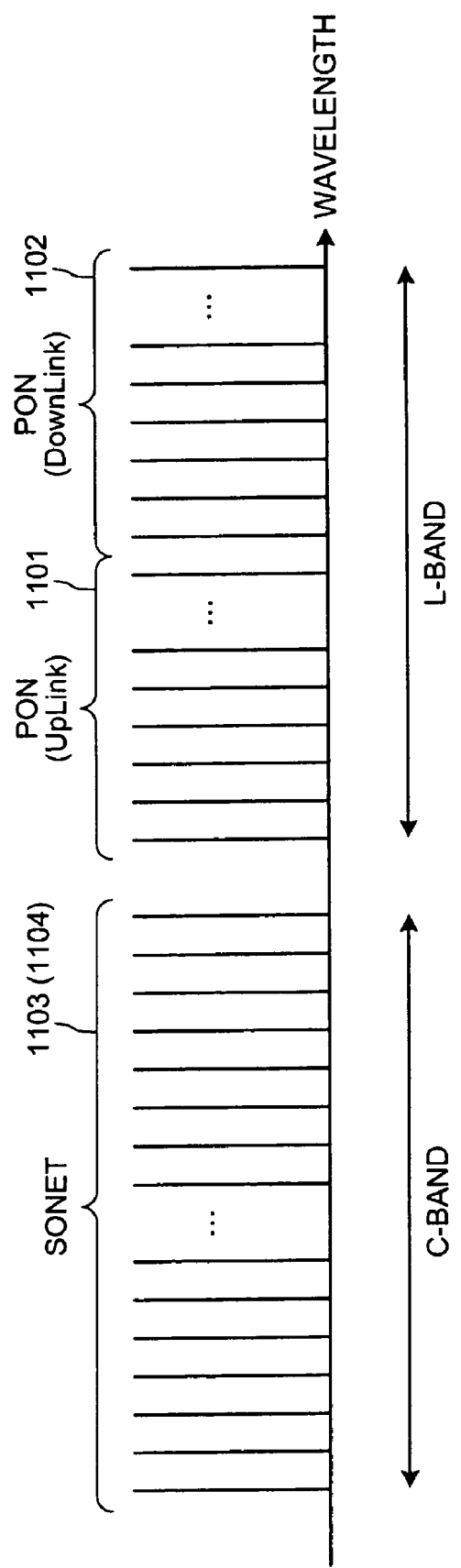
FIG. 12 is a diagram of a second specific example of the wavelength allocation depicted in FIG. 10.

FIG. 12 is a diagram of a second specific example of the wavelength allocation depicted in FIG. 10. In FIG. 12, portions identical to those depicted in FIG. 11 are given identical reference numerals and description thereof is omitted. As denoted by the reference numeral "1103 (1104)" of FIG. 12, the wavelength allocation of the optical signals transmitted and received in the SONET scheme between the SONET transmitter/receivers 812 and 842 is set within a C-Band.

As denoted by the reference numerals "1101" and "1102", the wavelength allocation of the uplink in the PON-scheme and the downlink in the PON-scheme is set within the L-Band. In this case, the reference numerals "1103", "1101", and "1102" are arranged from the shorter wavelength side (with the numeral reference 1103 denoting the shortest wavelength). The-wavelength allocation denoted by the reference numerals 1101 to 1103 is performed according to the DWDM which densely uses each wavelength.

Figure 13:
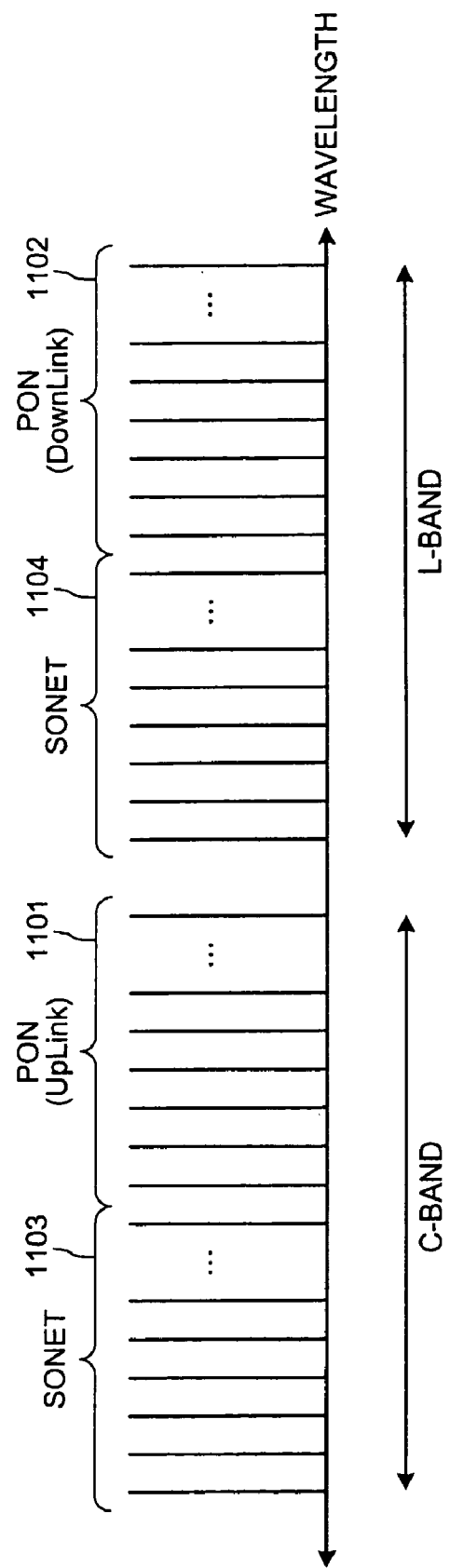
FIG. 13 is a diagram of a third specific example of the wavelength allocation depicted in FIG. 10.

FIG. 13 is a diagram of a third specific example of the wavelength allocation depicted in FIG. 10. In FIG. 13, portions identical to those depicted in FIG. 11 are given identical reference numerals and description thereof is omitted. As denoted by the reference numerals "1101" and "1103" of FIG. 13, the wavelength allocation of the uplink in the PON-scheme and of the optical signals transmitted and received in the SONET scheme between the SONET transmitter/receivers 812 and 842 is set within the C-Band.

As denoted by the reference numerals "1104" and "1102", the wavelength allocation of the downlink in the PON-scheme and of the optical signals transmitted and received in the SONET scheme between the SONET transmitter/receivers 812 and 842 is set within the L-Band. In this case, the reference numerals "1103", "1101", "1104", and "1102" are arranged from the shorter wavelength side (with the numeral reference 1103 denoting the shortest wavelength). The wavelength allocation denoted by the reference numerals 1101 to 1104 is performed according to the DWDM which densely uses each wavelength.

Figure 14:
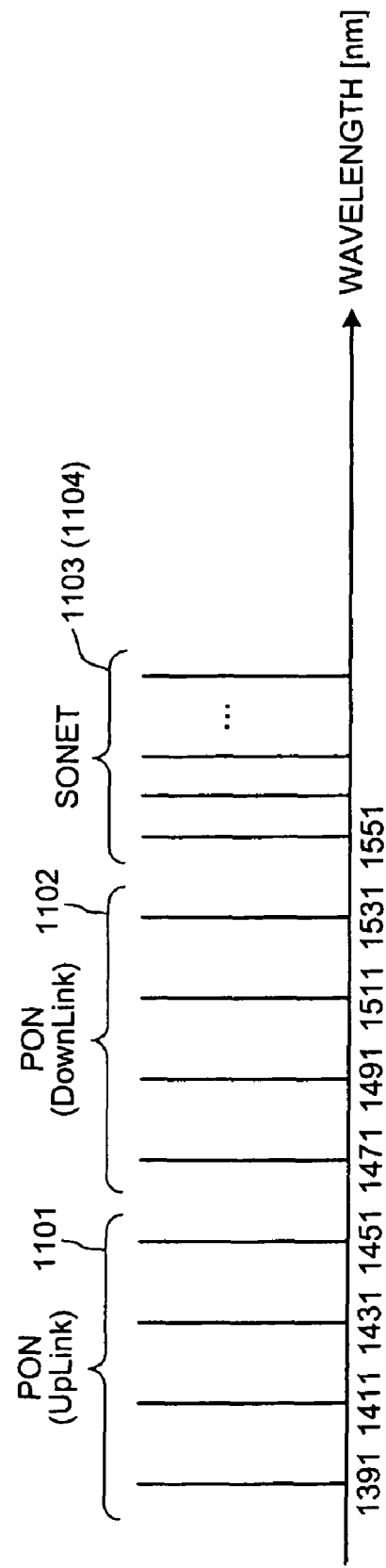
FIG. 14 is a diagram of a fourth specific example of the wavelength allocation depicted in FIG. 10.

FIG. 14 is a diagram of a fourth specific example of the wavelength allocation depicted in FIG. 10. In FIG. 14, portions identical to those depicted in FIG. 11 are given identical reference numerals and description thereof is omitted. As denoted by the reference numerals "1101" and "1102" of FIG. 14, the uplink in the PON-scheme and the downlink in the PON-scheme are set according to the DWDM.

As denoted by the reference numeral "1103 (1104)", the wavelength allocation of the optical signals transmitted and received in the SONET scheme between the SONET transmitter/receivers 812 and 842 is set according to the CWDM (Coarse WDM) which coarsely uses each wavelength. In this case, the reference numerals "1101", "1102", and "1103" are arranged from the shorter wavelength side (with the numeral reference 1101 denoting the shortest wavelength).

As above, according to the optical communication system 100 and the optical communicating apparatuses 130 and 150, the optical communicating apparatus 130 branches the optical signal from the second core 112 of the two-core optical transmission path 110, passes the branched optical signal to the one-core optical transmission path 131, branches the optical signal that is transmitted from the OLT 120 and passes through the one-core optical transmission path 131, and transmits the branched optical signal through the first core 111.

The optical communicating apparatus 150 branches the optical signal transmitted through the first core 111 of the two-core optical transmission path 110, passes the branched optical signal to the one-core optical transmission path 151, and transmits, through the second core, the optical signal that is transmitted from any one of the ONUs 141 to 143 and passes through the one-core optical transmission path 151 in this way, the one-core bilateral communication between the OLT 120 and the ONUs 141 to 143 can be executed using the two-core optical transmission path 110.

Therefore, the flexibility of the network design can be improved. For example, a PON-scheme optical communicating apparatus can be overlaid on a SONET-scheme optical communication system. Therefore, low-cost and high-transmission-efficiency PON-scheme communication can be executed utilizing hardware resources of an existing SONET-scheme optical communication system.

As depicted in FIGS. 8 and 9, a PON-scheme optical communication system realized in an existing SONET-scheme optical communication system can coexist with a SONET-scheme optical communication system. Furthermore, a PON-scheme optical communication system realized in a SONET-scheme optical communication system can be seamlessly connected to a SONET-scheme optical communication system. Therefore, the flexibility of the network design can be further improved.

The optical communicating apparatuses 130 and 150 can be realized with almost no modification of the configuration of the existing inserting/branching nodes. For example, the optical communicating apparatus 130 depicted in FIG. 2 can be realized only by connecting the one-core optical transmission path 131 and the inserting/branching unit 133 to the existing inserting/branching unit 132 and providing the amplifiers 212 and 215 on the existing inserting/branching unit 132. As mentioned above, the amplifiers 212 and 215 may be omitted.

More specifically, for example, the optical communicating apparatus 130 depicted in FIG. 3 can be realized only by: replacing the optical coupler 315 that conventionally is a 1×2 coupler, with a 2×2 coupler; replacing the optical coupler 361 that conventionally is a 2×1 coupler, with a 2×2 coupler; and connecting the optical coupler 361 to the one-core optical transmission path 131 and the optical coupler 315. Therefore, the flexibility of the network design can be further improved using a low-cost and simple configuration.

Figure 15:
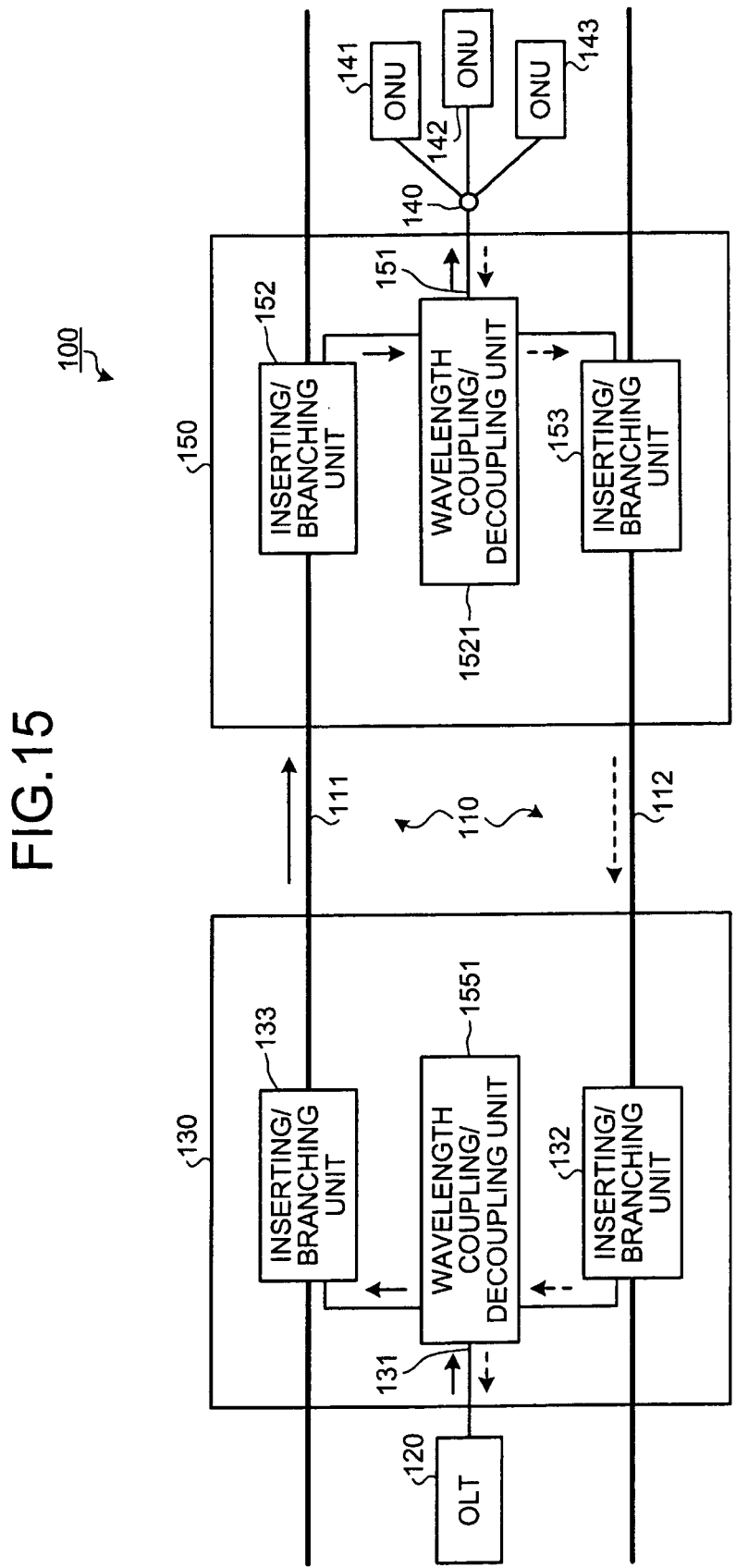
FIG. 15 is a block diagram of a functional configuration of an optical communication system according to a second embodiment.

FIG. 15 is a block diagram of a functional configuration of an optical communication system according to a second embodiment. In FIG. 15, components identical to those depicted in FIG. 1 are given identical numerals and description thereof is omitted. In addition to the configuration of the optical communicating apparatus 130 depicted in FIG. 1, the optical communicating apparatus 130 of the optical communication system 100 according to the second embodiment includes a wavelength coupling/decoupling unit 1511. In addition to the configuration of the optical communicating apparatus 150 depicted in FIG. 1, the optical communicating apparatus 150 of the optical communication system 100 according to the second embodiment includes a wavelength coupling/decoupling unit 1521.

The inserting/branching unit 132 outputs the optical signal branched from the second core 112 to the wavelength coupling/decoupling unit 1511. The one-core optical transmission path 131 passes the optical signal transmitted from the OLT 120 and outputs the optical signal to the wavelength coupling/decoupling unit 1511. The one-core optical transmission path 131 transmits the optical signal output from the wavelength coupling/decoupling unit 1511, to the OLT 120.

The wavelength coupling/decoupling unit 1511 decouples the optical signal of wavelength λ1 output from the one-core optical transmission path 131 and outputs the decoupled optical signal to the inserting/branching unit 133 (transmitting unit). The wavelength coupling/decoupling unit 1511 also couples the optical signal of the wavelength λ2 output from the inserting/branching unit 132 (receiving unit) and outputs the coupled optical signal to the one-core optical transmission path 131. The inserting/branching unit 133 inserts the optical signal output from the wavelength coupling/decoupling unit 1511 into the first core 111, and transmits the inserted optical signal to the optical communicating apparatus 150.

The inserting/branching unit 152 outputs the optical signal branched from the first core 111 to the wavelength coupling/decoupling unit 1521. The one-core optical transmission path 151 passes the optical signal transmitted from the branching unit 140 and outputs the optical signal to the wavelength coupling/decoupling unit 1521. The one-core optical transmission path 151 passes the optical signal output from the wavelength coupling/decoupling unit 1521 and transmits the optical signal to the branching unit 140.

The wavelength coupling/decoupling unit 1521 decouples the optical signal of wavelength λ2 output from the one-core optical transmission path 151 and outputs the decoupled optical signal to the inserting/branching unit 153 (transmitting unit). The wavelength coupling/decoupling unit 1521 also couples the optical signal of the wavelength λ1 output from the inserting/branching unit 152 (receiving unit) and outputs the coupled optical signal to the one-core optical transmission path 151. The inserting/branching unit 153 inserts the optical signal output from the wavelength coupling/decoupling unit 1521 into the second core 112, and transmits the inserted optical signal to the optical communicating apparatus 130.

Figure 16:
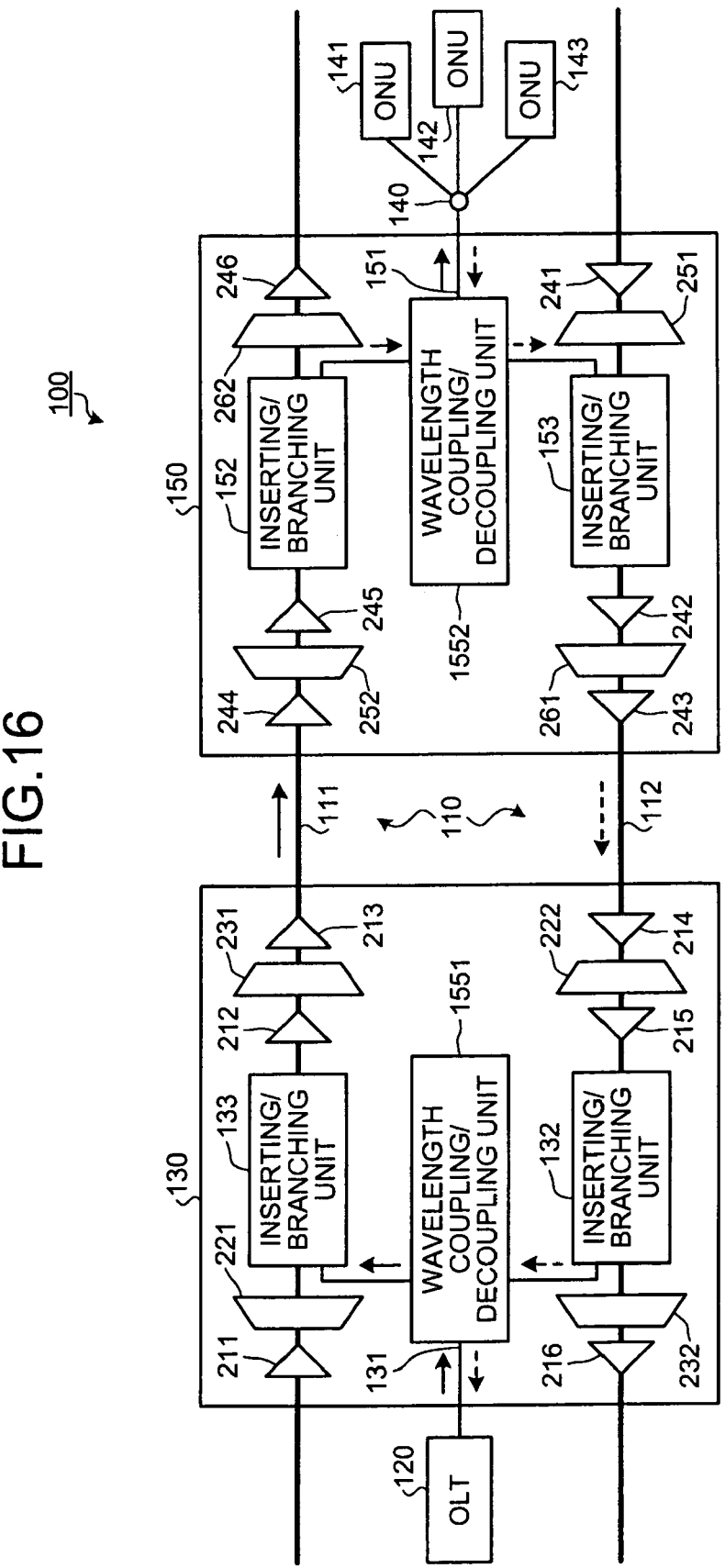
FIG. 16 is a block diagram of a specific configuration of the optical communication system depicted in FIG. 15.

FIG. 16 is a block diagram of a specific configuration of the optical communication system depicted in FIG. 15. In FIG. 16, components identical to those depicted in FIG. 2 or 15 are given identical reference numerals and description thereof is omitted. As depicted in FIG. 16, in addition to the configuration of the optical communicating apparatus 130 depicted in FIG. 15, the optical communicating apparatus 130 includes amplifiers 211 to 216, demultiplexing units 221 and 222, and multiplexing units 231 and 232 (see the description for FIG. 2).

In addition to the configuration of the optical communicating apparatus 150 depicted in FIG. 15, the optical communicating apparatus 150 depicted in FIG. 16 includes amplifiers 241 to 246, demultiplexing units 251 and 252, and multiplexing units 261 and 262 (see the description for FIG. 2).

Figure 17:
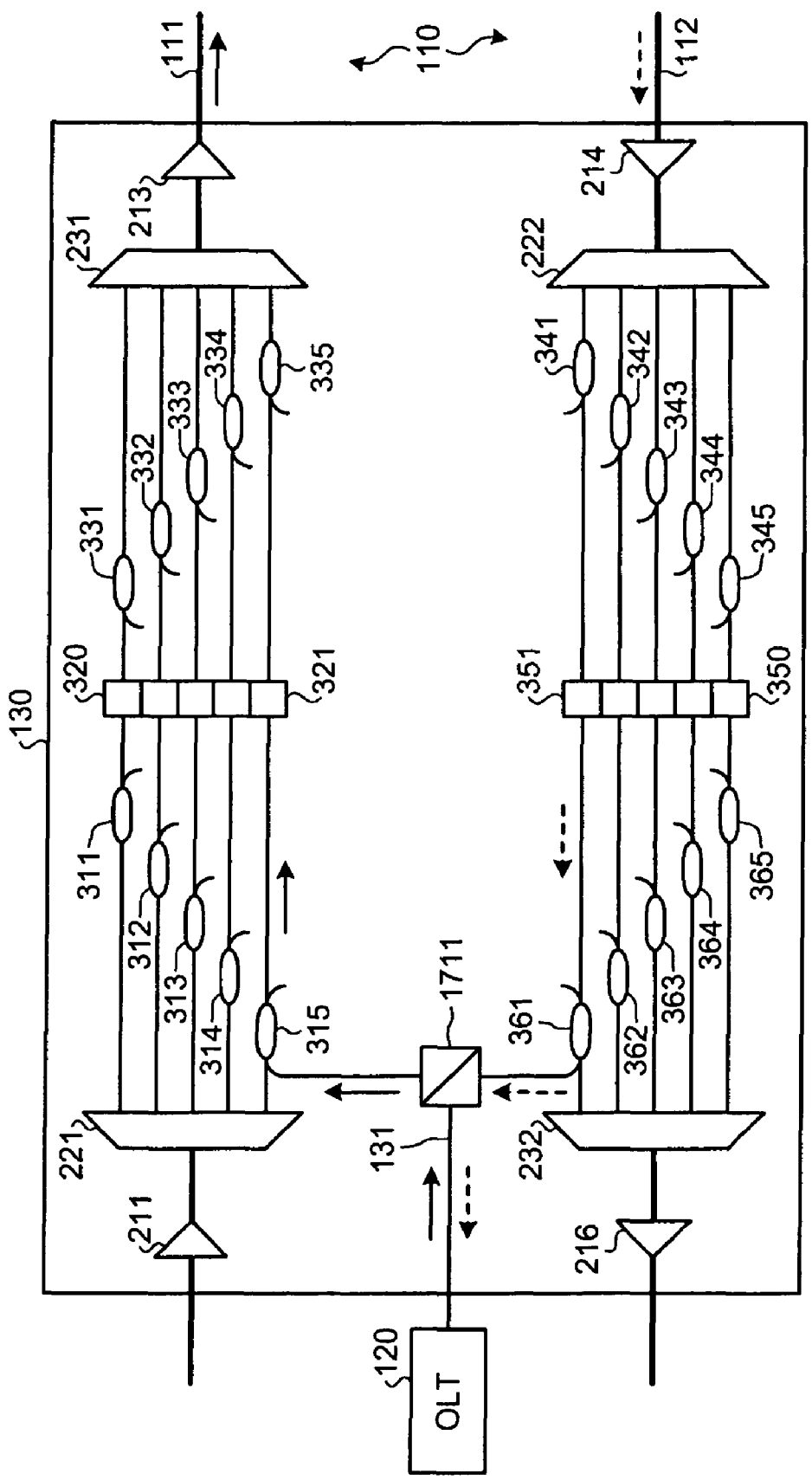
FIG. 17 is a block diagram of a specific example of an optical communicating apparatus at the former stage depicted in FIG. 16.

FIG. 17 is a block diagram of a specific example of an optical communicating apparatus at the former stage depicted in FIG. 16. In FIG. 17, components identical to those depicted in FIG. 3 or 16 are given identical reference numerals and description thereof is omitted. FIG. 17 depicts a specific example of the configuration between the demultiplexing unit 221 and the multiplexing unit 231 and the configuration between the demultiplexing unit 222 and the multiplexing unit 232 of the optical communicating apparatus 130 in FIG. 16. In FIG. 17, the optical communicating apparatus 130 includes a wavelength decoupler 1711 as the wavelength coupling/decoupling unit 1511 in FIG. 16.

The one-core optical transmission path 131 passes the optical signal transmitted from the OLT 120, outputs the optical signal to the wavelength decoupler 1711, and transmits the optical signal output from the wavelength decoupler 1711 to the OLT 120. The wavelength decoupler 1711 decouples the optical signal of the wavelength λ1 output from the one-core optical transmission path 131, outputs the optical signal to the optical coupler 315, couples the optical signal of the wavelength λ2 output from the optical coupler 361, and outputs the optical signal to the one-core optical transmission path 131.

The optical couplers 311 to 315, the SOA array 320, and the optical couplers 331 to 335 are provided between the demultiplexing unit 221 and the multiplexing unit 231 (see the description for FIG. 3). The optical coupler 315 receives the optical signal output from the demultiplexing unit 221 and the optical signal output from the wavelength decoupler 1711.

The optical couplers 341 to 345, the SOA array 350, and the optical couplers 361 to 365 are provided between the demultiplexing unit 222 and the multiplexing unit 232 (see the description for FIG. 3). The optical coupler 361 outputs one of the branched optical signals to the wavelength decoupler 1711. In this case, the optical signal output from the one-core optical transmission path 131 is branched by the wavelength decoupler 1711 and is output to the optical coupler 315 and thus the optical signal is not input into the optical coupler 361, 0137

Figure 18:
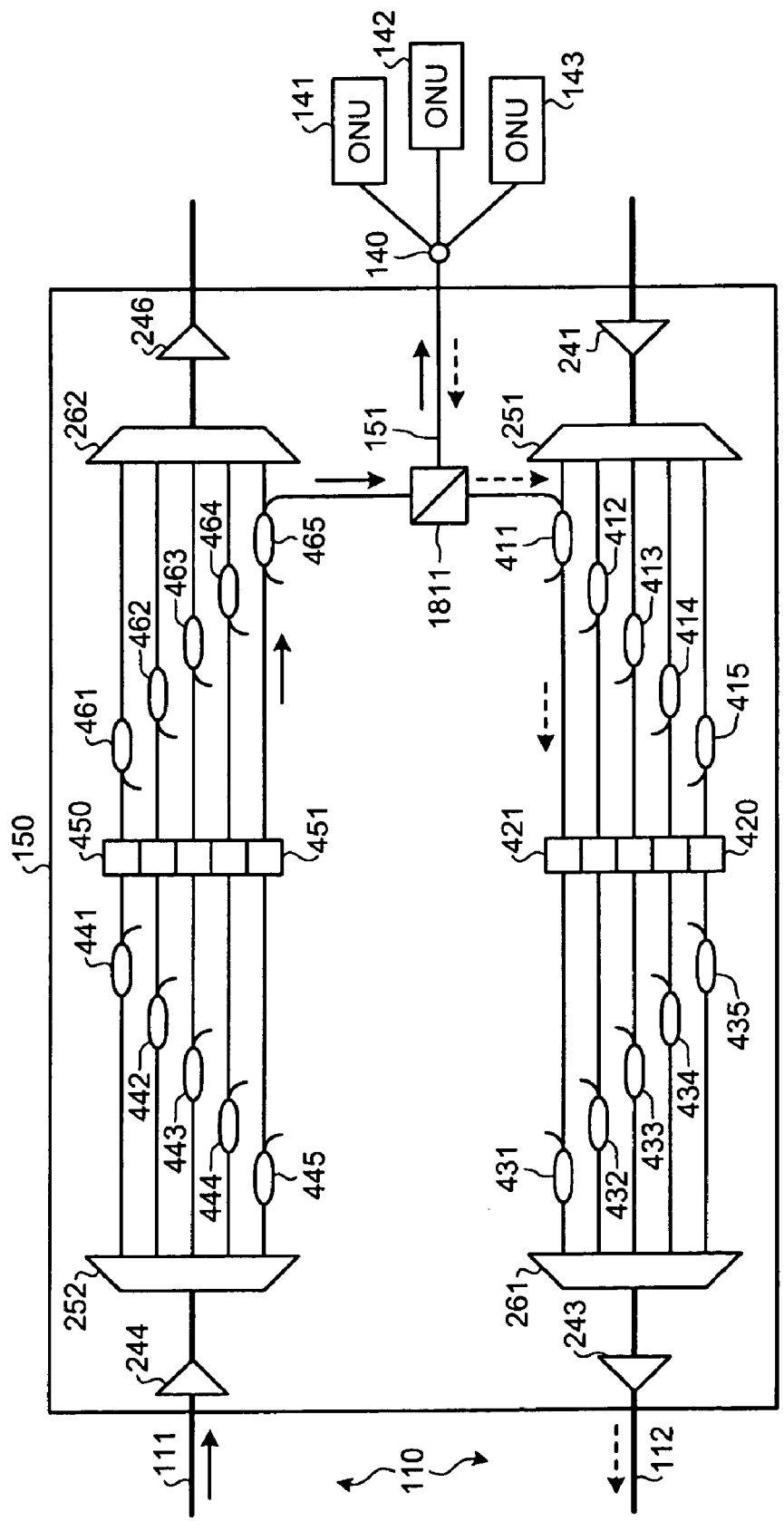
FIG. 18 is a block diagram of a specific example of an optical communicating apparatus at the latter stage depicted in FIG. 16.

FIG. 18 is a block diagram of a specific example of an optical communicating apparatus at the latter stage depicted in FIG. 16. In FIG. 18, components identical to those depicted in FIG. 4 or 16 are given identical reference numerals and description thereof is omitted. FIG. 18 depicts a specific example of the configuration between the demultiplexing unit 251 and the multiplexing unit 261 and the configuration between the demultiplexing unit 252 and the multiplexing unit 262 of the optical communicating apparatus 150 in FIG. 16. The optical communicating apparatus 130 includes a wavelength decoupler 1811 as the wavelength coupling/decoupling unit 1521 depicted in FIG. 16.

The one-core optical transmission path 151 passes the optical signal transmitted from the branching unit 140, outputs the optical signal to the wavelength decoupler 1811, passes the optical signal output from the wavelength decoupler 1811, and transmits the optical signal to the branching unit 140. The wavelength decoupler 1811 decouples the optical signal of the wavelength λ2 output from the one-core optical transmission path 151, outputs the optical signal to the optical coupler 411, couples the optical signal of the wavelength λ1 output from the optical coupler 465, and outputs the optical signal to the one-core optical transmission path 151.

The optical couplers 411 to 415, the SOA array 420, and the optical couplers 431 to 435 are provided between the demultiplexing unit 251 and the multiplexing unit 261 (see the description for FIG. 4). The optical coupler 411 receives the optical signal output from the demultiplexing unit 251 and the optical signal output from the wavelength decoupler 1811.

The optical couplers 441 to 445, the SOA array 450, and the optical couplers 461 to 465 are provided between the demultiplexing unit 252 and the multiplexing unit 262 (see the description for FIG. 4). The optical coupler 465 outputs one of the branched optical signals to the wavelength decoupler 1811. In this case, the optical signal output from the one-core optical transmission path 151 is picked up by the wavelength decoupler 1811 and is output to the optical coupler 411 and thus the optical signal is not input into the optical coupler 465.

Figure 19:
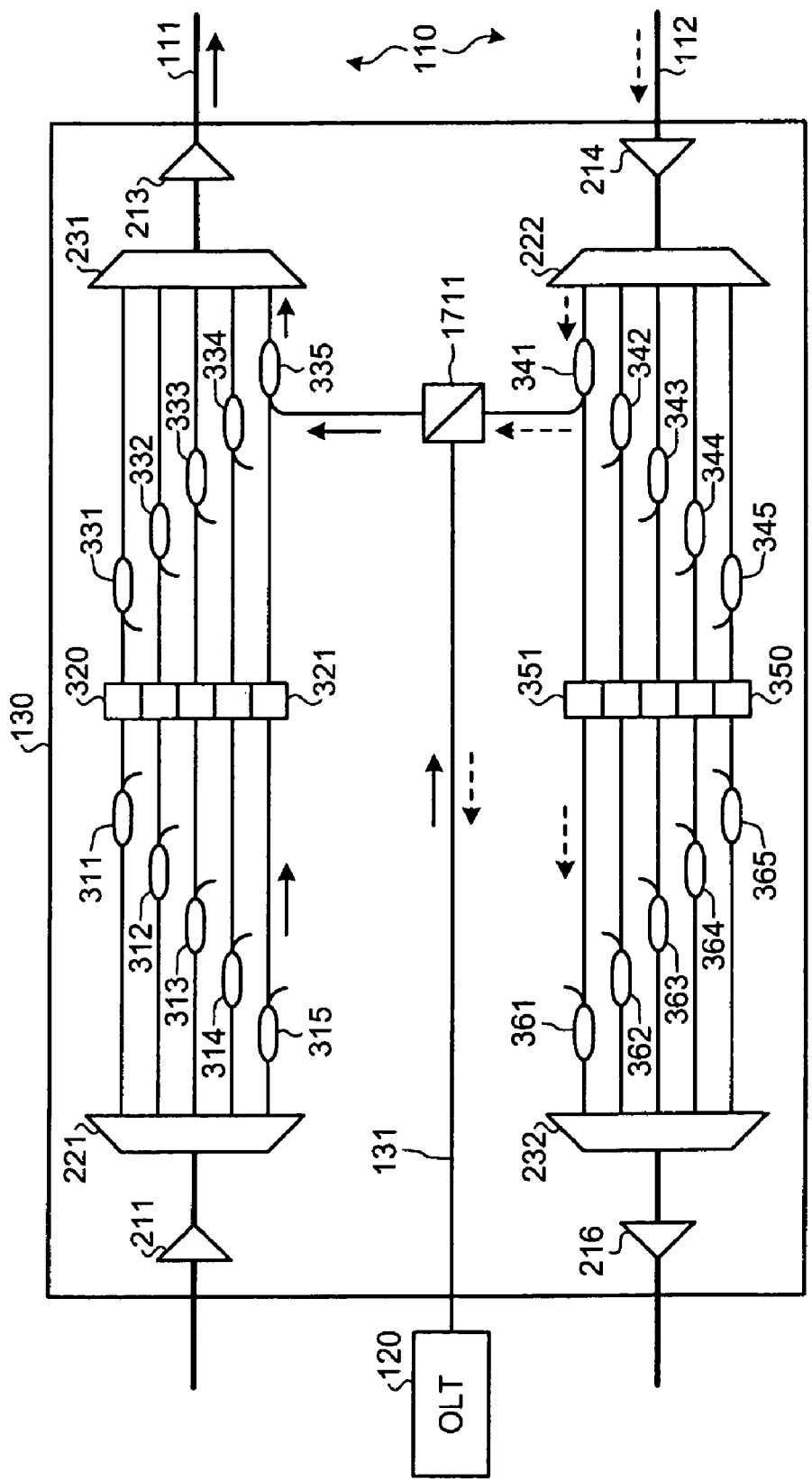
FIG. 19 is a block diagram of a modified example of the optical communicating apparatus depicted in FIG. 17.

FIG. 19 is a block diagram of a modified example of the optical communicating apparatus depicted in FIG. 17. In FIG. 19, components identical to those depicted in FIG. 17 are given identical reference numerals and description thereof is omitted. A configuration for the optical signals transmitted and received between the OLT 120 and the ONUs 141 to 143 not to pass through the SOA arrays 320 and 350 may be employed when the OSNR of each optical signal transmitted and received between the OLT 120 and the ONUs 141 to 143 can sufficiently be saved.

In this case, the optical coupler 335 is the inserting/branching unit 133 depicted in FIG. 16. The optical coupler 335 receives the optical signal output from the demultiplexing unit 221 and the optical signal output from the wavelength decoupler 1711. The optical coupler 335 branches the input optical signals and outputs one of the branched light beams to the multiplexing unit 231 (Add/Through).

In this case, the optical coupler 341 is the inserting/branching unit 132 depicted in FIG. 16. The optical coupler 341 receives the optical signal output from the demultiplexing unit 222. The optical coupler 341 outputs one of the branched optical signals to the wavelength decoupler 1711. The other optical signal branched by the optical coupler 361 is output to the multiplexing unit 232.

In this case, the optical signal output from the one-core optical transmission path 131 is branched by the wavelength decoupler 1711 and is output to the optical coupler 335. Therefore, the optical signal output from the one-core optical transmission path 131 is not input into the optical coupler 341. In the configuration depicted in FIG. 19, the optical coupler 315 may be a 1×2 optical coupler. The optical coupler 361 may be a 2×1 optical coupler.

Figure 20:
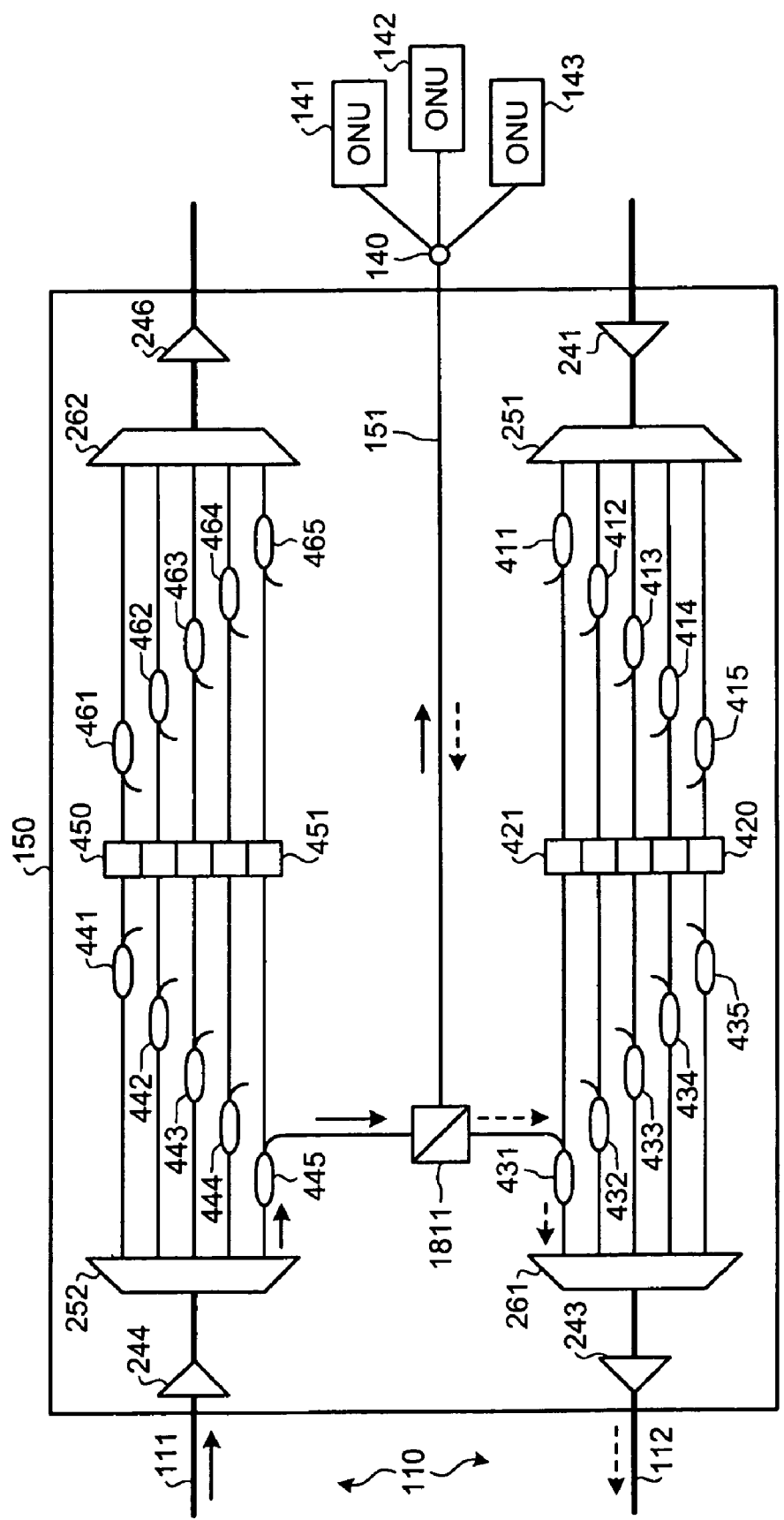
FIG. 20 is a block diagram of a modified example of the optical communicating apparatus depicted in FIG. 18.

FIG. 20 is a block diagram of a modified example of the optical communicating apparatus depicted in FIG. 18. In FIG. 20, components identical to those depicted in FIG. 18 are given identical reference numerals and description thereof is omitted. A configuration for the optical signals transmitted and received between the OLT 120 and the ONUs 141 to 143 not to pass through the SOA arrays 420 and 450 may be employed when the OSNR of each optical signal transmitted and received between the OLT 120 and the ONUs 141 to 143 can sufficiently be saved.

In this case, the optical coupler 431 is the inserting/branching unit 153 depicted in FIG. 16. The optical coupler 431 receives the optical signal output from the SOA 421 of the SOA array 420 and the optical signal output from the wavelength decoupler 1811. The optical coupler 431 outputs the input optical signal to the multiplexing unit 261 (Add/Through).

In this case, the optical signal output from the optical coupler 445 is decoupled by the wavelength decoupler 1811 and is output to the one-core optical transmission path 151. Therefore, the optical signal output from the optical coupler 445 is not input into the optical coupler 431.

In this case, the optical coupler 445 is the inserting/branching unit 152 depicted in FIG. 16. The optical coupler 445 branches the input optical signal, outputs one of the branched optical signals to the wavelength decoupler 1811, and outputs the other one of the branched optical signals to the SOA 451. The optical signal output from the optical coupler 445 to the SOA 451 is preferably blocked by the multiplexing unit 262.

When the multiplexing unit 262 is, for example, an AWG, the characteristic of the AWG is designed such that the wavelength component of the optical signal output from the optical coupler 465 is not output. In the configuration depicted in FIG. 20, the optical coupler 411 may be a 1×2 optical coupler. In the configuration depicted in FIG. 20, the optical coupler 465 may be a 2×1 optical coupler.

Figure 21:
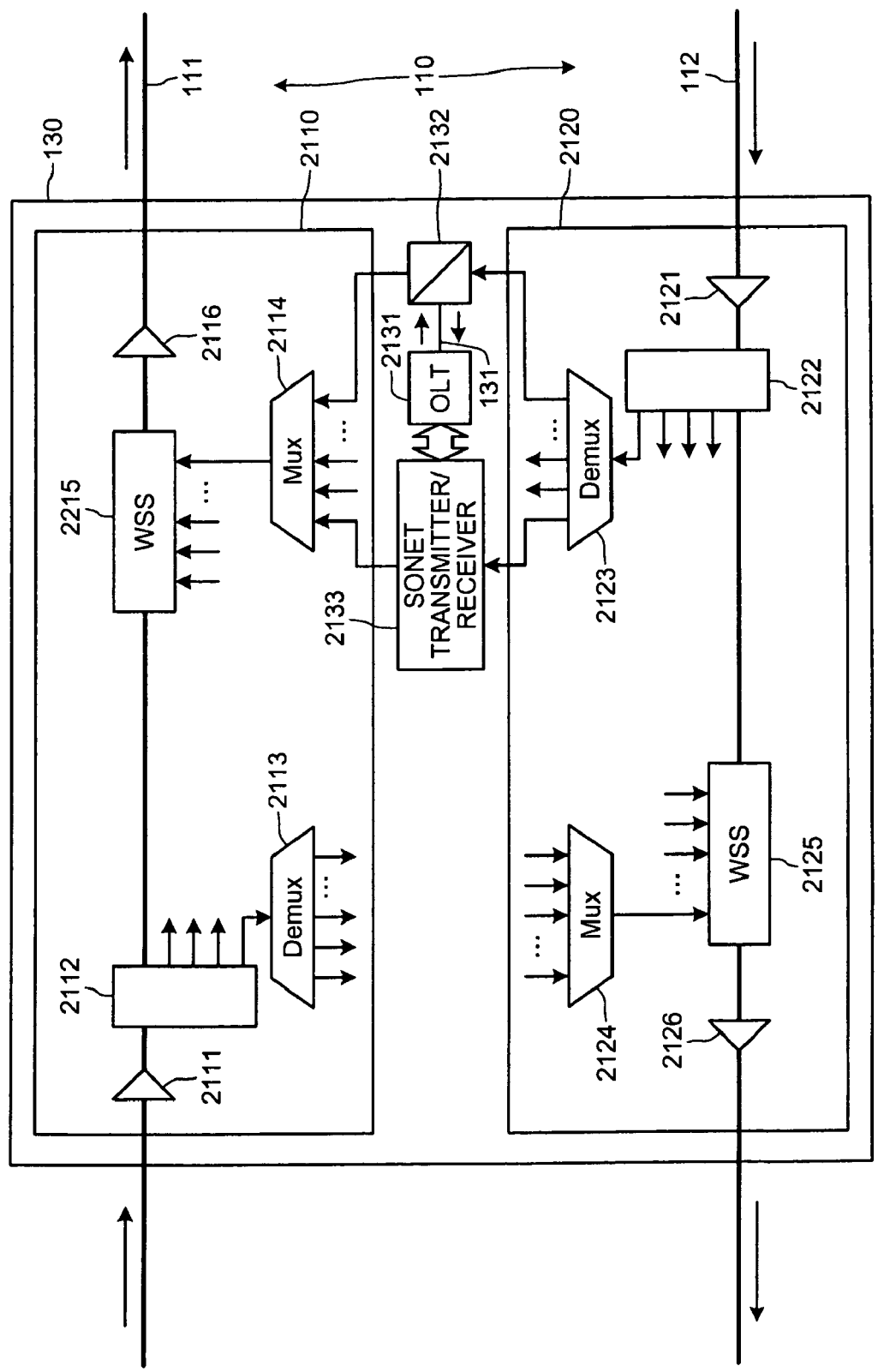
FIG. 21 is a block diagram of an example of applying to a ROADM the optical communicating apparatus at the former stage depicted in FIG. 15.

FIG. 21 is a block diagram of an example of applying to a ROADM the optical communicating apparatus at the former stage depicted in FIG. 15. As depicted in FIG. 21, the optical communicating apparatus 130 at the former stage in FIG. 15 includes a first ROADM unit 2110, a second ROADM unit 2120, an OLT 2131, a wavelength decoupler 2132, and a SONET transmitter/receiver 2133.

The first ROADM unit 2110 executes insertion and branching of an optical signal to the first core 111. The first ROADM unit 2110 is the inserting/branching unit 133 in FIG. 15. The first ROADM unit 2110 includes an amplifier 2111, an optical coupler 2112, a demultiplexing unit 2113, a multiplexing unit 2114, a wavelength selective switch 2115, and an amplifier 2116.

The amplifier 2111 receives and amplifies an optical signal transmitted from an optical communicating apparatus (not depicted) at a former stage (the left portion of FIG. 21) of the optical communicating apparatus 130 through the first core 111. The amplifier 2111 outputs the amplified optical signal to the optical coupler 2112. The optical coupler 2112 and the demultiplexing unit 2113 execute branching (Drop) of the optical signal from the first core 111 of the two-core optical transmission path 110.

The optical coupler 2112 branches the optical signal output from the amplifier 2111 into a plurality of optical signals. The optical coupler 2112 outputs one of the branched optical signals to the demultiplexing unit 2113. The optical coupler 2112 outputs one of the branched optical signals to the wavelength selective switch 2115. The demultiplexing unit 2113 (Demux) wavelength-demultiplexes the optical signal output from the optical coupler 2112 and outputs the wavelength-demultiplexed optical signal to the outside (Drop).

The multiplexing unit 2114 (Mux) wavelength-multiplexes each of the optical signals output from the SONET transmitter/receiver 2133, the wavelength decoupler 2132, and the outside, and outputs the wavelength-multiplexed signal to the wavelength selective switch 2115. The wavelength selective switch 2115 (WSS) selects signals for each wavelength from among the optical signal output from the optical coupler 2112, the optical signals input from the outside, and the optical signal output from the multiplexing unit 2114.

The wavelength selective switch 2115 wavelength-multiplexes the selected optical signals having each wavelength, and outputs the optical signals to the amplifier 2116. The amplifier 2116 amplifies the optical signal output from the wavelength selective switch 2115 and transmits the amplified optical signal to the optical communicating apparatus 150 (not depicted) at the latter stage through the first core 111.

The second ROADM unit 2120 executes insertion and branching of optical signals to the second core 112. The second ROADM unit 2120 is the inserting/branching unit 132 in FIG. 15. The second ROADM unit 2120 includes an amplifier 2121, an optical coupler 2122, a demultiplexing unit 2123, a multiplexing unit 2124, a wavelength selective switch 2125, and an amplifier 2126.

The amplifier 2121 receives and amplifies an optical signal transmitted from the optical communicating apparatus 150 at a latter stage (the right portion of FIG. 21) of the optical communicating apparatus 130 through the second core 112. The amplifier 2121 outputs the amplified optical signal to the optical coupler 2122. The optical coupler 2122 and the demultiplexing unit 2123 execute branching (Drop) of the optical signal from the second core 112 of the two-core optical transmission path 110.

The optical coupler 2122 branches the optical signal output from the amplifier 2121 into a plurality of optical signals. The optical coupler 2122 outputs one of the branched optical signals to the demultiplexing unit 2123, and outputs one of the branched optical signals to the wavelength selective switch 2125. The demultiplexing unit 2123 wavelength-demultiplexes the optical signal output from the optical coupler 2122.

The demultiplexing unit 2123 outputs the optical signal of the wavelength λ2 (UpLink for the PON scheme) of the wavelength-demultiplexed optical signals to the wavelength decoupler 2132. The demultiplexing unit 2123 outputs the optical signal of the wavelength to be used by the SONET transmitter/receiver 2133 to the SONET transmitter/receiver 2133. The demultiplexing unit 2123 outputs to the outside (Drop) the optical signals not to be output to the wavelength decoupler 2132 or the SONET transmitter/receiver 2133 of the wavelength-demultiplexed optical signals.

The multiplexing unit 2124 wavelength-multiplexes the optical signals coming from the outside and outputs the optical signals to the wavelength selective switch 2125. The wavelength selective switch 2125: selects signals for each wavelength from among the optical signal output from the optical coupler 2122, the optical signals input from the outside, and the optical signal output from the multiplexing unit 2124; wavelength-multiplexes the selected optical signal of each wavelength; and outputs the optical signal to the amplifier 2126. The amplifier 2126 amplifies the optical signal output from the wavelength selective switch 2125, and transmits the amplified optical signal to the optical communicating apparatus (not depicted) at the former stage (in the left portion of FIG. 21) of the optical communicating apparatus 130.

The OLT 2131 is the OLT 120 in FIG. 15. The OLT 2131 outputs to the wavelength decoupler 2132 the optical signal to be transmitted to the ONUs provided on the optical communicating apparatus 150 at the latter stage (in the right portion of FIG. 21) of the optical communicating apparatus 130. The OLT 2131 obtains from the wavelength decoupler 2132 the optical signal transmitted from the ONUs provided on the optical communicating apparatus 150.

The OLT 2131 is connected to the SONET transmitter/receiver 2133 through electric wiring. The OLT 2131 may convert a signal output from the SONET transmitter/receiver 2133 into a PON-scheme optical signal, and may output the converted signal to the wavelength decoupler 2132 as an optical signal to be transmitted to the ONU provided on the optical communicating apparatus 150. The OLT 2131 may output a signal based on the optical signal obtained from the wavelength decoupler 2132, to the SONET transmitter/receiver 2133.

The wavelength decoupler 2132 outputs the optical signal of the wavelength λ2 output from the demultiplexing unit 2123, to the OLT 2131. The wavelength decoupler 2132 outputs the optical signal of the wavelength λ1 output from the OLT 2131, to the multiplexing unit 2114. The SONET transmitter/receiver 2133 receives the SONET-scheme optical signal output from the demultiplexing unit 2123. The SONET transmitter/receiver 2133 outputs the SONET-scheme optical signal to the multiplexing unit 2114.

The SONET transmitter/receiver 2133 may output to the OLT 2131 a signal that is based on the received optical signal. The SONET transmitter/receiver 2133 may convert the signal output from the OLT 2131 into a SONET-scheme optical signal, and may output the converted signal to the multiplexing unit 2114. Various schemes may be used for the communication between the OLT 2131 and the SONET transmitter/receiver 2133.

Figure 22:
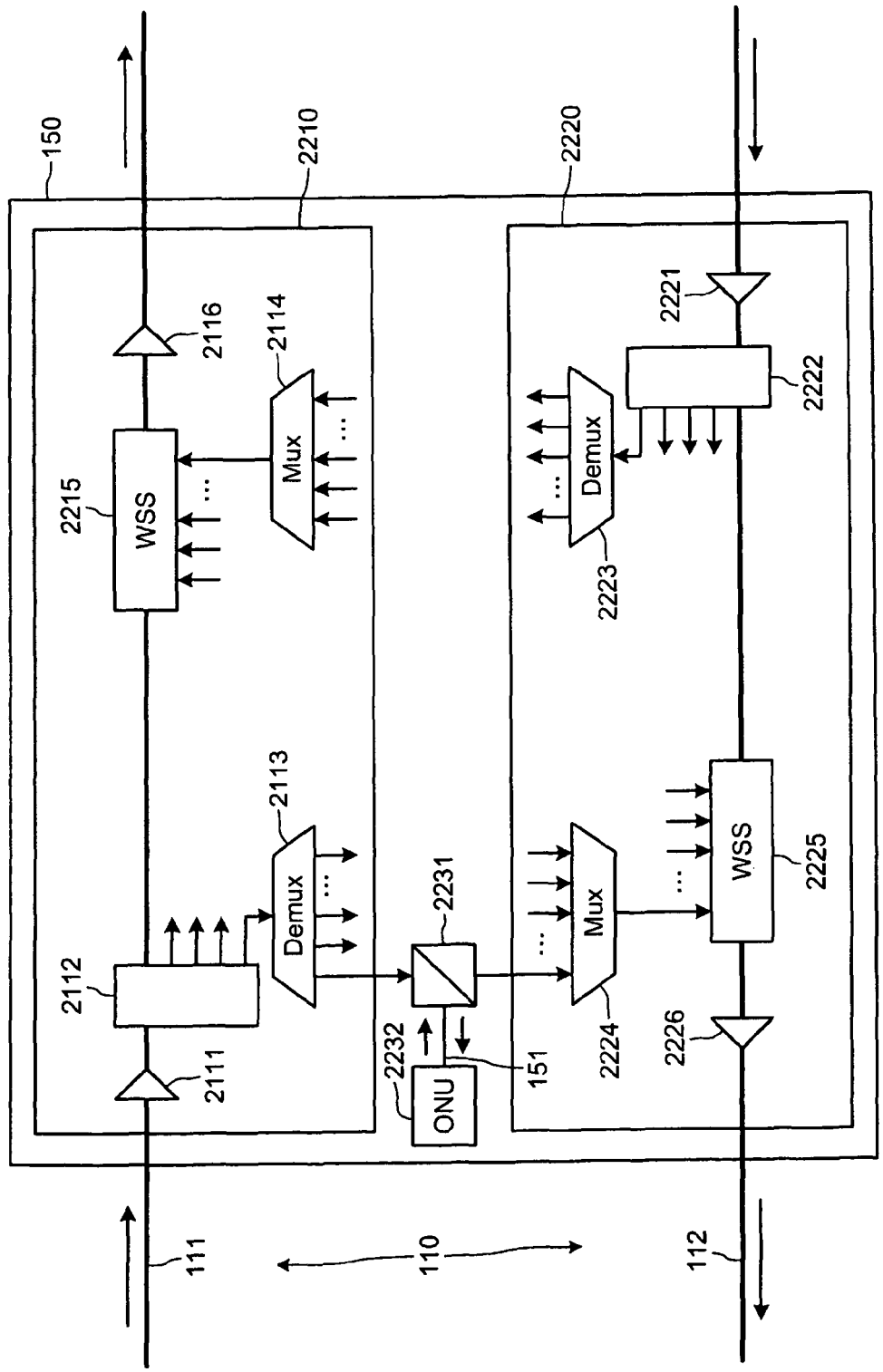
FIG. 22 is a block diagram of an example of applying to the ROADM the optical communicating apparatus at the latter stage depicted in FIG. 15.

FIG. 22 is a block diagram of an example of applying to the ROADM the optical communicating apparatus at the latter stage depicted in FIG. 15. As depicted in FIG. 22, the optical communicating apparatus 150 at the latter stage depicted in FIG. 15 includes a first ROADM unit 2210, a second ROADM unit 2220, an ONU 2232, and a wavelength decoupler 2231.

The first ROADM unit 2210 executes insertion and branching of an optical signal to the first core 111. The first ROADM unit 2210 is the inserting/branching unit 152 shown in FIG. 15. The first ROADM unit 2210 includes an amplifier 2211, an optical coupler 2212, a demultiplexing unit 2213, a multiplexing unit 2214, a wavelength selective switch 2215, and an amplifier 2216.

The amplifier 2211 receives and amplifies an optical signal transmitted from an optical communicating apparatus (not depicted) at a former stage (the left portion of FIG. 21) of the optical communicating apparatus 150. The amplifier 2211 outputs the amplified optical signal to the optical coupler 2212. The optical coupler 2212 and the demultiplexing unit 2213 execute branching (Drop) of the optical signal from the first core 111 of the two-core optical transmission path 110.

The optical coupler 2212 branches the optical signal output from the amplifier 2211 into a plurality of optical signals. The optical coupler 2212 outputs one of the branched optical signals to the demultiplexing unit 2113, and outputs one of the branched optical signals to the wavelength selective switch 2215. The demultiplexing unit 2213 wavelength-demultiplexes the optical signal output from the optical coupler 2212.

The demultiplexing unit 2213 outputs to the wavelength decoupler 2231 the optical signal of the wavelength λ1 (DownLink for the PON scheme) of the wavelength-demultiplexed optical signals. The demultiplexing unit 2213 outputs to the outside (Drop) the optical signal to be not output to the wavelength decoupler 2231 of the wavelength-demultiplexed optical signals.

The multiplexing unit 2214 wavelength-multiplexes each of the optical signals output from the outside and outputs the wavelength-multiplexed signal to the wavelength selective switch 2215. The wavelength selective switch 2215: selects signals for each wavelength from among the optical signal output from the optical coupler 2212, the optical signals input from the external source, and the optical signal output from the multiplexing unit 2214; wavelength-multiplexes the selected optical signals having each wavelength; and outputs the optical signals to the amplifier 2216. The amplifier 2216 amplifies the optical signal output from the wavelength selective switch 2115 and transmits the amplified optical signal to the optical communicating apparatus (not depicted) at the latter stage (in the right portion of FIG. 22) of the optical communicating apparatus 150.

The second ROADM unit 2220 executes insertion and branching of optical signals to the second core 112. The second ROADM unit 2220 is the inserting/branching unit 153 depicted in FIG. 15. The second ROADM unit 2220 includes an amplifier 2221, an optical coupler 2222, a demultiplexing unit 2223, a multiplexing unit 2224, a wavelength selective switch 2225, and an amplifier 2226.

The amplifier 2221 receives and amplifies an optical signal transmitted from the optical communicating apparatus (not depicted) at a latter stage (the right portion of FIG. 22) of the optical communicating apparatus 150. The amplifier 2221 outputs the amplified optical signal to the optical coupler 2222. The optical coupler 2222 and the demultiplexing unit 2223 execute branching (Drop) of the optical signal from the second core 112 of the two-core optical transmission path 110.

The optical coupler 2222 branches the optical signal output from the amplifier 2221 into a plurality of optical signals. The optical coupler 2222 outputs one of the branched optical signals to the demultiplexing unit 2223. The optical coupler 2222 outputs one of the branched optical signals to the wavelength selective switch 2225. The demultiplexing unit 2223 wavelength-demultiplexes the optical signal output from the optical coupler 2222 and outputs the wavelength-demultiplexed optical signal to the outside (Drop).

The multiplexing unit 2224 wavelength-multiplexes each of the optical signals output from the wavelength-decoupler 2231 and the outside, and outputs the wavelength-multiplexed signal to the wavelength selective switch 2225. The wavelength selective switch 2225 selects signals for each wavelength from among the optical signal output from the optical coupler 2222, the optical signals input from the outside, and the optical signal output from the multiplexing unit 2224. The multiplexing unit 2224 wavelength-multiplexes the selected optical signals having the wavelengths and outputs the wavelength-multiplexed optical signal to the amplifier 2226.

The amplifier 2226 amplifies the optical signal output from the wavelength selective switch 2225 and transmits the amplified optical signal to the optical communicating apparatus 130. The wavelength decoupler 2231 outputs to the ONU 2232 the optical signal of the wavelength λ1 output from the multiplexing unit 2213. The wavelength decoupler 2231 outputs the optical signal of the wavelength λ2 output from the ONU 2232 to the multiplexing unit 2224.

The ONU 2232 is any one of the ONUs 141 to 143 depicted in FIG. 15. The ONU 2232 outputs the optical signal to be transmitted to the OLT 2131 (see FIG. 21) provided on the optical communicating apparatus 130 at the former stage (in the left portion of FIG. 22) of the optical communicating apparatus 150, to the wavelength decoupler 2231. The ONU 2232 obtains the optical signal transmitted from the OLT 2131 provided on the optical communicating apparatus 130, from the wavelength decoupler 2231.

Figure 23:
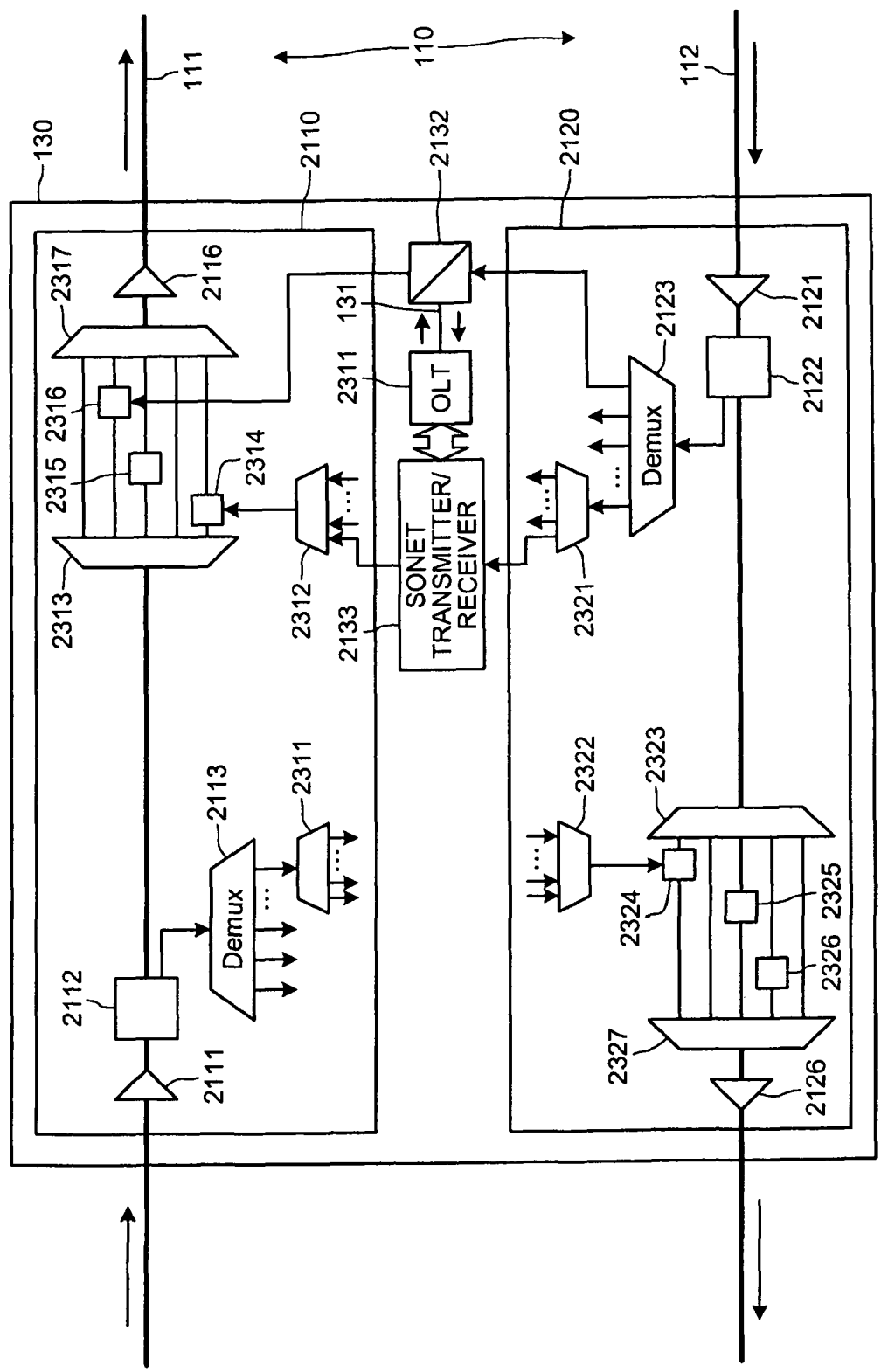
FIG. 23 is a block diagram of an example of applying to a miniROADM the optical communicating apparatus at the former stage depicted in FIG. 15.

FIG. 23 is a block diagram of an example of applying to a miniROADM the optical communicating apparatus at the former stage depicted in FIG. 15. In FIG. 23, components identical to those depicted in FIG. 21 are given identical reference numerals and description thereof is omitted. As depicted in FIG. 23, the optical communicating apparatus 130 includes the first ROADM unit 2110, the second ROADM unit 2120, the OLT 2131, the wavelength decoupler 2232, and the SONET transmitter/receiver 2133.

The first ROADM unit 2110 includes the amplifier 2111, the optical coupler 2112, the demultiplexing unit 2113, a high-density demultiplexing unit 2311, a high-density multiplexing unit 2312, the demultiplexing unit 2313, optical switches 2314 to 2316, a multiplexing unit 2317, and the amplifier 2116. The amplifier 2111 outputs an amplified optical signal to the optical coupler 2112.

The optical coupler 2112, the demultiplexing unit 2113, and the high-density demultiplexing unit 2311 execute branching (Drop) of optical signals from the first core 111. The optical coupler 2112 branches the optical signal output from the amplifier 2111. The optical coupler 2112 outputs one of the branched optical signals to the demultiplexing unit 2113, and outputs one of the optical signals to the demultiplexing unit 2313.

The demultiplexing unit 2113 wavelength-demultiplexes the optical signals having low-density wavelength intervals between each other output from the optical coupler 2112. The demultiplexing unit 2113 outputs one of the wavelength-demultiplexed optical signals to the high-density demultiplexing unit 2311, and outputs the other optical signals of the optical signals to the outside (Drop). The high-density demultiplexing unit 2311 wavelength-demultiplexes the optical signals output from the multiplexing unit 2113 using high-density wavelength intervals, and outputs the wavelength-demultiplexed optical signals to the outside (Drop).

The high-density multiplexing unit 2312 wavelength-multiplexes the optical signals having the high-density wavelength intervals output from the SONET transmitter/receiver 2133 and the outside, and outputs the wavelength-multiplexed optical signals to the optical switch 2314. The demultiplexing unit 2313 wavelength-demultiplexes the optical signal output from the optical coupler 2112 using the low-density wavelength intervals. The demultiplexing unit 2313 outputs the wavelength-demultiplexed optical signals to the multiplexing unit 2317.

The optical switches 2314 to 2316 are provided on paths of each optical signal output from the demultiplexing unit 2313. The optical switches 2314 to 2316 output the optical signals output from the demultiplexing unit 2313, to the multiplexing unit 2317 (Through) or output the optical signals input into the optical switches 2314 to 2316, to the multiplexing unit 2317 (Add).

The optical switch 2314 selects any one of the optical signal output from the demultiplexing unit 2313 and the optical signal output from the high-density multiplexing unit 2312, and outputs the selected optical signal to the multiplexing unit 2317. The optical switch 2316 selects any one of the optical signal output from the demultiplexing unit 2313 and the optical signal output from the wavelength decoupler 2132, and outputs the selected optical signal to the multiplexing unit 2317.

The multiplexing unit 2317 wavelength-multiplexes the optical signals output from the demultiplexing unit 2313 or the optical switches 2314 to 2316 using the low-density wavelength intervals. The multiplexing unit 2317 outputs the wavelength-multiplexed optical signals to the amplifier 2116. The amplifier 2116 transmits the optical signal output from the multiplexing unit 2317, to the optical communicating apparatus 150 at the latter stage of the optical communicating apparatus 130.

The second ROADM unit 2120 includes the amplifier 2121, the optical coupler 2122, the demultiplexing unit 2123, a high-density demultiplexing unit 2321, a high-density multiplexing unit 2322, the demultiplexing unit 2323, optical switches 2324 to 2326, a multiplexing unit 2327, and the amplifier 2126. The amplifier 2121 outputs an amplified optical signal to the optical coupler 2122.

The optical coupler 2122, the demultiplexing unit 2123, and the high-density demultiplexing unit 2321 execute branching (Drop) of optical signals from the second core 112. The optical coupler 2122 branches the optical signal output from the amplifier 2121. The optical coupler 2122 outputs one of the branched optical signals to the demultiplexing unit 2123, and outputs one of the optical signals to the demultiplexing unit 2323.

The demultiplexing unit 2123 wavelength-demultiplexes the optical signal output from the optical coupler 2122 using the low-density wavelength intervals. The demultiplexing unit 2123 outputs optical signals in a band that includes the wavelength used by the SONET transmitter/receiver 2133 of the wavelength-demultiplexed optical signals, to the high-density demultiplexing unit 2321. The demultiplexing unit 2123 outputs the optical signal of the wavelength $\lambda 2$ for the UpLink of the PON scheme of the wavelength-demultiplexed optical signals, to the wavelength decoupler 2132. The demultiplexing unit 2123 outputs the optical signal not to be output to the high-density demultiplexing unit 2321 or the wavelength decoupler 2132 of the wavelength-demultiplexed optical signals, to the outside (Drop).

The high-density demultiplexing unit 2321 wavelength-demultiplexes the optical signals output from the demultiplexing unit 2123 using the high-density wavelength intervals. The high-density demultiplexing unit 2321 outputs the optical signal of the wavelength used by the SONET transmitter/receiver 2133 of the wavelength-demultiplexed optical signals, to the SONET transmitter/receiver 2133. The high-density demultiplexing unit 2321 outputs the optical signal not to be output to the SONET transmitter/receiver 2133 of the wavelength-demultiplexed optical signals, to the outside (Drop).

The high-density multiplexing unit 2322 wavelength-multiplexes the optical signals with the high-density wavelength intervals coming from the outside, and outputs the wavelength-multiplexed optical signal to the optical switch 2324. The demultiplexing unit 2323 wavelength-demultiplexes the optical signal output from the optical coupler 2122 using the low-density wavelength intervals. The demultiplexing unit 2323 outputs the wavelength-demultiplexed optical signals to the multiplexing unit 2327.

The optical switches 2324 to 2326 are provided on paths of each optical signal output from the demultiplexing unit 2323. The optical switches 2324 to 2326 output the optical signals output from the demultiplexing unit 2323, to the multiplexing unit 2327 (Through) or output the optical signals input into the optical switches 2324 to 2326, to the multiplexing unit 2327 (Add).

The optical switch 2324 selects either one of the optical signal output from the demultiplexing unit 2323 and the optical signal output from the high-density multiplexing unit 2322, and outputs the selected optical signal to the multiplexing unit 2327. The multiplexing unit 2327 wavelength-multiplexes the optical signals output from the demultiplexing unit 2323 or the optical switches 2324 to 2326 using the low-density wavelength intervals, and outputs the wavelength-multiplexed optical signals to the amplifier 2126.

The wavelength decoupler 2132 outputs the optical signal of the wavelength $\lambda 1$ output from the OLT 2131, to the optical switch 2316. The SONET transmitter/receiver 2133 receives the SONET-scheme optical signal output from the high-density demultiplexing unit 2321. The SONET transmitter/receiver 2133 outputs the SONET-scheme optical signal to the high-density multiplexing unit 2312.

Figure 24:
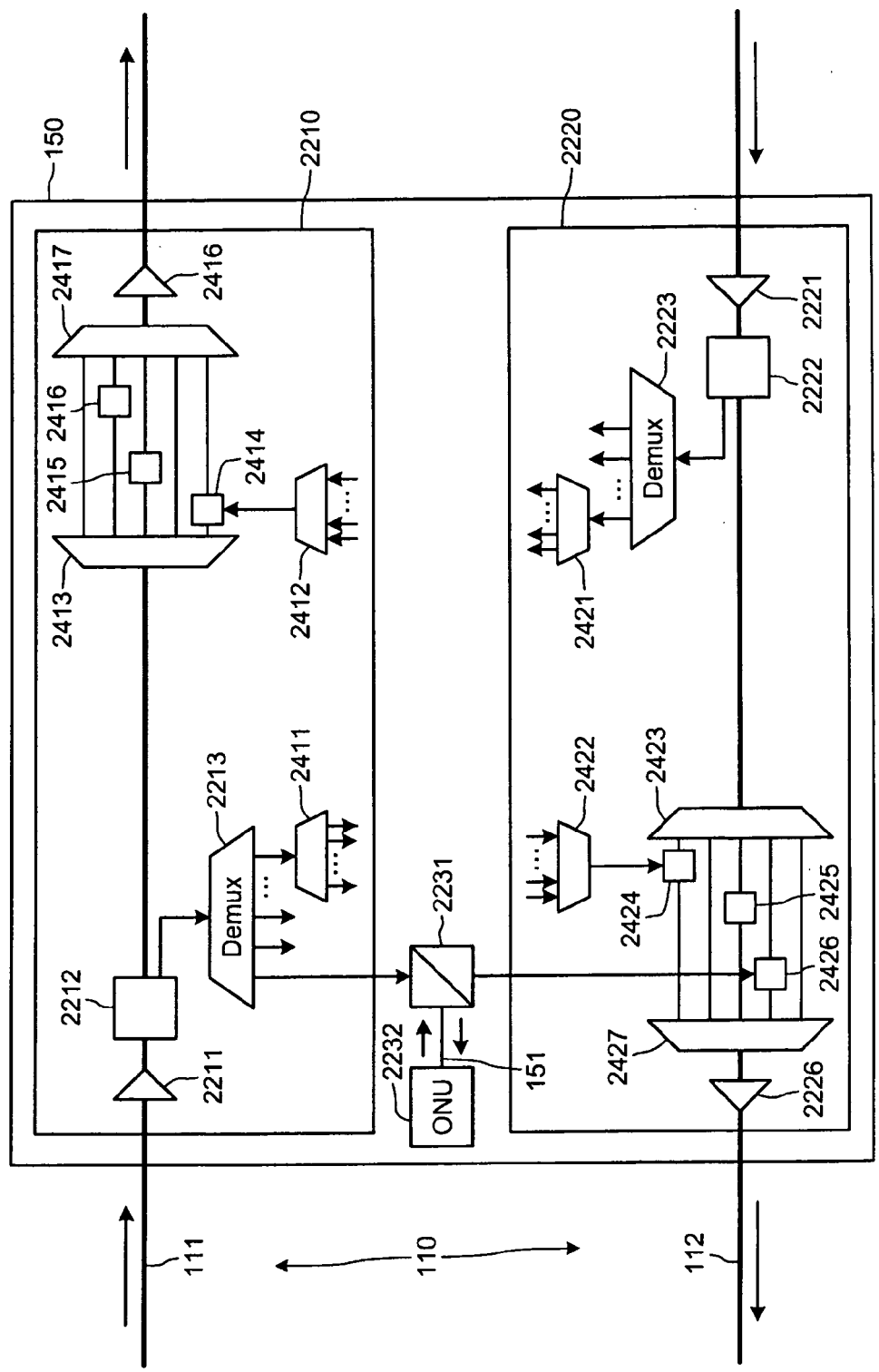
FIG. 24 is a block diagram of an example of applying to the miniROADM the optical communicating apparatus at the latter stage depicted in FIG. 15.

FIG. 24 is a block diagram of an example of applying to the miniROADM the optical communicating apparatus at the latter stage depicted in FIG. 15. In FIG. 24, components identical to those depicted in FIG. 22 are given identical reference numerals and description thereof is omitted. As depicted in FIG. 24, the optical communicating apparatus 150 at the latter stage depicted in FIG. 15 includes the first ROADM unit 2210, the second ROADM unit 2220, the wavelength decoupler 2231, and the ONU 2232.

The first ROADM unit 2110 includes the amplifier 2211, the optical coupler 2112, the demultiplexing unit 2113, a high-density demultiplexing unit 2411, a high-density multiplexing unit 2412, the demultiplexing unit 2413, optical switches 2414 to 2416, a multiplexing unit 2417, and the amplifier 2216. The amplifier 2211 outputs an amplified optical signal to the optical coupler 2212.

The optical coupler 2212, the demultiplexing unit 2213, and the high-density demultiplexing unit 2411 execute branching (Drop) of optical signals from the first core 111. The optical coupler 2212 branches the optical signal output from the amplifier 2211. The optical coupler 2212 outputs one of the branched optical signals to the demultiplexing unit 2213, and outputs one of the optical signals to the demultiplexing unit 2413.

The demultiplexing unit 2213 wavelength-demultiplexes the optical signal output from the optical coupler 2212 using low-density wavelength intervals. The demultiplexing unit 2213 outputs the optical signal of the wavelength of λ1 for the DownLink of the PON scheme of the wavelength-demultiplexed optical signals, to the wavelength decoupler 2231. The demultiplexing unit 2213 outputs to the outside (Drop) the optical signals not to be output to the wavelength decoupler 2231 or the high-density demultiplexing unit 2411.

The high-density demultiplexing unit 2411 wavelength-demultiplexes the optical signals output from the demultiplexing unit 2213 using the high-density wavelength intervals, and outputs the wavelength-demultiplexed optical signals to the outside (Drop). The high-density multiplexing unit 2412 wavelength-multiplexes the optical signals with the high-density wavelength intervals coming from the outside, and outputs the wavelength-multiplexed optical signals to the optical switch 2414. The demultiplexing unit 2413 wavelength-demultiplexes the optical signal output from the optical coupler 2212 using the low-density wavelength intervals.

The demultiplexing unit 2413 outputs the wavelength-demultiplexed optical signals to the multiplexing unit 2417. The optical switches 2414 to 2416 are provided on paths of the optical signals output from the demultiplexing unit 2413. The optical switches 2414 to 2416 outputs the optical signal output from the demultiplexing unit 2413, to the multiplexing unit 2417 (Through), or outputs the optical signal input into the optical switches 2414 to 2416, to the multiplexing unit 2417 (Add).

The optical switch 2414 selects either one of the optical signal output from the demultiplexing unit 2413 and the optical signal output from the high-density multiplexing unit 2412, and outputs the selected optical signal to the multiplexing unit 2417. The multiplexing unit 2417 wavelength-multiplexes the optical signals output from the demultiplexing unit 2413 or the optical switches 2414 to 2416 using the low-density wavelength intervals, and outputs the wavelength-multiplexed optical signals to the amplifier 2216.

The second ROADM unit 2220 includes the amplifier 2221, the optical coupler 2222, the demultiplexing unit 2223, a high-density demultiplexing unit 2421, a high-density multiplexing unit 2422, the demultiplexing unit 2423, optical switches 2424 to 2426, a multiplexing unit 2427, and the amplifier 2226. The amplifier 2221 outputs an amplified optical signal to the optical coupler 2222.

The optical coupler 2222, the demultiplexing unit 2223, and the high-density demultiplexing unit 2421 execute branching (Drop) of optical signals from the second core 112. The optical coupler 2222 branches the optical signal output from the amplifier 2221. The optical coupler 2222 outputs one of the branched optical signals to the demultiplexing unit 2223, and outputs one of the optical signals to the demultiplexing unit 2423.

The demultiplexing unit 2223 wavelength-demultiplexes the optical signal output from the optical coupler 2222 using the low-density wavelength intervals. The demultiplexing unit 2223 outputs one of the wavelength-demultiplexed optical signals, to the high-density demultiplexing unit 2421, and outputs the rest of the optical signals to the outside (Drop). The high-density demultiplexing unit 2421 wavelength-demultiplexes the optical signal output from the demultiplexing unit 2223 using the high-density wavelength intervals, and outputs the wavelength-demultiplexed optical signals to the outside (Drop).

The high-density multiplexing unit 2422 wavelength-multiplexes the optical signals having high-density wavelength intervals, which are coming from the outside, and outputs the optical signals to the optical switch 2424. The demultiplexing unit 2423 wavelength-demultiplexes the optical signal output from the optical coupler 2222 using the low-density wavelength intervals. The demultiplexing unit 2423 outputs the wavelength-demultiplexed optical signals to the multiplexing unit 2427.

The optical switches 2424 to 2426 are provided on paths of each optical signal output from the demultiplexing unit 2423. The optical switches 2424 to 2426 output the optical signals output from the demultiplexing unit 2423, to the multiplexing unit 2427 (Through) or output the optical signals input into the optical switches 2424 to 2426, to the multiplexing unit 2427 (Add).

The optical switch 2424 selects either one of the optical signal output from the demultiplexing unit 2423 and the optical signal output from the high-density multiplexing unit 2422, and outputs the selected optical signal to the multiplexing unit 2427. The optical switch 2426 selects either one of the optical signal output from the demultiplexing unit 2423 and the optical signal output from the wavelength decoupler 2231, and outputs the selected optical signal to the multiplexing unit 2427.

The multiplexing unit 2427 wavelength-multiplexes the optical signals output from the demultiplexing unit 2423 or the optical switches 2424 to 2426 using the low-density wavelength intervals, and outputs the wavelength-multiplexed optical signal to the amplifier 2226. The wavelength decoupler 2231 outputs the optical signal of the wavelength λ1 output from the demultiplexing unit 2213, to the ONU 2232. The wavelength decoupler 2231 outputs the optical signal of the wavelength λ2 output from the ONU 232, to the optical switch 2426.

Figure 25:
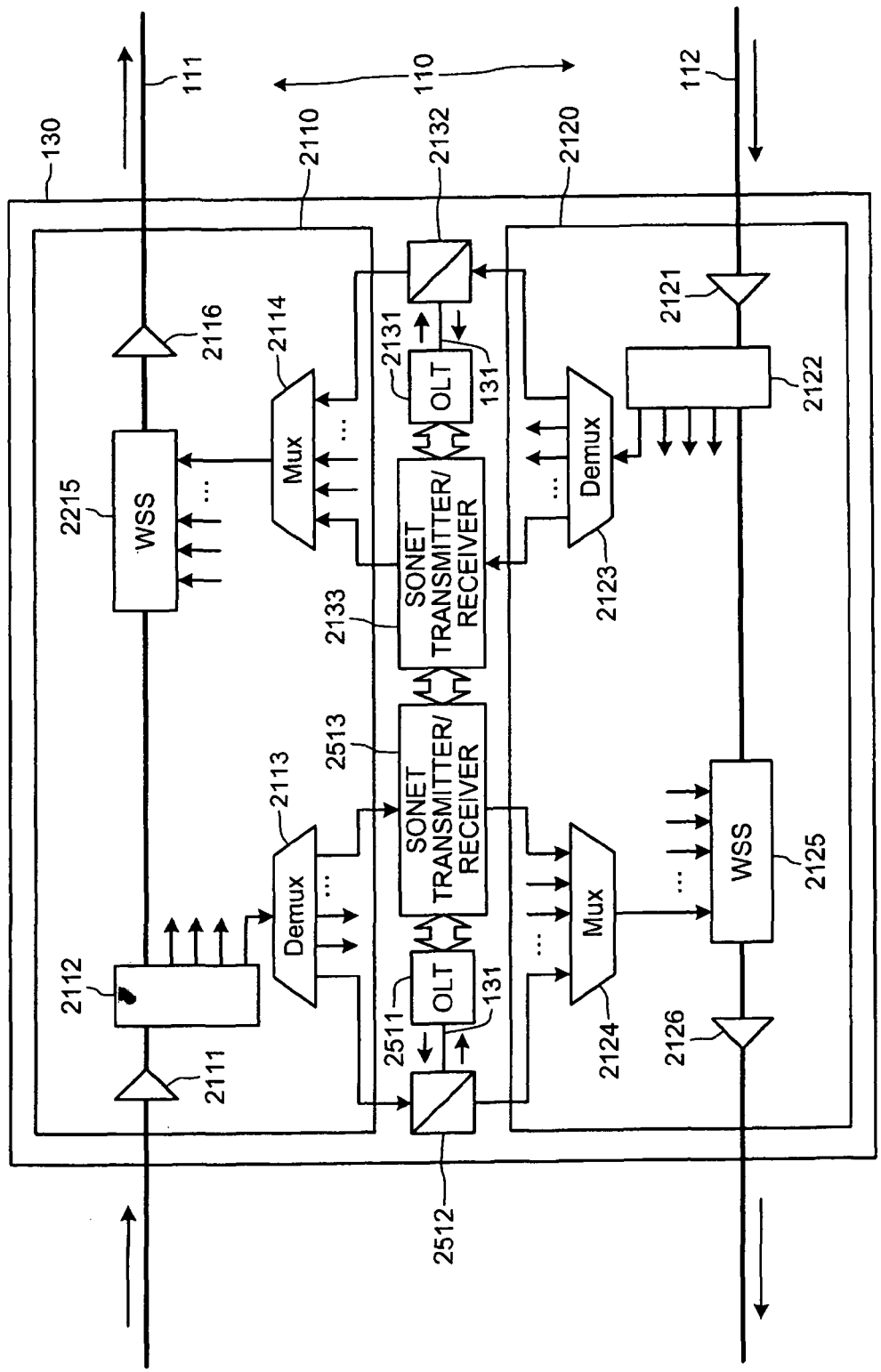
FIG. 25 is a block diagram of a modified example of the optical communicating apparatus depicted in FIG. 21.

FIG. 25 is a block diagram of a modified example of the optical communicating apparatus depicted in FIG. 21. In FIG. 25, components identical to those depicted in FIG. 21 are given identical reference numerals and description thereof is omitted. In addition to the configuration of the optical communicating apparatus 130 depicted in FIG. 21, the optical communicating apparatus 130 includes an OLT 2511, a wavelength decoupler 2512, and a SONET transmitter/receiver 2513.

The demultiplexing unit 2113 outputs the optical signal of the wavelength λ2 (UpLink for the PON scheme) of the wavelength-demultiplexed optical signals, to the wavelength decoupler 2512. The demultiplexing unit 2113 outputs the optical signal of the wavelength to be used by the SONET transmitter/receiver 2513 of the wavelength-demultiplexed optical signals, to the SONET transmitter/receiver 2513.

The demultiplexing unit 2113 outputs to the outside (Drop) the optical signals not to be output to the wavelength decoupler 2512 or the SONET transmitter/receiver 2513 of the wavelength-demultiplexed optical signals. The multiplexing unit 2124 wavelength-multiplexes the optical signals output from the SONET transmitter/receiver 2513, the wavelength decoupler 2512, and the outside, and outputs the wavelength-multiplexed optical signal to the wavelength selective switch 2125.

The OLT 2511 outputs the optical signal of the wavelength λ1 to be transmitted to an ONU provided on the optical communicating apparatus (not depicted) at the former stage of the optical communicating apparatus 130, to the wavelength decoupler 2512. The OLT 2511 obtains the optical signal of the wavelength λ2 transmitted to the ONU provided on the optical communicating apparatus at the former stage of the optical communicating apparatus 130, from the wavelength decoupler 2512.

The OLT 2511 is connected to the SONET transmitter/receiver 2513 through electric wiring. The OLT 2511 may convert the signal output from the SONET transmitter/receiver 2513 into a PON-scheme optical signal and may output the converted signal to the wavelength decoupler 2512 as an optical signal to be transmitted to the ONU provided on the optical communicating apparatus 150. The OLT 2511 may output a signal based on the optical signal obtained from the wavelength decoupler 2512, to the SONET transmitter/receiver 2513.

The wavelength decoupler 2512 outputs the optical signal of the wavelength λ2 output from the demultiplexing unit 2113, to the OLT 2511. The wavelength decoupler 2512 outputs the optical signal of the wavelength λ1 output from the OLT 2511, to the multiplexing unit 2124. The SONET transmitter/receiver 2513 receives the SONET-scheme optical signal output from the demultiplexing unit 2113. The SONET transmitter/receiver 2513 outputs the SONET-scheme optical signal to the multiplexing unit 2124.

The SONET transmitter/receiver 2513 may output a signal based on the received optical signal to the OLT 2511. The SONET transmitter/receiver 2513 may convert the signal output from the OLT 2511 into a SONET-scheme optical signal and may output the converted signal to the multiplexing unit 2124. The SONET transmitter/receiver 2513 may communicate with the SONET transmitter/receiver 2133.

Figure 26:
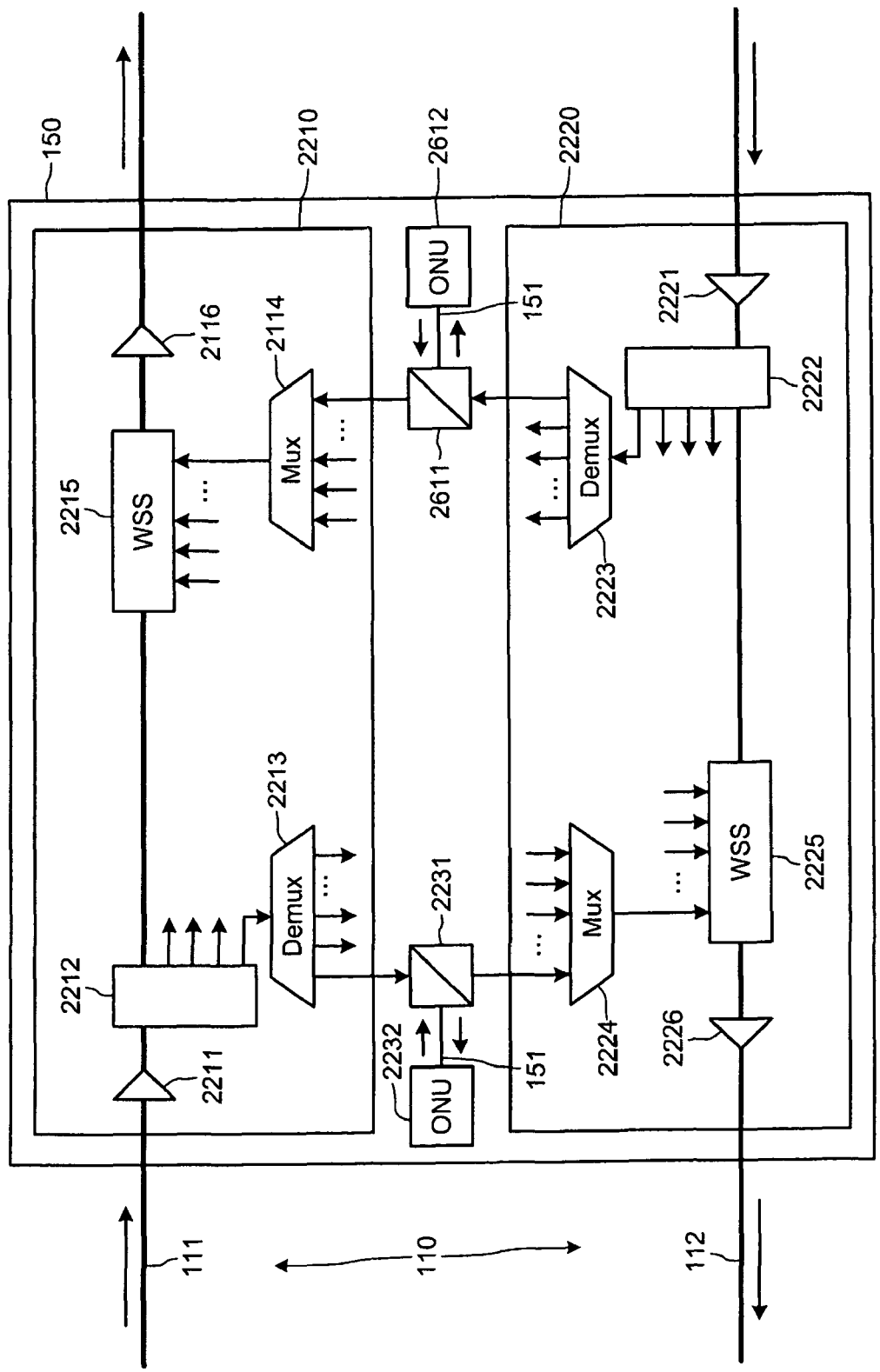
FIG. 26 is a block diagram of a modified example of the optical communicating apparatus depicted in FIG. 22.

FIG. 26 is a block diagram of a modified example of the optical communicating apparatus depicted in FIG. 22. In FIG. 26, components identical to those depicted in FIG. 22 are given identical reference numerals and description thereof is omitted. In addition to the configuration of the optical communicating apparatus 150 depicted in FIG. 22, the optical communicating apparatus 150 includes a wavelength decoupler 2611, and an ONU 2612.

The multiplexing unit 2214 wavelength-multiplexes the optical signals output from the outside and the optical signal output from the wavelength decoupler 2611, and outputs the wavelength-multiplexed signal to the wavelength selective switch 2215. The demultiplexing unit 2223 outputs the optical signal of the wavelength λ1 (for the UpLink of the PON scheme) of the wavelength-demultiplexed optical signals, to the wavelength decoupler 2611, and outputs the rest of the optical signals to the outside (Drop).

The wavelength decoupler 2611 outputs the optical signal of the wavelength λ1 output from the demultiplexing unit 2223, to the ONU 2612. The wavelength decoupler 2611 outputs the optical signal of the wavelength λ2 output from the ONU 2612, to the multiplexing unit 2214.

The ONU 2612 outputs the optical signal of the wavelength λ2 to be transmitted to an OLT provided on an optical communicating apparatus (not depicted) at the latter stage of the optical communicating apparatus 150, to the wavelength decoupler 2611. The ONU 2612 obtains the optical signal of the wavelength λ1 transmitted from the OLT provided on the optical communicating apparatus at the latter stage of the optical communicating apparatus 150, from the wavelength decoupler 2611.

Figure 27:
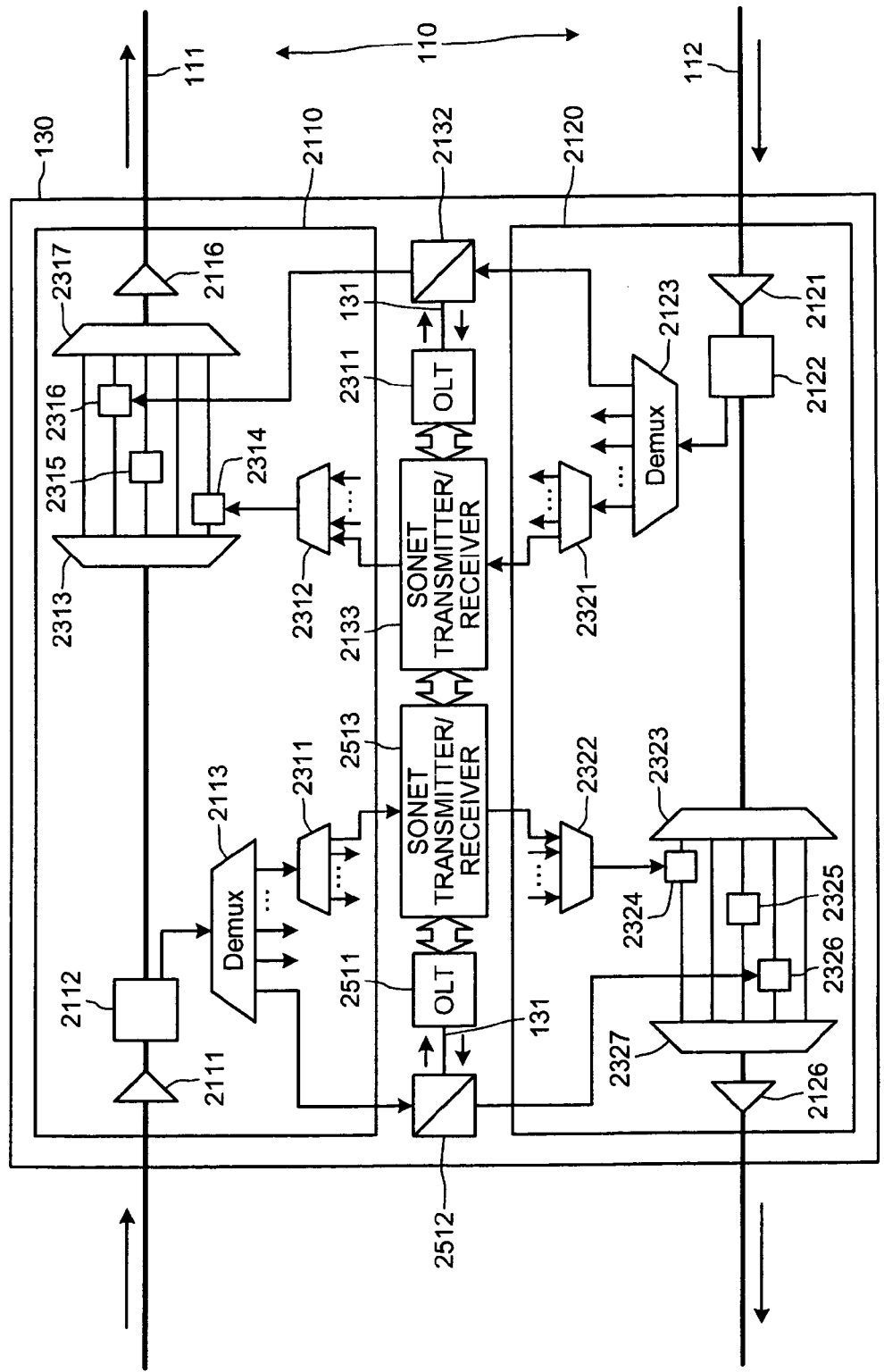
FIG. 27 is a block diagram of a modified example of the optical communicating apparatus depicted in FIG. 23.

FIG. 27 is a block diagram of a modified example of the optical communicating apparatus depicted in FIG. 23. In FIG. 27, components identical to those depicted in FIG. 23 or 25 are given identical reference numerals and description thereof is omitted. As depicted in FIG. 27, in addition to the configuration of the optical communicating apparatus 130 in FIG. 23, the optical communicating apparatus 130 includes the OLT 2511, the wavelength decoupler 2512, and the SONET transmitter/receiver 2513.

The high-density multiplexing unit 2322 wavelength-multiplexes the optical signals having the high-density wavelength intervals output from the SONET transmitter/receiver 2513 and the external source, and outputs the wavelength-multiplexed optical signals to the optical switch 2324. The optical switch 2324 selects either one of the optical signal output from the demultiplexing unit 2323 and the optical signal output from the wavelength decoupler 2322, and outputs the selected optical signal to the multiplexing unit 2327.

The demultiplexing unit 2113 outputs the optical signal in a band including the wavelength to be used by the SONET transmitter/receiver 2513 of the wavelength-demultiplexed optical signals, to the high-density demultiplexing unit 2311. The demultiplexing unit 2113 outputs the optical signal of the wavelength λ2 for UpLink of the PON scheme of the wavelength-demultiplexed optical signals, to the wavelength decoupler 2512. The demultiplexing unit 2113 outputs the optical signals not to be output to the high-density demultiplexing unit 2311 or the wavelength decoupler 2512, to the outside (Drop).

The wavelength decoupler 2512 outputs the optical signal of the wavelength λ1 output from the OLT 2511, to the optical switch 2326. The SONET transmitter/receiver 2513 receives the SONET-scheme optical signal output from the high-density demultiplexing unit 2311. The SONET transmitter/receiver 2513 outputs the SONET-scheme optical signal to the high-density multiplexing unit 2322.

Figure 28:
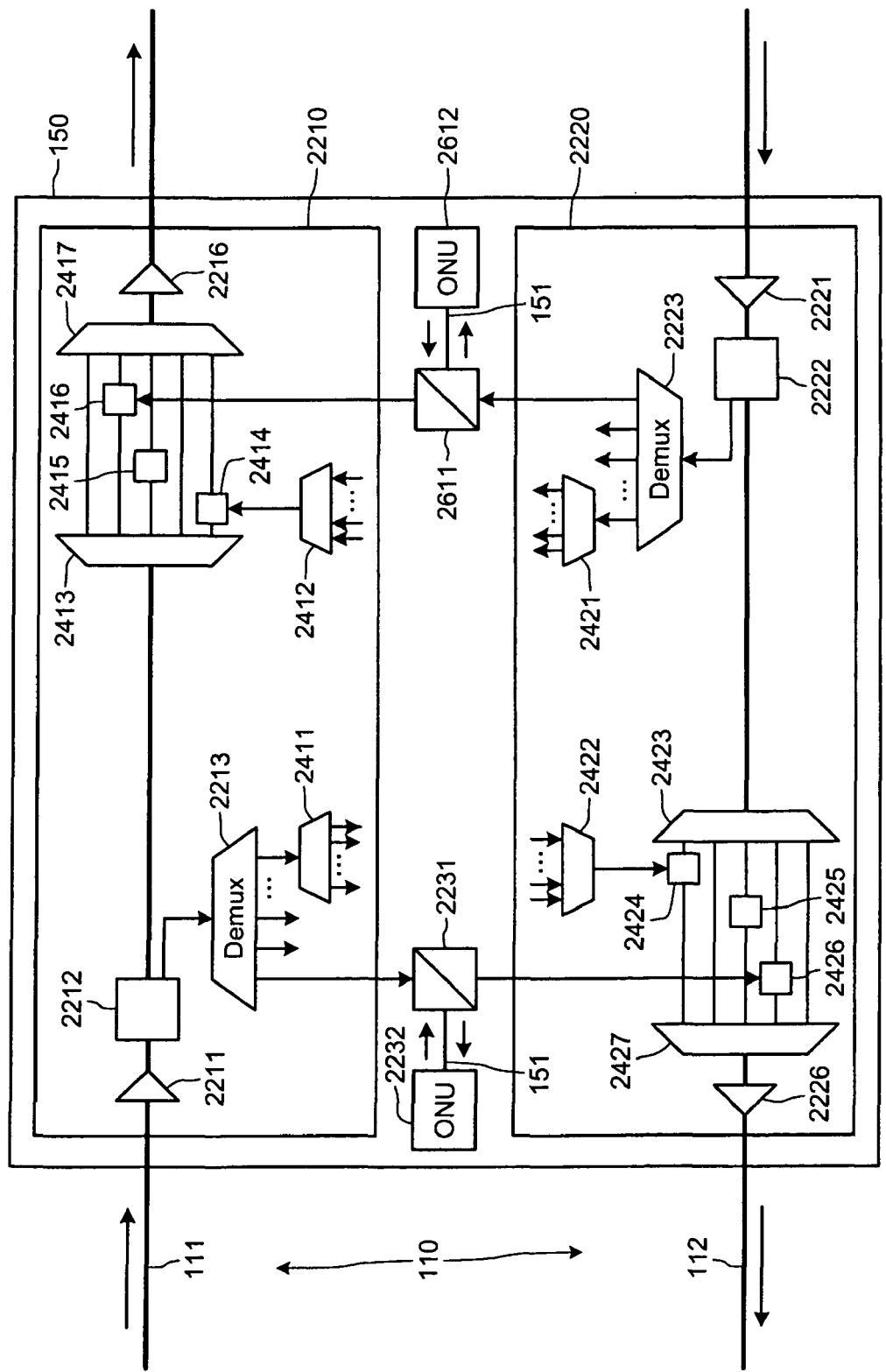
FIG. 28 is a block diagram of a modified example of the optical communicating apparatus depicted in FIG. 24.

FIG. 28 is a block diagram of a modified example of the optical communicating apparatus depicted in FIG. 24. In FIG. 28, components identical to those depicted in FIG. 24 or 26 are given identical reference numerals and description thereof is omitted. As depicted in FIG. 28, in addition to the configuration of the optical communicating apparatus 150 depicted in FIG. 24, the optical communicating apparatus 150 includes the wavelength decoupler 2611, and the ONU 2612.

The optical switch 2416 selects either one of the optical signal output from the demultiplexing unit 2413 and the optical signal output from the wavelength decoupler 2611, and outputs the selected signal to the multiplexing unit 2417. The demultiplexing unit 2223 outputs the optical signal of the wavelength λ1 for DownLink in the PON scheme of the wavelength-demultiplexed optical signals, to the wavelength decoupler 2611.

The demultiplexing unit 2223 outputs to the outside (Drop) the optical signals not to be output to the wavelength decoupler 2611 of the wavelength-demultiplexed optical signals or the high-density demultiplexing unit 2421. The wavelength decoupler 2611 outputs the optical signal of the wavelength λ2 output from the ONU 2612, to the optical switch 2416.

Figure 29:
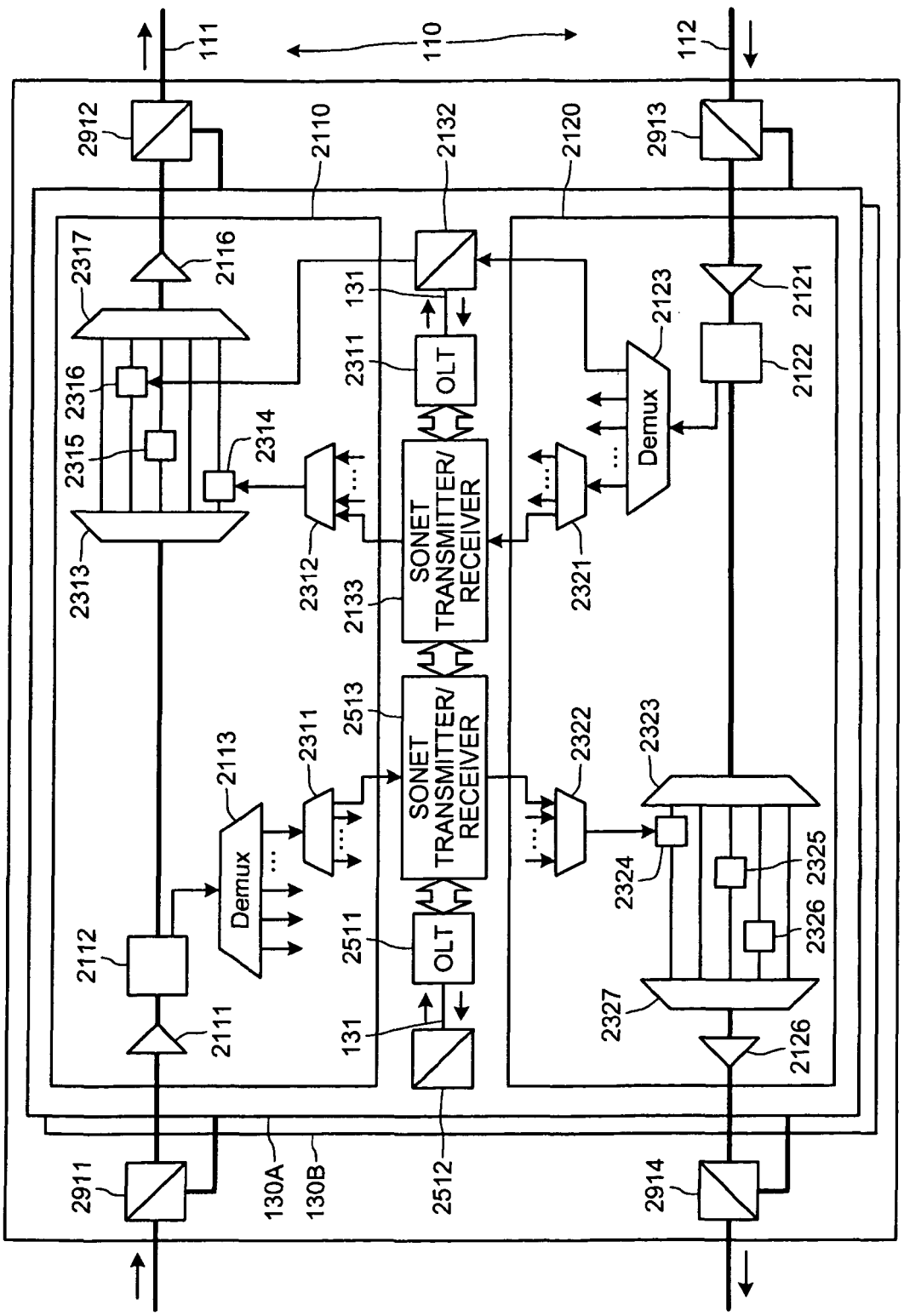
FIG. 29 is a block diagram of a modified example of the optical communicating apparatus depicted in FIG. 27.

FIG. 29 is a block diagram of a modified example of the optical communicating apparatus depicted in FIG. 27. In FIG. 29, components identical to those depicted in FIG. 27 are given identical reference numerals and description thereof is omitted. The optical communicating apparatus 2900 includes two optical communicating apparatuses 130 depicted in FIG. 27 and wavelength decouplers 2911 to 2914.

One of the two optical communicating apparatuses 130 included in the optical communicating apparatus 2900 is denoted as "optical communicating apparatus 130A" and the other one is denoted as "optical communicating apparatus 130B". The wavelength decoupler 2911 decouples an optical signal received through the first core 111 from an optical communicating apparatus (not depicted) at the former stage (in the left portion of FIG. 29) of the optical communicating apparatus 2900 into an optical signal in the C-Band and an optical signal in the L-Band.

The wavelength decoupler 2911 outputs the decoupled C-Band optical signal, to the optical communicating apparatus 130A. The wavelength decoupler 2911 outputs the decoupled L-Band optical signal, to the optical communicating apparatus 130B. The amplifier 2111 of the optical communicating apparatus 130A and the amplifier 2111 of the optical communicating apparatus 130B each amplify the optical signal output from the wavelength decoupler 2911.

The amplifier 2116 of the optical communicating apparatus 130A and the amplifier 2116 of the optical communicating apparatus 130B each output the amplified optical signal to the wavelength decoupler 2912. The wavelength decoupler 2912 couples the optical signals output from the amplifier 2116 of the optical communicating apparatus 130A and the amplifier 2116 of the optical communicating apparatus 130B. The wavelength decoupler 2912 transmits the coupled optical signals to the optical communicating apparatus 150 at the later stage (in the right portion of FIG. 29) of the optical communicating apparatus 2900.

The wavelength decoupler 2913 decouples the optical signal received through the second core 112 from the optical communicating apparatus 150 in the latter stage (in the right portion of FIG. 29) of the optical communicating apparatus 2900, into the C-Band optical signal and an L-Band optical signal. The wavelength decoupler 2913 outputs the decoupled C-Band optical signal to the optical communicating apparatus 130A, and outputs the decoupled L-Band optical signal to the optical communicating apparatus 130B. The amplifier 2121 of the optical communicating apparatus 130A and the amplifier 2121 of the optical communicating apparatus 130B each amplify the optical signal output from the wavelength decoupler 2913.

The amplifier 2126 of the optical communicating apparatus 130A and the amplifier 2126 of the optical communicating apparatus 130B each output the amplified optical signal to the wavelength decoupler 2914. The wavelength decoupler 2914 couples the optical signals output from the amplifier 2126 of the optical communicating apparatus 130A and the amplifier 2126 of the optical communicating apparatus 130B. The wavelength decoupler 2914 transmits the coupled optical signals to the optical communicating apparatus (not depicted) at the former stage (in the left portion of FIG. 29) of the optical communicating apparatus 2900.

According to the configuration depicted in FIG. 29, an optical signal can be decoupled for the C-Band and the L-Band and the decupled optical signals can be processed respectively by the optical communicating apparatus 130A and the optical communicating apparatus 130B. Therefore, in each of the optical communicating apparatus 130A and the optical communicating apparatus 130B, the necessary band can be narrowed in the components such as the various amplifiers, demultiplexing units, and multiplexing units. Therefore, the components such as the various amplifiers, demultiplexing units, and multiplexing units can be inexpensively provided.

The configuration that includes the optical communicating apparatus 2900 including two of the optical communicating apparatus 130 depicted in FIG. 27 has been described. However, instead of the optical communicating apparatus 130 depicted in FIG. 27, any of the above various optical communicating apparatuses 130 may be provided. Instead of the optical communicating apparatus 130 depicted in FIG. 27, any of the above various optical communicating apparatus 150 may be provided.

As above, according to the optical communication system 100 and the optical communicating apparatuses 130 and 150 according to the second embodiment, the optical communicating apparatus 130 can: decouple the optical signal of the wavelength λ1 that passes through the one-core optical transmission path 131; transmit the decoupled optical signals from the first core 111 of the two-core optical transmission path 110; and pass the optical signal of the wavelength λ2 received from the second core 112, to the one-core optical transmission path 131.

The optical communicating apparatus 150 can: decouple the optical signal of the wavelength λ2 that passes through the one-core optical transmission path 151; transmit the decoupled optical signals through the second core 112 of the two-core optical transmission path 110; and pass the optical signal of the wavelength λ1 received from the first core 111, to the one-core optical transmission path 151. Thereby, using the two-core optical transmission path 110, communication can be performed between the OLT 120 and the ONUs 141 to 143 that execute one-core bilateral communication.

Therefore, the effect of the optical communication system 100 and the optical communicating apparatuses 130 and 150 according to the first embodiment is obtained and, by connecting the one-core optical transmission path 131 and the two-core optical transmission path 110 using the wavelength coupling/decoupling unit 1511, the loss of the optical signal can be reduced compared to the configuration including optical couplers, etc., that connects the one-core optical transmission path 131 and the two-core optical transmission path 110.

By connecting the one-core optical transmission path 151 and the two-core optical transmission path 110 using the wavelength coupling/decoupling unit 1521, the loss of the optical signal can be reduced compared to the configuration including optical couplers, etc., that connects the one-core optical transmission path 151 and the two-core optical transmission path 110. Therefore, the communication quality between the OLT 120 and the ONUs 141 to 143 is improved.

Figure 30:
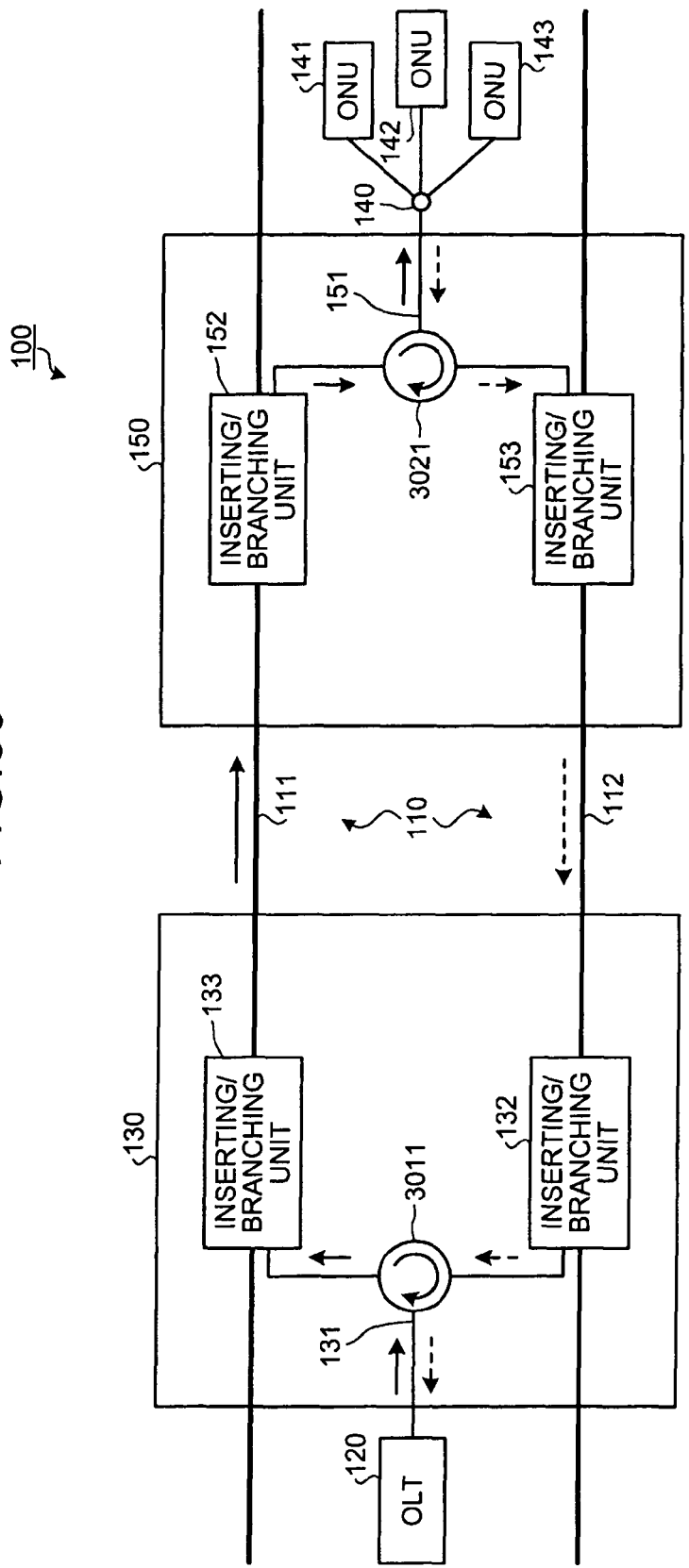
FIG. 30 is a block diagram of the functional configuration of an optical communication system according to a third embodiment.

FIG. 30 is a block diagram of the functional configuration of an optical communication system according to a third embodiment. In FIG. 30, components identical to those depicted in FIG. 5 are given identical reference numerals and description thereof is omitted. Instead of the wavelength coupling/decoupling unit 1511 of the optical communicating apparatus 130 depicted in FIG. 15, the optical communicating apparatus 130 of the optical communication system 100 according to the third embodiment includes an optical circulator 3011. Instead of the wavelength coupling/decoupling unit 1521 of the optical communicating apparatus 150 depicted in FIG. 15, the optical communicating apparatus 150 includes an optical circulator 3021.

The inserting/branching unit 132 outputs the optical signal branched from the second core 112 to the optical circulator 3011. The one-core optical transmission path 131 passes the optical signal transmitted from the OLT 120, to the optical circulator 3011. The one-core optical transmission path 131 transmits the optical signal output from the optical circulator 3011, to the OLT 120.

The optical circulator 3011 outputs the optical signal output from the one-core optical transmission path 131, to the inserting/branching unit 133. The optical circulator 3011 outputs the optical signal output from the inserting/branching unit 132, to the one-core optical transmission path 131. The inserting/branching unit 133 inserts the optical signal output from the optical circulator 3011 into the first core 111 and transmits the inserted optical signal to the optical communicating apparatus 150.

The inserting/branching unit 152 outputs the optical signal branched from the first core 111 to the optical circulator 3021. The one-core optical transmission path 151 passes the optical signal transmitted from the branching unit 140, to the optical circulator 3021. The one-core optical transmission path 151 transmits the optical signal output from the optical circulator 3021, to the branching unit 140.

The optical circulator 3021 outputs the optical signal output from the one-core optical transmission path 151, to the inserting/branching unit 153. The optical circulator 3021 outputs the optical signal output from the inserting/branching unit 152, to the one-core optical transmission path 151. The inserting/branching unit 153 inserts the optical signal output from the optical circulator 3021 into the second core 112 and transmits the inserted optical signal to the optical communicating apparatus 130.

Figure 31:
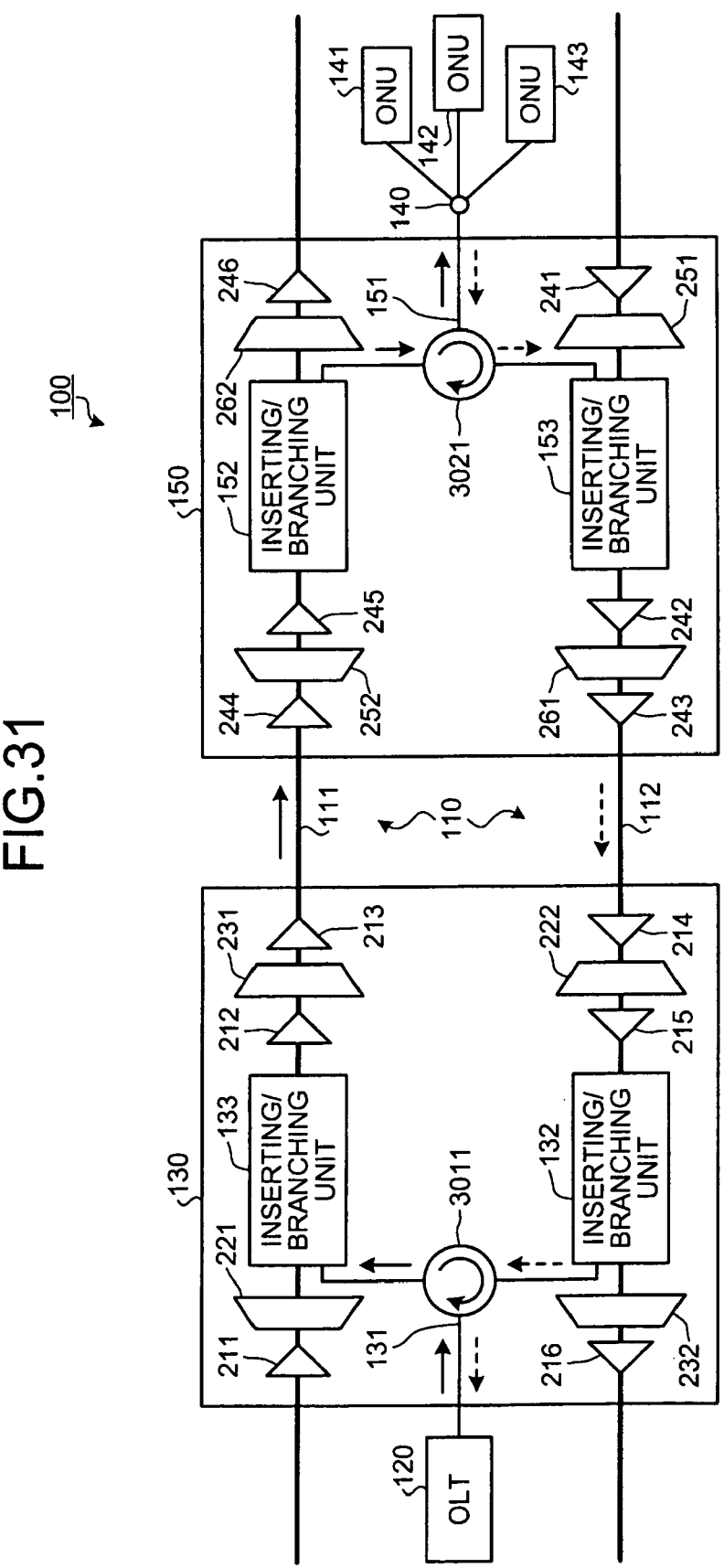
FIG. 31 is a block diagram of the specific configuration of the optical communication system depicted in FIG. 30.

FIG. 31 is a block diagram of the specific configuration of the optical communication system depicted in FIG. 30. In FIG. 31, components identical to those depicted in FIG. 2 or 30 are given identical reference numerals and description thereof is omitted. As depicted in FIG. 31, in addition to the configuration of the optical communicating apparatus 130 depicted in FIG. 30, the optical communicating apparatus 130 includes the amplifiers 211 to 216, the demultiplexing units 221 and 222, and the multiplexing units 231 and 232 (see the description of FIG. 2).

Figure 32:
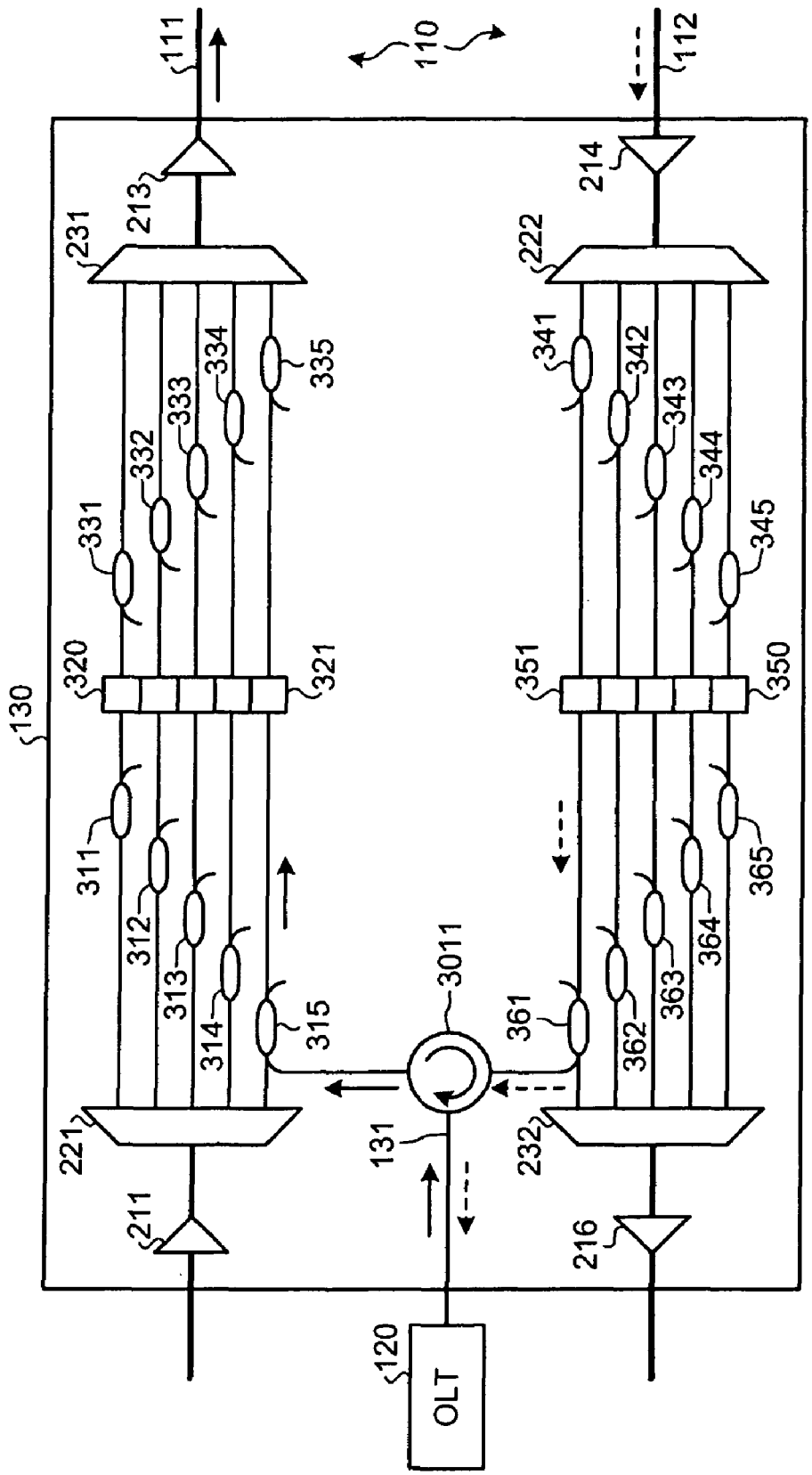
FIG. 32 is a block diagram of a specific example of the optical communication apparatus at the former stage depicted in FIG. 31.

FIG. 32 is a block diagram of a specific example of the optical communication apparatus at the former stage depicted in FIG. 31. In FIG. 32, components identical to those depicted in FIG. 3 or 31 are given identical reference numerals and description thereof is omitted. FIG. 32 depicts a specific example of the configuration between the demultiplexing unit 221 and the multiplexing unit 231 and the configuration between the demultiplexing unit 222 and the multiplexing unit 232 of the optical communicating apparatus 130 depicted in FIG. 31.

The optical circulator 3011 outputs the optical signal output from the one-core optical transmission path 131, to the optical coupler 315. The optical circulator 3011 outputs the optical signal output from the optical coupler 361, to the one-core optical transmission path 131.

The optical couplers 311 to 315, the SOA array 320, and the optical couplers 331 to 335 are provided between the demultiplexing unit 221 and the multiplexing unit 231 (see the description of FIG. 3). The optical coupler 315 receives the optical signal output from the demultiplexing unit 221 and the optical signal output from the optical circulator 3011.

The optical couplers 341 to 345, the SOA array 350, and the optical couplers 361 to 365 are provided between the demultiplexing unit 222 and the multiplexing unit 232 (see the description of FIG. 3). The optical coupler 361 outputs one of the branched optical signals to the optical circulator 3011. In this case, the optical signal output from the one-core optical transmission path 131 is decoupled by the optical circulator 3011 and is output to the optical coupler 315. Therefore, the optical signal is not input into the optical coupler 361.

Figure 33:
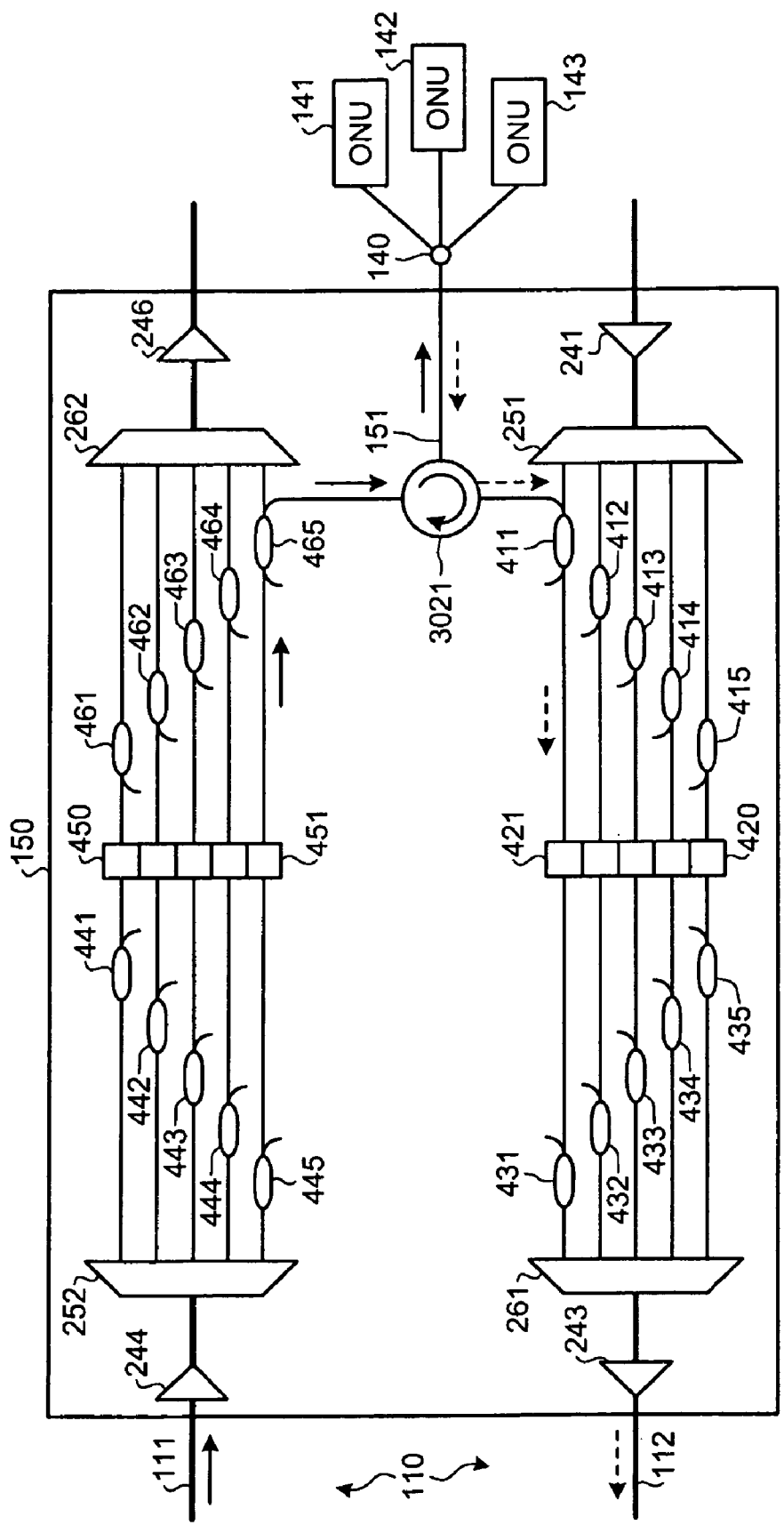
FIG. 33 is a block diagram of a specific example of the optical communication apparatus at the latter stage depicted in FIG. 31.

FIG. 33 is a block diagram of a specific example of the optical communication apparatus at the latter stage depicted in FIG. 31. In FIG. 33, components identical to those depicted in FIG. 4 or 31 are given identical reference numerals and description thereof is omitted. FIG. 33 depicts a specific example of the configuration between the demultiplexing unit 251 and the multiplexing unit 261 and the configuration between the demultiplexing unit 252 and the multiplexing unit 262 of the optical communicating apparatus 150 depicted in FIG. 31.

The optical circulator 3021 outputs the optical signal output from the one-core optical transmission path 151, to the optical coupler 411. The optical circulator 3021 outputs the optical signal output from the optical coupler 465, to the one-core optical transmission path 151.

The optical couplers 411 to 415, the SOA array 420, and the optical couplers 431 to 435 are provided between the demultiplexing unit 251 and the multiplexing unit 261 (see the description of FIG. 3). The optical coupler 411 receives the optical signal output from the demultiplexing unit 251 and the optical signal output from the optical circulator 3021.

The optical couplers 441 to 445, the SOA array 450, and the optical couplers 461 to 465 are provided between the demultiplexing unit 252 and the multiplexing unit 262 (see the description of FIG. 3). The optical coupler 465 outputs one of the branched optical signals to the optical circulator 3021. In this case, the optical signal output from the one-core optical transmission path 151 is decoupled by the optical circulator 3021 and is output to the optical coupler 411. Therefore, the optical signal is not input into the optical coupler 465.

Figure 34:
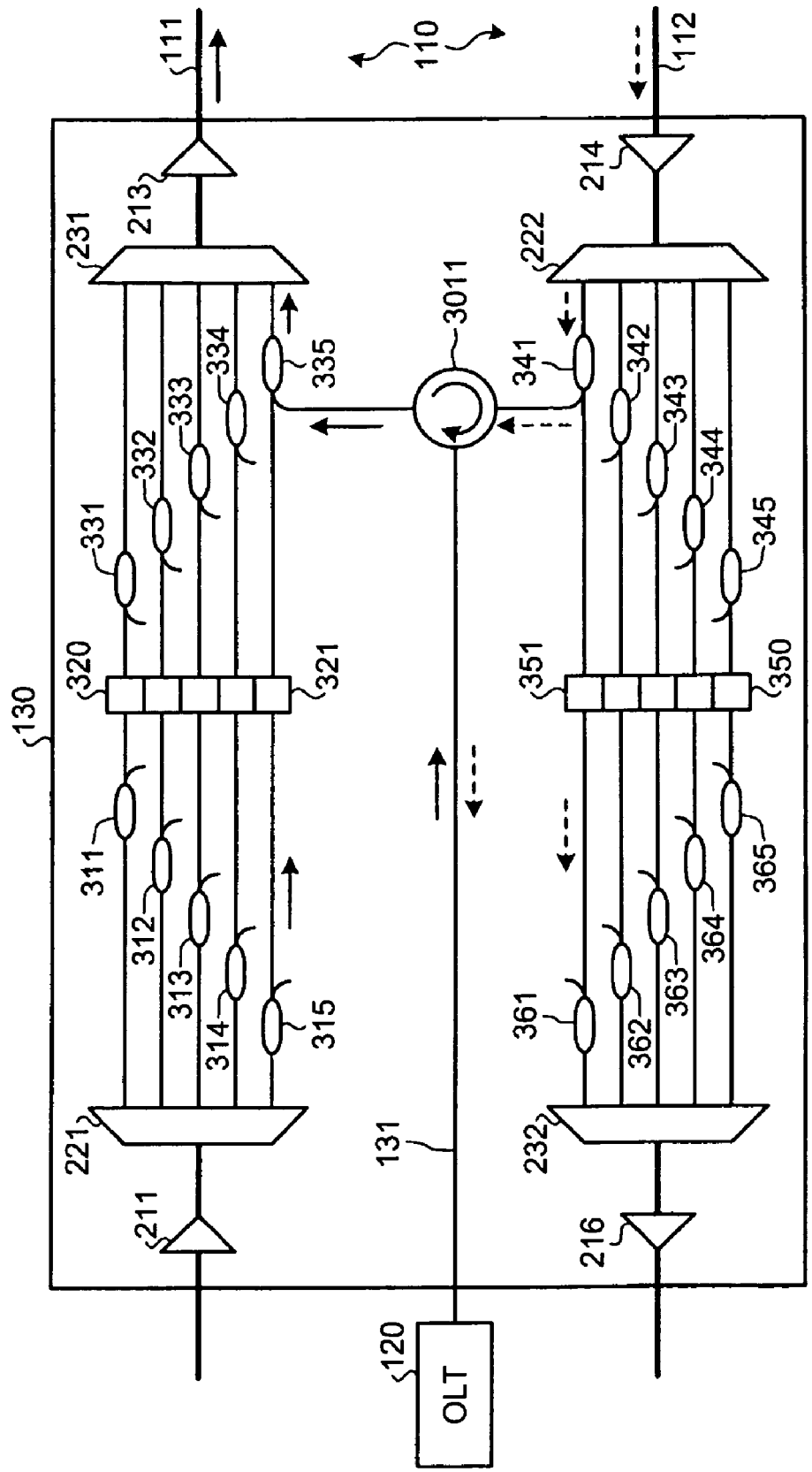
FIG. 34 is a block diagram of a modified example of the optical communication apparatus depicted in FIG. 32.

FIG. 34 is a block diagram of a modified example of the optical communication apparatus depicted in FIG. 32. In FIG. 34, components identical to those depicted in FIG. 32 are given identical reference numerals and description thereof is omitted. A configuration including the optical signals, transmitted and received between the OLT 120 and the ONUs 141 to 143, that do not pass through the SOA array 320 and the SOA array 350 may be employed when the OSNR of each optical signal transmitted and received between the OLT 120 and the ONUs 141 to 143 can be sufficiently saved.

In this case, the optical coupler 335 is the inserting/branching unit 133 depicted in FIG. 31. The optical coupler 335 receives the optical signal output from the demultiplexing unit 221 and the optical signal output from the optical circulator 3011. The optical coupler 335 branches the input signal and outputs one of the branched optical beams to the multiplexing unit 231 (Add/Through).

In this case, the optical coupler 341 is the inserting/branching unit 132 depicted in FIG. 31. The optical coupler 341 receives the optical signal output from the demultiplexing unit 222. The optical coupler 341 outputs one of the branched optical signals to the optical circulator 3011. The other one of the optical signals branched by the optical coupler 341 is output to the SOA 351.

The optical signal output from the one-core optical transmission path 131 is output to the optical coupler 335 by the optical circulator 3011 and, therefore, the optical signal output from the one-core optical transmission path 131 is not input into the optical coupler 341. In the configuration shown in FIG. 34, the optical coupler 315 may be a 1×2 optical coupler. The optical coupler 361 may be a 2×1 optical coupler.

FIG. 35 is a block diagram of a modified example of the optical communication apparatus depicted in FIG. 33. In FIG. 35, components identical to those depicted in FIG. 33 are given identical reference numerals and description thereof is omitted. A configuration including the optical signals, transmitted and received between the OLT 120 and the ONUs 141 to 143, that do not pass through the SOA arrays 420 and 450 may be employed when the OSNR of each optical signal transmitted and received between the OLT 120 and the ONUs 141 to 143 can be sufficiently saved.

In this case, the optical coupler 431 is the inserting/branching unit 133 depicted in FIG. 31. The optical coupler 431 receives the optical signal output from the SOA 421 of the SOA array 420 and the optical signal output from the optical circulator 3021. The optical coupler 431 outputs the input optical signals to the multiplexing unit 261 (Add/Through).

In this case, the optical signal output from the optical coupler 445 is decoupled by the optical circulator 3021 and is output to the one-core optical transmission path 151 and, therefore, the optical signal output from the optical coupler 445 is not input into the optical coupler 431.

The optical coupler 445 is the inserting/branching unit 152 depicted in FIG. 31. The optical coupler 445 branches the input optical signal and outputs one of the branched optical signals to the optical circulator 3021. In the configuration in FIG. 35, the optical coupler 411 may be a 1×2 optical coupler. The optical coupler 465 may be a 2×1 optical coupler.

As above, according to the optical communication system 100 and the optical communicating apparatuses 130 and 150 according to the third embodiment, the optical communicating apparatus 130 can: decouple the optical signal that passes through the one-core optical transmission path 131; transmit the decoupled optical signal through the first core 111; and pass the optical signal of the wavelength λ2 received from the second core 112, to the one-core optical transmission path 131.

The optical communicating apparatus 150 can: decouple the optical signal that passes through the one-core optical transmission path 151 using the optical circulator 3021; transmit the decoupled optical signal from the second core 112; and pass the optical signal received from the first core 111 to the one-core optical transmission path 151. Thereby, using the two-core optical transmission path 110, communication can be executed between the OLT 120 and the ONUs 141 to 143 that execute the one-core bilateral communication.

Therefore, the effect of the optical communication system 100 and the optical communicating apparatuses 130 and 150 according to the first embodiment is obtained and, by executing the connection of the one-core optical transmission path 131 and the two-core optical transmission path 110 using the optical circulator 3011, the loss of the optical signal can be reduced compared to the configuration including optical couplers, etc., that execute the connection of the one-core optical transmission path 131 and the two-core optical transmission path 110.

By executing the connection of the one-core optical transmission path 151 and the two-core optical transmission path 110 using the optical circulator 3021, the loss of the optical signal can be reduced compared to the configuration including the optical couplers, etc., that execute the connection of the one-core optical transmission path 151 and the two-core optical transmission path 110. Therefore, the communication quality between the OLT 120 and the ONUs 141 to 143 can be improved.

As above, according to the optical communicating apparatus and the optical communication system disclosed herein, the flexibility of the network design can be improved.

In the above embodiments, the case where a PON-scheme optical communication system is realized in a SONET-scheme optical communication system has been described. However, the communication schemes are not limited to these examples. The optical communication system 100 and the optical communicating apparatuses 130 and 150 according to the above embodiments are applicable generally to the cases where an optical communication system of a one-core bilateral scheme is overlaid on an optical communication system using a two-core optical transmission path.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical communicating apparatus, comprising:
   a two-core optical transmission path by which the optical communicating apparatus is optically coupled to another optical communicating apparatus:
   a one-core optical transmission path that passes a first optical signal transmitted from an optical transmitter/receiver performing one-core bilateral communication and a second optical signal transmitted to the optical transmitter/receiver in an opposite direction;
   a first coupler that inserts the first optical signal transmitted from the optical transmitter/receiver through the one-core optical transmission path, into a first core of the two-core optical transmission path to the other optical communicating apparatus; and
   a second coupler that branches the second optical signal transmitted from a second core of the two-core optical transmission path which is optically coupled to the other optical communication apparatus, to the optical transmitter/receiver through the one-core optical transmission path, wherein
   the two-core optical transmission path is an optical transmission path of a Synchronous Optical NETwork/Synchronous Digital Hierarchy-scheme network.

2. The optical communicating apparatus of claim 1, wherein
   the second coupler branches the first optical signal from the second core of the two-core optical transmission path and inserts the first optical signal into the first core of the two-core optical transmission path through the first coupler.

3. The optical communicating apparatus of claim 1, wherein
   the second coupler branches the second optical signal from the second core of the two-core optical transmission path and inserts the second optical signal into the one-core optical transmission path through the first coupler.

4. The optical communicating apparatus of claim 1, wherein a first wavelength of the first optical signal and a second wavelength of the second optical signal are different from each other, and the optical communicating apparatus further comprises a wavelength coupler/decoupler that decouples the first optical signal passing through the one-core optical transmission path to the first coupler, and passes the second optical signal received by the second coupler to the one-core optical transmission path.

5. The optical communicating apparatus of claim 1, further comprising an optical circulator that passes the first optical signal through the one-core optical transmission path to the first coupler and passes the second optical signal received by the second coupler to the one-core optical transmission path.

6. The optical communicating apparatus of claim 1, wherein the optical transmitter/receiver is a local station that performs communication with a plurality of subscriber terminals optically coupled to the other optical communicating apparatus.

7. The optical communicating apparatus of claim 1, wherein the optical transmitter/receiver is one of a plurality of subscriber terminals that perform communication with a local station optically coupled to the other optical communicating apparatus, and the one-core optical transmission path is branched and optically coupled to the subscriber terminals.

8. The optical communicating apparatus of claim 7, further comprising:

a third coupler that branches the second optical signal transmitted from the other optical communicating apparatus through the one-core optical transmission path, transmits the branched signals to the subscriber terminals, couples optical signals transmitted from the subscriber terminals, and passes the coupled optical signals to the one-core optical transmission path.

9. An optical communication system comprising a first optical communicating apparatus and a second optical communicating apparatus optically coupled to each other by a two-core optical transmission path, the first optical communicating apparatus and the second optical communicating apparatus comprising:

a one-core optical transmission path that passes a first optical signal transmitted from an optical transmitter/receiver performing one-core bilateral communication and a second optical signal transmitted to the optical transmitter/receiver in an opposite direction;

a first coupler that inserts the first optical signal transmitted from the optical transmitter/receiver through the one-core optical transmission path, into a first core of the two-core optical transmission path to the other optical communication apparatus; and a second coupler that branches the second optical signal transmitted from a second core of the two-core optical transmission path which is optically coupled to the other optical communicating apparatus, to the optical transmitter/receiver through one-core optical transmission path wherein the optical transmitter/receiver of the first optical communicating apparatus is a local station that performs communication with a plurality of subscriber terminals optically coupled to the second optical communicating apparatus and the optical transmitter/receiver of the second optical communicating apparatus is one of a plurality of subscriber terminals that perform communication with a local station optically coupled to the other optical communicating apparatus, and the one-core optical transmission path is branched and optically coupled to the subscriber terminals and wherein communication is executed between the local station and the subscriber terminals wherein the two-core optical transmission path is an optical transmission path of a Synchronous Optical NETwork/Synchronous Digital Hierarchy-scheme network.

10. The optical communication system of claim 9, wherein PON (Passive Optical Network)-scheme communication is performed between the local station and the subscriber terminals.

* * * * *